US012431112B2

(12) United States Patent
Ivers et al.

(10) Patent No.: US 12,431,112 B2
(45) Date of Patent: Sep. 30, 2025

(54) SYSTEMS AND METHODS FOR TRANSFORMING DIGITAL AUDIO CONTENT

(71) Applicant: TREE GOAT MEDIA, INC., New York, NY (US)

(72) Inventors: John Ivers, Winnetka, IL (US); Theo Rosendorf, Tucker, GA (US); Kevin Carlson, Woodstock, GA (US); Michael Kakoyiannis, New York, NY (US); Sherry Mills, Setauket, NY (US)

(73) Assignee: Tree Goat Media, INC, New York, NY (US)

( * ) Notice: Subject to any disclaimer, the term of this patent is extended or adjusted under 35 U.S.C. 154(b) by 752 days.

(21) Appl. No.: 17/672,154

(22) Filed: Feb. 15, 2022

(65) Prior Publication Data

US 2022/0208155 A1    Jun. 30, 2022

Related U.S. Application Data

(63) Continuation-in-part of application No. 17/172,201, filed on Feb. 10, 2021, now Pat. No. 11,749,241, which is a continuation of application No. 16/506,231, filed on Jul. 9, 2019, now Pat. No. 10,971,121.

(60) Provisional application No. 63/149,891, filed on Feb. 16, 2021, provisional application No. 62/814,018, filed on Mar. 5, 2019, provisional application No. 62/695,439, filed on Jul. 9, 2018.

(51) Int. Cl.
*G10H 1/00* (2006.01)
*G06F 16/68* (2019.01)
*G06F 16/683* (2019.01)

(52) U.S. Cl.
CPC ........ *G10H 1/0008* (2013.01); *G06F 16/685* (2019.01); *G06F 16/686* (2019.01); *G10H 2220/106* (2013.01)

(58) Field of Classification Search
CPC ............ G10H 1/0008; G10H 2220/106; G06F 16/685; G06F 16/686
USPC .......................................................... 84/609
See application file for complete search history.

(56) References Cited

U.S. PATENT DOCUMENTS

| 6,070,167 | A | * | 5/2000 | Qian ................ | H04N 21/47205 |
| | | | | | 707/999.102 |
| 9,280,599 | B1 | * | 3/2016 | Wiseman ............. | G06F 16/632 |
| 9,384,734 | B1 | * | 7/2016 | Wiseman ............. | G06F 16/638 |

(Continued)

FOREIGN PATENT DOCUMENTS

| EP | 2202647 | | 6/2010 | | |
| EP | 2202647 | A1 * | 6/2010 | ....... | G06F 16/24578 |

*Primary Examiner* — Christina M Schreiber
(74) *Attorney, Agent, or Firm* — UB Greensfelder LLP; Brian E. Turung

(57) ABSTRACT

A system for platform-independent visualization of audio content, in particular audio tracks utilizing a central computer system in communication with user devices via a computer network. The central system utilizes various algorithms to identify spoken content from audio tracks and identifies "great moments" and/or selects visual assets associated with the identified content. Audio tracks, for example Podcasts, may be segmented into topical audio segments based upon themes or topics, with segments from disparate podcasts combined into a single listening experience, based upon certain criteria, e.g., topics, themes, keywords, and the like.

20 Claims, 24 Drawing Sheets

(56) References Cited

U.S. PATENT DOCUMENTS

| | | | |
|---|---|---|---|
| 11,893,990 B2* | 2/2024 | Ramsl | G06F 40/30 |
| 2002/0093591 A1* | 7/2002 | Gong | H04N 21/2368 |
| | | | 348/E7.063 |
| 2004/0078188 A1* | 4/2004 | Gibbon | G06F 16/739 |
| | | | 704/1 |
| 2007/0300142 A1* | 12/2007 | King | G06Q 30/02 |
| | | | 382/181 |
| 2008/0005699 A1* | 1/2008 | Dvorak | G06F 3/04815 |
| | | | 715/836 |
| 2009/0044686 A1* | 2/2009 | Vasa | G11B 27/031 |
| | | | 84/609 |
| 2010/0161441 A1* | 6/2010 | Hounsell | G06F 16/4387 |
| | | | 725/35 |
| 2010/0161580 A1* | 6/2010 | Chipman | G06F 16/24578 |
| | | | 707/706 |
| 2010/0241963 A1* | 9/2010 | Kulis | G06F 16/685 |
| | | | 707/706 |
| 2011/0069230 A1* | 3/2011 | Polumbus | H04N 21/4884 |
| | | | 707/711 |
| 2011/0252947 A1* | 10/2011 | Eggink | G06F 16/683 |
| | | | 84/609 |
| 2012/0236201 A1* | 9/2012 | Larsen | G06Q 30/02 |
| | | | 348/468 |
| 2014/0053710 A1* | 2/2014 | Serletic | G06F 3/0481 |
| | | | 84/609 |
| 2014/0161423 A1* | 6/2014 | Tesch | H04N 9/79 |
| | | | 386/285 |
| 2015/0278181 A1* | 10/2015 | Gevlich | G06F 40/169 |
| | | | 715/730 |
| 2016/0004911 A1* | 1/2016 | Cheng | H04N 21/233 |
| | | | 382/159 |
| 2017/0092246 A1* | 3/2017 | Manjarrez | G06F 3/165 |
| 2017/0171580 A1* | 6/2017 | Hirsch | H04L 67/62 |
| 2017/0352361 A1* | 12/2017 | Thorn | G11B 27/031 |
| 2018/0032610 A1* | 2/2018 | Cameron | G10L 15/18 |
| 2018/0039859 A1* | 2/2018 | Harwath | G06V 20/35 |
| 2018/0052920 A1* | 2/2018 | Klein | G06F 16/632 |
| 2018/0174587 A1* | 6/2018 | Bermundo | G06F 3/1271 |
| 2019/0026291 A1* | 1/2019 | Bhatt | G06F 16/743 |
| 2019/0200084 A1* | 6/2019 | Gilson | H04N 21/4728 |
| 2019/0237051 A1* | 8/2019 | Silverstein | G06N 7/01 |
| 2019/0355336 A1* | 11/2019 | Steinwedel | H04L 12/1813 |
| 2020/0013380 A1* | 1/2020 | Kakoyiannis | G06F 16/61 |
| 2020/0320898 A1* | 10/2020 | Johnson | G10L 15/08 |
| 2021/0082382 A1* | 3/2021 | Pinhas | G06F 16/685 |
| 2021/0166666 A1* | 6/2021 | Kakoyiannis | G10H 1/0008 |
| 2021/0224319 A1* | 7/2021 | Ingel | G06F 16/686 |
| 2021/0287306 A1* | 9/2021 | Pomerantz | G06Q 50/01 |
| 2022/0020376 A1* | 1/2022 | Garg | G06F 40/289 |
| 2022/0066732 A1* | 3/2022 | Roxbergh | G10H 1/0008 |
| 2022/0208155 A1* | 6/2022 | Ivers | G10H 1/368 |
| 2022/0222294 A1* | 7/2022 | Wang | G06F 16/685 |
| 2023/0094828 A1* | 3/2023 | Ramsl | G10L 25/54 |
| | | | 704/235 |
| 2023/0230564 A9* | 7/2023 | Kakoyiannis | G10H 1/0008 |
| | | | 84/609 |
| 2023/0280966 A1* | 9/2023 | Imbruce | G06F 16/638 |
| | | | 704/235 |
| 2023/0359837 A1* | 11/2023 | Tanaka | G06N 3/0475 |
| 2023/0360652 A1* | 11/2023 | Li | G10L 15/02 |
| 2023/0410793 A1* | 12/2023 | Clifton | G06N 3/045 |
| 2024/0087547 A1* | 3/2024 | Ivers | G10H 1/0008 |
| 2024/0177695 A1* | 5/2024 | Kakoyiannis | G06F 16/686 |

* cited by examiner

SYSTEMS AND METHODS FOR TRANSFORMING DIGITAL AUDIO CONTENT

This application is a continuation-in-part of U.S. patent application Ser. No. 17/172,201 filed Feb. 10, 2021, which in turn is a continuation of U.S. patent application Ser. No. 16/506,231 filed Jul. 9, 2019, now U.S. Pat. No. 10,971,121, which in turn claims priority benefit of U.S. Provisional Patent Application Ser. No. 62/695,439 filed Jul. 9, 2018, entitled "Systems and Methods for Transforming Digital Audio Content into Highly Engaging, Highly Sharable, Visually Enhanced Topic-Based Segments for Their Search Engine Visibility, Discoverability, Measurement, Monetizeability, and Accessibility to Advertisers in New, More Targeted and Metric-Driven Way," and U.S. Provisional Patent Application Ser. No. 62/814,018 filed Mar. 3, 2019, entitled "Systems and Methods for Transforming Digital Audio Content into Highly Engaging, Highly Sharable, Visually Enhanced Topic-Based Segments for Their Search Engine Visibility, Discoverability, Measurement, Monetizeability, and Accessibility to Advertisers in New, More Targeted and Metric-Driven Way," the complete disclosures of which, in their entirety are herein incorporated by reference.

This application also claims the priority of U.S. Provisional Patent Application 63/149,891, titled "Systems and Methods for Transforming Digital Audio Content", filed Feb. 16, 2021, the complete disclosure of which is incorporated by reference herein.

BACKGROUND

The present disclosure relates to digital audio (topic-based segmentation, search, visibility to search engines, monetization, and ability to be monetized via advertising) and optionally associating visuals (images, still and/or motion photos, cinemographs, videos, looping videos, gifs, animation, etc.). It finds particular application in conjunction with podcasting and will be described with particular reference thereto. However, it is to be appreciated that the present exemplary embodiment is also amenable to other like applications, including and not limited to audiobooks, broadcast radio, streaming radio, music, virtual reality, and/or educational audio/visual tools and products.

Presently, digital audio is not readily searchable, indexable, or shareable via social media in any modern graphic sense. In this way, digital audio remains outside the realm of social media and the modern Internet. On the other hand, text and images are machine-readable, whereas digital audio is not. That is, audio bits cannot be recognized by software. For example, the Google® search engine does not have an audio tab, rather it is configured to readily search images and text. If a search engine such as Google® cannot "see" audio, then neither can advertisers. There is no way to pictorially represent the topics discussed in millions of hours of listening. Sponsors have billions of dollars in digital advertising they would like to pair with audio, but there are no highly targeted, digital vehicles to reach those audiences.

There is an outdated radio advertising-type model in place within the audio podcasting space. As used herein, a podcast refers to a digital audio file made available via the Internet for downloading to a personal computer or mobile device, which may be listened to by a user at the user's convenience. The major players in podcast advertising monetization still generate the great majority of their revenues from host-read audio advertisements that are inserted into an episode's structure in just the same way as traditional radio. Creating traditional radio-style audio advertisements means significant time and cost for the advertiser, who must work individually with each show host and/or their representation to craft and execute an advertisement that favorably positions its brand, while in the authentic style of the host. This means that advertisers will only work with the top podcasters, and this leaves behind a significant amount of the market. As all podcasts provide direct access to trusting and engaged listeners, and according to the Interactive Advertising Bureau, a majority of podcast listeners have taken action as a result of an ad in a podcast, this means a lot of potential revenue is left on the table. There is no easy or cost-effective system allowing advertisers to reach their target customers in that larger pool of episodes.

The industry currently ripest for a monetization revolution is podcasting. Considered the most rapidly growing media content platform, podcasting is on the verge of triggering an audio revolution. Nearly one in five Americans regularly listen to podcasts. This is a 17% increase of listeners over the prior year, with monthly listenership up 75% from 2013. As it is currently constituted, however, podcasting poses a significant challenge in the audio space for advertisers, due in part to limited and largely unreliable metrics and the inefficient search tools available. In fact, most podcasts generate no meaningful revenue. Only the top 10% of podcasters can take advantage of audio advertising. Monetization advancements are urgently needed in order to unlock the value inherent in the podcast media.

Important entities in the podcasting space include Spotify®, iTunes®, Stitcher®, and Pandora®. Music platform Spotify® has 217 million monthly active users, of which 100 million pay for premium subscription, putting it ahead of Apple Music globally. Recently acquiring podcast networks Gimlet Media and Anchor, Spotify® is looking to grow its share of the podcast market by converting its music listeners into podcast listeners. iTunes® currently dominates over 65% of total podcast listenership. However, it offers poor quality text search and no "wow" factor. Stitcher® focuses on curating share-worthy titles for podcasts, and provides a more visual search than iTunes®, but it doesn't divide its content into "topics" and has poor customer ratings. Pandora® has 78 million active monthly users and has recently experimented with introducing podcasts, but the hefty music licensing fees of Pandora® make that focus prohibitive. None of these entities offer audio platforms that "visualize" and "topic segment" audio.

Some efforts in the industry have been centered on turning digitally recorded talk-based audio (namely, podcasts) into translated text, such as commercially available software from PopUpArchive™. Although the text itself may be keyword searchable, it does not identify the true underlying nature of the topics being discussed or segment conversation effectively into standalone topics and, thus, cannot truly break down discussion into distinct topical audio segments. Furthermore, transcripts are a grey area in computer recognition. Too many keywords make them of lesser value for those seeking targeted advertising. Currently, there is no audio platform allowing users to search for content and find specific audio segments and related topics buried within audio in a modern, visual way.

In 2004, most blogs (regularly updated websites or web pages) were discovered via links on more popular blogs; today new blogs are usually discovered on social networks. Podcasts, which can be vaguely characterized as an "audio" blog, however, struggle with respect to search and discovery. While the iTunes® platform has a front page and a blackbox ranking system, the requirement to download a file and spend time listening makes it hard to spread a podcast virally. Many podcasts are instead built off of established brands, e.g., National Public Radio ("NPR") or the personal brands of the podcast hosts. Blogs can be read via Uniform Resource Locators ("URL") typed in any Internet browser currently in use, e.g. Safari®, FireFox®, Chrome®, Internet Explorer®, and the like. Podcasts are much more complicated: a user either has to search a third-party podcast player's directory (iTunes® or self-contained) to add a show, or copy-and-paste a feed address. Alternately, the user can simply listen to a podcast on a website, but that is a suboptimal experience. Often, a solution that works for sophisticated users is actually prohibitive for average users. Rich Site Summary ("RSS") readers are an illustrative example: RSS feeds were only ever viewed by a fraction of readers because they were too difficult to use.

Podcasting is the fastest-growing content platform in the digital media universe, yet there is a disconnect between the popularity of digital talk audio with listeners and its value for sponsors. Accordingly, what is needed is a system and method which overcomes these problems and others, including the solutions to core issues surrounding the digital audio industry's monetization, measurement, and search and discovery problems.

BRIEF DESCRIPTION

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

The invention includes several novel concepts that are applicable to audio casts such as, but not limited to:

Applying machine learning (ML) algorithms and leveraged human curation to identify short-form segments in audio signal of an audio track containing spoken content that are identified as "great moments" within the audio signal. The audio track can contain one or more "great moments". The "great moments" can be one or two+ words, a phrase, a sentence, and/or one or more sentences.

Applying a multi-layered ML model to identify different kinds of "great moments", for example "quotable quotes" versus "great comedy moments" versus "surprising facts", and exposing these different kinds of "great moments" as being "from" uniquely identified artificial intelligence (AI) "personas" in the app or program. Different personas as used in the present disclosure means "different content-selecting personalities", and not the traditional AI "bots" that pretend to be humans and try to have conversations with you and typically are used to screen you from getting through to an actual human.

Optionally Creating visually unique multi-sensory "Marbyl" objects (e.g., one or more visual elements associated with one or more words or "great moments") associated with the "great moments". The optional "Marbyl" objects can include one or more colors, textures, pictures of one or more objects, text, etc.

Applying focused topic segmentation algorithms to identify the "topical context" of each "great moment" and/or optional Marbyl—that is, the extended conversation topic within which the "great moment" and/or optional Marbyl moment took place—and exposing this expanded context within the software application or program.

Using ML-generated content to jumpstart social network interactions around "great moments". The "great moments" can be shared with others, added to favorites of a user so that other following the user can view the saved "great moments", optional Marbyls, etc.

Creating a social network based around these short-form, visually unique "great moments" and/or optional Marbyls within podcast content and/or other audio content which are identified by ML algorithms and/or other users of the social network.

Creating a social network based around short-form podcast moments that combines ML-generated and user-generated podcast-centric content and/or other audio-centric content in a seamless and appealing way.

Providing a technique for integrating longform podcast audio, transcripts, "great moments" and/or optional Marbyls to facilitate in the rapid navigation through otherwise unwieldy longform podcast content and/or other audio content, as well as providing the ease of finding specific information within longform podcast episodes and/or other audio content.

Using ML-based Named Entity Recognition algorithms that are applied to podcast and/or other audio content to create a network of interconnected short-form content objects, "great moments", optional Marbyls, and Named Entity profile pages, and also allow Named Entities to be "followed", facilitating in the deep exploration and discovery of new podcasts and personalities.

Providing a method that automates the creation and updating of machine learning (ML) models specific to identifying "great moments" within audio transcriptions. This device and process builds and trains new models, checks their accuracy against existing models, and deploys more accurate models into use. Each model deployed into production adds input to the training data corpus for the following iteration of models.

A method for construction of multi-sentence moments ("great moments") from audio transcriptions. This method identifies the most interesting moments (e.g., "great moments") and a center point and expands forward and backward in the transcription stopping when the predicted level of interest falls below a given threshold.

Allowing users to include additional "great moments" and/or optional Marbyls to be saved on a user's app and/or shared with others.

In accordance with another and/or alternative non-limiting aspect of the present disclosure, there is provided a method for packaging audio content to facilitate searching and sharing of sent audio content. The method includes, with a segmentation module, dividing an audio signal of an audio track containing spoken content and having a runtime into at least one audio segment. The method further includes generating an indexed audio segment by associating the at least one audio segment with at least one textural element. Using AI to identify one or more "great moments" in the one or more textural elements. Optionally pairing at least one visual asset with the indexed audio segment.

In accordance with another and/or alternative non-limiting aspect of the present disclosure, there is provided a content system for platform-independent generation of "great moments". The system includes a central computer system including a processor and a memory in communication with the processor, the memory storing instructions which are executed by the processor. The system further includes an audio segmenting subsystem including an audio resource containing at least one audio track, the audio segmenting subsystem configured to divide an audio track from the audio resource into at least one audio segment and generate an indexed audio segment using AI to generate one or more "great moments". The system can be optionally configured to associate at least one audio segment with at least one audio textual element to create a Marbyl, wherein the at least one audio textual element relates to a spoken content captured within the audio track. The content system optionally includes a visual subsystem including a video resource storing at least one visual asset, the visual subsystem configured to generate an indexed visual asset by associating at least one visual textual element to the at least one visual asset. The content system is optionally configured to generate a packaged audio segment by associating the indexed audio segment with the indexed visual asset.

In accordance with another and/or alternative non-limiting aspect of the present disclosure, there is provided a system for optional platform-independent visualization of audio content. The system includes a central computer system that includes a processor, a network interface in communication with the processor, and memory in communication with the processor. The memory stores instructions which are executed by the processor to search for at least one podcast responsive to a search request received via an associated computer network, determine at least one keyword in the at least one podcast from the audio content therein, wherein the at least one keyword is identified via voice recognition. The system is configured to optionally identify at least one image corresponding to the determined at least one keyword in an associated database, generating a visualization of the podcast utilizing the at least one identified image, and communicate, via the network interface, the visualized podcast in response to the search request to a user device via the associated computer network.

In accordance with another and/or alternative non-limiting aspect of the present disclosure, there is provided a system for creating multimedia moments from audio data, which system includes (a) a server comprising one or more processors; (b) a model database configured to store a plurality of moment models, wherein each moment model of the plurality of moment models is configured to identify a unique moment type, and wherein the plurality of moment models optionally comprises a base moment model; and (c) a transcript database configured to store a plurality of transcript datasets, wherein each transcript dataset of the plurality of transcript datasets comprises text derived from corresponding audio data and is time indexed to the corresponding audio data; and wherein the one or more processors are configured to: (i) receive a new episode audio dataset; (ii) create a transcript dataset based on the new episode audio dataset, and add the transcript dataset to the plurality of transcript datasets; (iii) determine whether the plurality of moment models comprises a focused moment model for the new episode audio dataset, and use the focused moment model as a selected moment model; (iv) determine where the focused moment model is within the plurality of moment models, and use the base moment model as the selected moment model; (v) analyze the transcript dataset using the selected moment model to identify a plurality of moments within the transcript dataset, and wherein the plurality of moments comprises a set of positive moments that are of high relevance to the unique moment type; (vi) for at least one positive moment of the set of positive moments, create a multimedia moment based on that positive moment, wherein the multimedia moment comprises a transcript text from the transcript dataset that corresponds to that positive moment, an audio segment from the new episode audio dataset that corresponds to the transcript text, and a moment type that describes the unique moment type associated with that positive moment; and/or (vii) cause a user interface that is based on the multimedia moment to display on a user device. The system can optionally include a plurality of moments that includes a set of negative moments that are of low relevance to the unique moment. Each moment model of the plurality of moment models can be optionally associated with a training dataset that is used to create that moment model. The one or more processors can be optionally configured to (i) add the set of positive moments to the training dataset associated with the selected moment model as positive examples; and/or (ii) add the set of negative moments to the training dataset associated with the selected moment model as negative examples. The one or more processors can optionally be configured to (i) track changes to the training dataset of the selected moment model since the selected moment model was last created; and/or (ii) when the extent of changes exceeds a configured threshold, create an updated moment model based upon the training dataset. The one or more processors can optionally be configured to, after creating the updated moment model (i) analyze an evaluation dataset with the updated moment model to produce a first evaluation result; (ii) analyze the evaluation dataset with the selected moment model to produce a second evaluation result; and/or (iii) replace the selected moment model with the updated moment model based upon a comparison of the first evaluation result to the second result.

In accordance with another and/or alternative non-limiting aspect of the present disclosure, there is provided a system for creating multimedia moments from audio data, wherein the user interface based on the multimedia moment optionally comprises a control usable to provide a user feedback to the server, wherein the processor is further configured to (i) receive the user feedback, wherein the user feedback comprises an indication of whether a user of the user device agrees that the multimedia moment is of high relevance to the unique moment type; and/or (ii) update the training dataset based upon the user feedback. The user interface optionally includes (a) an audio control usable to play the audio segment on the user device; (b) a visual indicator based on the moment type; and/or (c) the transcript text.

In accordance with another and/or alternative non-limiting aspect of the present disclosure, there is provided a system for creating multimedia moments from audio data, wherein the multimedia moment optionally comprises a full episode audio from the new episode audio dataset and a full transcript text from the transcript dataset, and wherein the user interface optionally comprises (a) an audio control usable to play the full episode audio on the user device; (b) a visual indicator based on the moment type, wherein the visual indicator is usable to cause the portion of the full episode audio that corresponds to the audio segment to play on the user device; and/or (c) the full transcript text, wherein the full transcript text is configured to display on the user device with (i) a first visual characteristic that identifies the transcript text, within the full transcript text, as being associated with the moment type; and/or (ii) a second visual characteristic that identifies a portion of the full transcript text that corresponds to a portion of the full episode audio that is currently playing on the user device.

In accordance with another and/or alternative non-limiting aspect of the present disclosure, there is provided a system for creating multimedia moments from audio data, wherein the audio control is optionally configured to display as a timeline that corresponds to the full episode audio, and/or wherein the visual indicator is optionally configured to visually indicate the position of the audio segment within the timeline.

In accordance with another and/or alternative non-limiting aspect of the present disclosure, there is provided a system for creating multimedia moments from audio data, wherein the one or more processors are optionally configured to, when causing the user interface to display on the user device (i) receive a set of user preferences from the user device, wherein the set of user preferences identify one or more topics of interest; (ii) identify a plurality of multimedia moments based on the set of user preferences; and/or (iii) cause the user interface to display on the user device based on the plurality of multimedia moments, wherein the user interface includes, simultaneously for each of the plurality of multimedia moments, display of (A) an audio control usable to play the audio segment for that multimedia moment on the user device; (B) a visual indicator based on the moment type for that multimedia moment; and/or (C) the transcript text for that multimedia moment.

In accordance with another and/or alternative non-limiting aspect of the present disclosure, there is provided a system for creating multimedia moments from audio data, wherein the user interface optionally includes a control usable to share the multimedia moment to a third party platform, wherein the one or more processors are optionally configured to (i) create a publicly accessible destination for the multimedia moment; (ii) determine one or more third party platforms on which the publicly accessible destination can be shared; (ii) identify a set of static components in the new episode audio dataset, and incorporate the set of static components into the publicly accessible destination based on the one or more third party platforms; and/or (iii) generate a set of dynamic components based on the new episode audio dataset, and incorporate the set of dynamic components into the publicly accessible destination based on the one or more third party platforms; and, wherein the publicly accessible destination is optionally configured to, when viewed by a second user device via the one or more third party platforms, cause an embedded user interface to display on the second user device, wherein the embedded user interface includes (a) an audio control usable to play the audio segment on the second user device; (b) a visual indicator based on the moment type; and/or (c) the transcript text.

In accordance with another and/or alternative non-limiting aspect of the present disclosure, there is provided a system for creating multimedia moments from audio data, wherein each of the plurality of moment models is optionally associated with a model type, wherein model types for the plurality of moment models are optionally organized based on a hierarchy, and wherein the one or more processors are optionally configured to, when determining whether the plurality of moment models comprise the focused moment model (i) identify a set of episode characteristics in the new episode audio dataset; (ii) search the plurality of moment models to identify a favored moment model based on the set of episode characteristics, the model types, and the hierarchy; and/or (iii) where the favored moment model is identifiable within the plurality of moment models, use the favored moment model as the focused moment model. A set of possible model types optionally includes a podcast-specific type, a genre type, and/or a sub-genre type, and wherein the hierarchy is optionally configured to use, as the favored moment model, the first available of (i) first, a podcast-specific model, if present in the plurality of moment models; (ii) second, a sub-genre specific model, if present in the plurality of moment models; and/or (iii) third, a genre specific model, if present in the plurality of moment models.

In accordance with another and/or alternative non-limiting aspect of the present disclosure, there is provided a system for creating multimedia moments from audio data, wherein (a) the plurality of moments includes a set of negative moments that are of low relevance to the unique moment; (b) each moment model of the plurality of moment models is associated with a training dataset that is used to create that moment model; and/or (c) the one or more processors are further configured to (i) add the plurality of moments to the training dataset associated with the selected moment model; (ii) identify a partial training dataset for a potential moment model that has not yet been created, and that is associated with the selected moment modal as a sub-type of the unique moment type; (iii) add the plurality of moments to partial training dataset for the potential moment model; (iv) when the content of the partial training dataset exceeds a configured threshold, create the potential moment model based on the partial training dataset; and/or (v) add the potential moment model to the plurality of moment models with the sub-type as the unique moment type.

In accordance with another and/or alternative non-limiting aspect of the present disclosure, there is provided a method for creating multimedia moments from audio data comprising, with one or more processors (a) storing a plurality of moment models, wherein each moment model of the plurality of moment models is configured to identify a unique moment type, wherein the plurality of moment models comprises a base moment model; (b) storing a plurality of transcript datasets, wherein each transcript dataset of the plurality of transcript datasets comprises text derived from corresponding audio data and is time indexed to the corresponding audio data; (c) receiving a new episode audio dataset, and creating a transcript dataset based on the new episode audio dataset; (d) determining whether the plurality of moment models comprises a focused moment model for the new episode audio dataset, and using the focused moment model as a selected moment model; (e) where the focused moment model is not within the plurality of moment models, using the base moment model as the selected moment model; (f) analyzing the transcript dataset using the selected moment model to identify a plurality of moments within the transcript dataset, wherein the plurality of moments comprises a set of positive moments that are of high relevance to the unique moment type; (g) for at least one positive moment of the set of positive moments, creating a multimedia moment based on that positive moment, wherein the multimedia moment comprises a transcript text from the transcript dataset that corresponds to that positive moment, an audio segment from the new episode audio dataset that corresponds to the transcript text, and a moment type that describes the unique moment type associated with that positive moment; and/or (h) causing a user interface that is based on the multimedia moment to display on a user device.

In accordance with another and/or alternative non-limiting aspect of the present disclosure, there is provided a method for creating multimedia moments from audio data, wherein (a) the plurality of moments optionally comprises a set of negative moments that are of low relevance to the unique moment; and/or (b) each moment model of the plurality of moment models is associated with a training dataset that is used to create that moment model; and wherein the method optionally further includes (i) adding the set of positive moments to the training dataset associated with the selected moment model as positive examples; (ii) adding the set of negative moments to the training dataset associated with the selected moment model as negative examples; (iii) tracking changes to the training dataset of the selected moment model since the selected moment model was last created; and/or (iv) when the extent of changes exceeds a configured threshold, creating an updated moment model based upon the training dataset. In one non-limiting arrangement, an updated moment model is only created if the accuracy and recall of the updated model are greater than the moment model currently in use.

In accordance with another and/or alternative non-limiting aspect of the present disclosure, there is provided a method for creating multimedia moments from audio data, wherein the user interface based on the multimedia moment optionally comprises a control usable to provide a user feedback to the server, and the method also optionally includes (i) receiving the user feedback, wherein the user feedback comprises an indication of whether a user of the user device agrees that the multimedia moment is of high relevance to the unique moment type; and/or (ii) updating the training dataset based upon the user feedback.

In accordance with another and/or alternative non-limiting aspect of the present disclosure, there is provided a method for creating multimedia moments from audio data, wherein the user interface optionally comprises (a) an audio control usable to play the audio segment on the user device; (b) a visual indicator based on the moment type; and/or (c) the transcript text.

In accordance with another and/or alternative non-limiting aspect of the present disclosure, there is provided a method for creating multimedia moments from audio data, wherein the multimedia moment optionally further comprises a full episode audio from the new episode audio dataset and a full transcript text from the transcript dataset, and wherein the user interface comprises (a) an audio control usable to play the full episode audio on the user device; (b) a visual indicator based on the moment type, wherein the visual indicator is usable to cause the portion of the full episode audio that corresponds to the audio segment to play on the user device; and/or (c) the full transcript text, wherein the full transcript text is optionally configured to display on the user device with (i) a first visual characteristic that identifies the transcript text, within the full transcript text, as being associated with the moment type; and/or (ii) a second visual characteristic that identifies a portion of the full transcript text that corresponds to a portion of the full episode audio that is currently playing on the user device.

In accordance with another and/or alternative non-limiting aspect of the present disclosure, there is provided a method for creating multimedia moments from audio data, wherein each of the plurality of moment models is optionally associated with a model type, wherein model types for the plurality of moment models are optionally organized based on a hierarchy, the method optionally further comprises, when determining whether the plurality of moment models comprise the focused moment model (i) identifying a set of episode characteristics in the new episode audio dataset; (ii) searching the plurality of moment models to identify a favored moment model based on the set of episode characteristics, the model types, and the hierarchy; and/or (iii) where the favored moment model is identifiable within the plurality of moment models, using the favored moment model as the focused moment model.

In accordance with another and/or alternative non-limiting aspect of the present disclosure, there is provided a system for creating multimedia moments from audio data comprising (a) a server comprising one or more processors; (b) a model database configured to store a plurality of moment models, wherein each moment model of the plurality of moment models is configured to identify a unique moment type, wherein the plurality of moment models comprises a base moment model; and/or (c) a transcript database configured to store a plurality of transcript datasets, wherein each transcript dataset of the plurality of transcript datasets comprises text derived from corresponding audio data and is time indexed to the corresponding audio data; wherein the one or more processors are configured to (i) receive a new episode audio dataset; (ii) create a transcript dataset based on the new episode audio dataset, and add the transcript dataset to the plurality of transcript datasets; (iii) determine whether the plurality of moment models comprises two or more focused moment models for the new episode audio dataset, and use the two or more focused moment models as a selected moment model; (iv) where the two or more focused moment model are not within the plurality of moment models, use the base moment model as the selected moment model; (v) analyze the transcript dataset using the selected moment model to identify a plurality of moments within the transcript dataset, wherein the plurality of moments comprises a set of positive moments that are of high relevance to the unique moment type or the unique moment types of the selected moment model; (vi) for at least one positive moment of the set of positive moments, create a multimedia moment based on that positive moment, wherein the multimedia moment comprises a transcript text from the transcript dataset that corresponds to that positive moment, an audio segment from the new episode audio dataset that corresponds to the transcript text, and a moment type that describes the unique moment type associated with that positive moment; and/or (vii) cause a user interface that is based on the multimedia moment to display on a user device.

One non-limiting object of the disclosure is the provision of applying ML algorithms to identify short-form segments that are "great moments" within podcasts or other audio content.

In another and/or alternative non-limiting object of the disclosure is the provision of applying a multi-layered ML model to identify different kinds of "great moments", and exposing these different kinds of "great moments" as being "from" uniquely identified AI "curators" in the app.

In another and/or alternative non-limiting object of the disclosure is the provision of optionally creating one or more visually unique multi-sensory "Marbyl" objects associated with one or more "great moments".

In another and/or alternative non-limiting object of the disclosure is the provision of applying topic segmentation algorithms to identify the "topical context" of each "great moment" and/or optional Marbyl) and exposing this expanded context within the software application.

In another and/or alternative non-limiting object of the disclosure is the provision of using ML-generated content to facilitate in social network interactions around podcast or other audio moments.

In another and/or alternative non-limiting object of the disclosure is the provision of creating a social network based around "great moments" within podcast or other audio content which are identified by machine learning algorithms and/or other users of the social network.

In another and/or alternative non-limiting object of the disclosure is the provision of creating a social network based around "great moment" that combines ML-generated and/or user-generated podcast-centric content.

In another and/or alternative non-limiting object of the disclosure is the provision of providing a technique for integrating longform podcast audio, transcripts, "great moments" and/or optional Marbyls to facilitate navigation through podcast or other audio content.

In another and/or alternative non-limiting object of the disclosure is the provision of providing a technique for easily finding specific information within longform podcast or other audio content.

In another and/or alternative non-limiting object of the disclosure is the provision of using ML-based named entity recognition algorithms to create a network of interconnected shortform content objects such as "great moments" and/or Marbyls to facilitate exploration and discovery of audio content and personalities.

In another and/or alternative non-limiting object of the disclosure is the provision of a method for packaging audio content by an audio content system to facilitate searching and sharing of the audio content, wherein the audio track is a podcast.

In another and/or alternative non-limiting object of the disclosure is the provision of a method for packaging audio content by an audio content system to facilitate searching and sharing of the audio content, wherein the segmentation module is configured to divide the audio signal based on the content contained within the audio track.

Another non-limiting object of the disclosure is the provision of a method for packaging audio content by an audio content system to facilitate searching and sharing of the audio content, wherein each audio segment is defined by a start time and end time, each of the start time and end time corresponding to the runtime of the audio track.

Another non-limiting object of the disclosure is the provision of a method for packaging audio content by an audio content system to facilitate searching and sharing of the audio content, wherein the start time and end time of each audio segment is generated by a user via one of a software application and dedicated hardware device.

Another non-limiting object of the disclosure is the provision of a method for packaging audio content by an audio content system to facilitate searching and sharing of the audio content, wherein a voice recognition module is configured to convert the content contained within the audio to an audio text and the segmentation module divides the audio signal into the at least one audio segment based on keywords derived from the audio text.

Another non-limiting object of the disclosure is the provision of a method for packaging audio content by an audio content system to facilitate searching and sharing of the audio content, wherein a voice recognition module is configured to extract keywords directly from the content contained within the audio signal wherein the segmentation module divides the audio signal based on the extracted keywords.

Another non-limiting object of the disclosure is the provision of a method for packaging audio content by an audio content system to facilitate searching and sharing of the audio content, wherein the at least one textual element is one of a keyword, meta-tag, descriptive copy and title.

Another non-limiting object of the disclosure is the provision of a method for packaging audio content by an audio content system to facilitate searching and sharing of the audio content, wherein a voice recognition module is configured to convert the content contained within the audio to an audio text and wherein the at least one textual element is derived from the audio text.

Another non-limiting object of the disclosure is the provision of a method for packaging audio content by an audio content system to facilitate searching and sharing of the audio content, wherein a voice recognition module is configured to extract the at least one textual element directly from the content contained within the audio signal.

Another non-limiting object of the disclosure is the provision of a method for packaging audio content by an audio content system to facilitate searching and sharing of the audio content, wherein the at least one visual asset is one of an image, photograph, video, cinemograph, video loop, and/or collage.

Another non-limiting object of the disclosure is the provision of a method for packaging audio content by an audio content system to facilitate searching and sharing of the audio content, wherein the at least one visual asset is paired with an audio segment based on the at least one textual element associated with the audio segment.

Another non-limiting object of the disclosure is the provision of a method for packaging audio content by an audio content system to facilitate searching and sharing of the audio content, wherein the at least one visual asset is associated with an asset tag, and the at least one visual asset is associated with an audio segment based on a match between the at least one textual element and the asset tag.

Another non-limiting object of the disclosure is the provision of a method for packaging audio content by an audio content system to facilitate searching and sharing of the audio content, further comprising electronically sharing the packaged audio content.

Another non-limiting object of the disclosure is the provision of a method for packaging audio content by an audio content system to facilitate searching and sharing of the audio content, further comprising storing the indexed audio segment in an associated database.

Another non-limiting object of the disclosure is the provision of a method for packaging audio content by an audio content system to facilitate searching and sharing of the audio content, wherein the at least one visual asset is selected from an associated database of stored visual assets.

Another non-limiting object of the disclosure is the provision of a content system for platform-independent visualization of audio content. The system comprises a central computer system comprising i) a processor; ii) a memory in communication with the processor, the memory storing instructions which are executed by the processor; iii) an audio segmenting subsystem including an audio resource containing at least one audio track, the audio segmenting subsystem configured to divide the at least one audio track into at least one audio segment and generate an indexed audio segment by associating the at least one audio segment with at least one audio textual element, wherein the at least one audio textual element relates to a spoken content captured within the audio track; and iv) a visual subsystem including a video resource storing at least one visual asset, the visual subsystem configured to generate an indexed visual asset by associating at least one visual textual element to the at least one visual asset, and wherein the content system is configured to generate a packaged audio segment by associating the indexed audio segment with the indexed visual asset.

Another non-limiting object of the disclosure is the provision of a content system for platform-independent visualization of audio content, wherein the at least one audio textual element and at least one visual textual element is selected from the group consisting of meta tag, keyword, title, and/or descriptive copy.

Another non-limiting object of the disclosure is the provision of a content system for platform-independent visualization of audio content, further comprising a network interface in communication with a network, wherein the network interface is configured to share the packaged audio segment with at least one other device located on the network.

Another non-limiting object of the disclosure is the provision of a system for platform-independent visualization of audio content. The system comprises a central computer system comprising a) a processor, b) a network interface in communication with the processor, and c) memory in communication with the processor, the memory storing instructions which are executed by the processor to i) search for at least one audio track responsive to a search request received via an associated computer network, ii) determine at least one keyword in the at least one audio track from the audio content therein, wherein the at least one keyword is identified via voice recognition, iii) identify at least one visual asset corresponding to the determined at least one keyword in an associated database, and iv) generate a visualization of the audio track utilizing the at least one identified image, and d) communicate, via the network interface, the visualized audio track in response to the search request to a user device via the associated computer network.

Another non-limiting object of the disclosure is the provision of user interface that may be presented to a user of the system when listening to a podcast episode, and which includes a timeline control for navigating to and listening to portions of the podcast, and an initial topical segmentation of the podcast which may depend on a classification of the podcast by genre (e.g., sports; news; comedy; a true crime podcast; etc. that might be segmented into dynamic segments or pre-configured segments [e.g., for a true crime podcast the segments could include covering the crime, the investigation, a breakthrough in the investigation, an arrest, and a trial].

Another non-limiting object of the disclosure is the provision of user interface that presents one or more automatically identified moments that are visually highlighted by icons, which may be selected by a user to automatically navigate to and listen to that moment.

Another non-limiting object of the disclosure is the provision of user interface that presents one or more automatically identified moments that may be visually presented to indicate it is of general interest (e.g., by color, symbol, shape, text, or other visual characteristic), while a second automatically identified moment (306) is visually presented to indicate is an interesting moment (e.g., comedic moment; crime moment; news moment; etc.).

Another non-limiting object of the disclosure is the provision of user interface that presents one or more automatically identified moments wherein users of the system may also manually identify moments, and share those moments with friends, followers, or other users on the platform.

Another non-limiting object of the disclosure is the provision of user interface that presents one or more automatically identified moments which may be visually presented to indicate that it has been identified by another user as an interesting moment.

Another non-limiting object of the disclosure is the provision of user interface that presents one or more automatically identified moments may include a photograph of a person or an image of an avatar associated with the creating user, and may also include additional visual characteristics defined by that user (e.g., the user may provide a brief description of why they marked it, or may include a manual identification of the moment as an interesting moment.

Another non-limiting object of the disclosure is the provision of user interface that shows a multi-podcast interface, and allows a user to interact with in order to view a plurality of podcasts, play audio from a podcast, navigate within a podcast timeline, and click on automatically identified moments within one of a the plurality of podcasts to listen to the automatically or manually identified moment within that podcast.

Another non-limiting object of the disclosure is the provision of user interface that shows a multi-podcast interface wherein the plurality of displayed podcasts may have one or more marked moments that may be selected to listen to that audio moment by itself, or within the context of the complete audio podcast.

Another non-limiting object of the disclosure is the provision of user interface that presents one or more automatically identified moments that may be displayed along with comments from users that have manually marked the moment, and/or may be displayed with text transcribed from the audio content underlying the moment, and/or other information.

Another non-limiting object of the disclosure the platform and interfaces may also include controls and features to enable users to share moments and related information to one or more social media platforms or other channels.

Another non-limiting object of the disclosure is the provision of user interface that presents one or more automatically identified moments that may be displayed with an icon, which may be statically associated with the podcast and/or episode, or may dynamically select an icon based on the podcasts and/or episode genre or other characteristic.

Another non-limiting object of the disclosure is the provision of user interface that presents one or more automatically identified moments and wherein one or more moments may also include transcript text from the shared moment.

Another non-limiting object of the disclosure is the provision of user interface that presents one or more automatically identified moments wherein the moment may be displayed with static content that describes the podcast and/or episode, and may include the podcast title, episode title, author, episode length, and other details.

Another non-limiting object of the disclosure is the provision of user interface that presents one or more automatically identified moments wherein the moment may include icons and/or text identifying the type of one or more moments that are associated with the shared moment and/or the underlying episode.

Another non-limiting object of the disclosure is the provision of user interface that presents one or more automatically identified moments wherein the moment may include an interactive play button that allows the moment to play from an embedded element within the target platform, or may include a link that may be clicked to navigate to the generated destination link, or both.

Another non-limiting object of the disclosure is the provision of a system that can manually and/or automatically generate identified moments. Manual identification of moments may be based upon administrator and/or platform user feedback and curation. Automated moments may be reliably performed using a multi-model analysis and management pipeline ("MAMP"). The MAMP can include a base model that is configured to identify generally interesting moments within a podcast, without regard to the podcasts specific genre, sub-genre, or other category. The base model can be configured to evaluate an episode and identify a plurality of the most interesting moments and a plurality of the least interesting moments within the podcast.

Another non-limiting object of the disclosure, when automatically identifying moments, the system may, for each podcast episode audio as input, use the most granular model available for analysis, or may use a combination of two or more models for analysis.

Another non-limiting object of the disclosure, when automatically identifying moments, the system may, be configured with certain thresholds for each of the training datasets that, when exceeded, cause the system to create an updated model or a brand new model based upon the updated training dataset, and/or the system may provide some or all of the maximally relevant moments to users via interfaces.

These and other advantages will become apparent from the discussion of the distinction between the invention and the prior art and when considering the preferred embodiment shown in the accompanying drawings.

BRIEF DESCRIPTION OF THE DRAWINGS

The subject disclosure may take form in various components and arrangements of components, and in various steps and arrangement of steps. The drawings are only for purposes of illustrating the preferred embodiments and are not to be construed as limiting the subject disclosure.

DETAILED DESCRIPTION OF NON-LIMITING EMBODIMENTS

Figure 1:
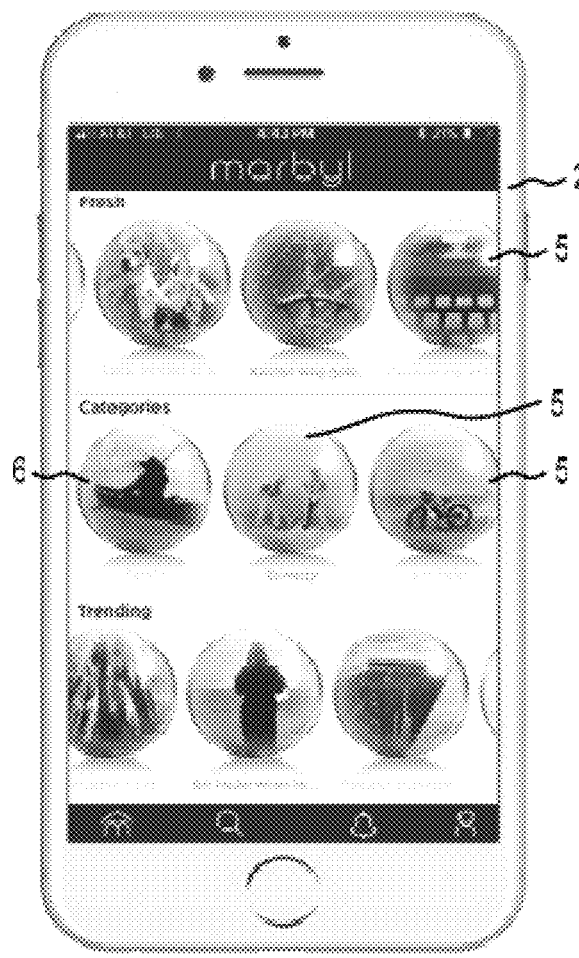
FIG. 1 illustrates an exemplary user device with a home screen display of a software application for searching visual assets associated with an audio segment of audio content in accordance with one embodiment of the subject application

A more complete understanding of the articles/devices, processes and components disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any unavoidable impurities that might result therefrom, and excludes other ingredients/steps.

The exemplary embodiments are described herein with reference to preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

One or more implementations of the subject application will now be described with reference to the attached figures, wherein like reference numerals are used to refer to like elements throughout.

Transforming Audio into Visual-Topical Segments

A visualized audio platform segments digital audio discussion and spoken narrative (audio tracks) into complete thematically unified thoughts, or "audio segments" and matches and/or optimizes those audio segments with metatags and/or keyword-rich text based on its core subject, and/or identify "great moments". Each enhanced ("indexed") audio segment can be optionally paired with at least one visual asset that complements its core topic, creating a packaged visualized audio segment. Users can search for indexed audio segments associated with a visual asset and/or "great moment" that are relevant to them, or browse recommended indexed audio segments associated with a visual asset and/or "great moment" based on the user's interests and/or listening history. "Topical audio segmenting" of audio content may optionally include a human-curated process of identifying themes, "great moments" and/or topic changes within a spoken narrative. Each topical audio segment can optionally be associated with a contextually paired visual asset that represents or enhances the topic being discussed during that specific segment of audio narrative. Topical audio segments are distinct elements that can play, link back to that segment of audio within the larger narrative, and connect sponsors and written content to expand and complement the narrative being told in that topical audio segment. In some embodiments, the optional "visualizing" of audio content involves a human-curated process of selecting a particular visual asset to pair with a topical audio segment of audio, more skillfully and intuitively than a computer can. The analysis of thousands of human-curated indexed audio segments associated with an optional visual asset machine learning algorithms allows for the creation of an expert system and the integration of autonomous technology to streamline the segmenting and visualization processes. Accordingly, the visualized audio platform disclosed herein, is the first audio track platform to generate all audio search results in visual form, allow audio track listeners to navigate content in visual form, and make digital audio topics, buried in long-form content, visible to search engines. Text and images are machine readable, whereas digital audio is not. The audio content system described herein optionally sandwiches text and images with audio content for search engines such as Google® to be able to intelligently "see" it, and for advertisers to be able to penetrate it in relevant ways. Alternatively or additionally, one or more "great moments" are identified from the audio content using machine learning algorithms and optionally user input to enable users to identify content of interest within the audio content, thereby also enabling search engines such as Google® to be able to intelligently "see" it, and for advertisers to be able to penetrate it in relevant ways.

Referring now to one non-limiting embodiment that is associated with the merging audio content with one or more visual assets, there is provided a platform-independent visualization of audio content system that is the first platform to "visualize" audio content. It merges audio content with visual content in a unique way. It creates a new "product" out of digital audio tracks; the first audio platform to work out of advertisers on an Adwords-like and keyword bidding system basis; and the first audio platform to make possible for advertisers to pay for visual sponsorship placement on segments of podcast episodes, or full episodes. Furthermore, the platform-independent visualization of audio content system (i.e., the present visualized audio platform) is the first podcast player to make smart use of the screen on all mobile devices, and to allow for direct click-through to sponsors or their incentives as they are announced during an episode's host-read audio ad spots.

Figure 2:
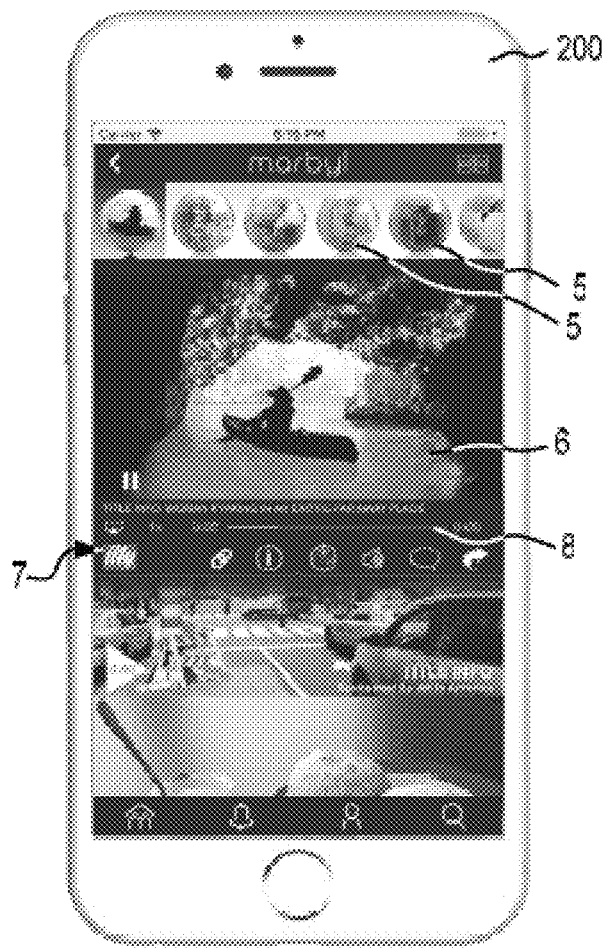
FIG. 2 illustrates an exemplary user device with a home screen display of a software application for playing audio content associated with a visual asset in accordance with one embodiment of the subject application

FIGS. 1-4 and the accompanying description provide a non-limiting overview of an exemplary embodiment of the present visual/audio platform technology and details regarding an implementation of the platform, system and methods will be described in greater detail below. FIGS. 1 and 2 illustrate an exemplary user device, such as a smartphone (200), with a home screen display of a software application for searching visual assets (5) tied to an audio segment of audio content (audio track) in accordance with one embodiment of the subject application. As used herein a "visual asset" is a graphical element including, but not limited to, images, collections of images, videos, and the like. The home screen display presents a plurality of visual assets (5), shown as circular images on the display of the device (200). Users of the platform may scroll through the plurality of visual assets (5) and, upon finding a particular visual asset, e.g., (6), that is appealing, a user may "unwrap" or "play" an associated audio segment (8) (described in greater detail below). That is, a user may select (click or press) a visual asset (6) which opens an audio segment (8) associated with that visual asset (6) inside a media player (7) embedded in an exemplary software platform.

Figure 3:
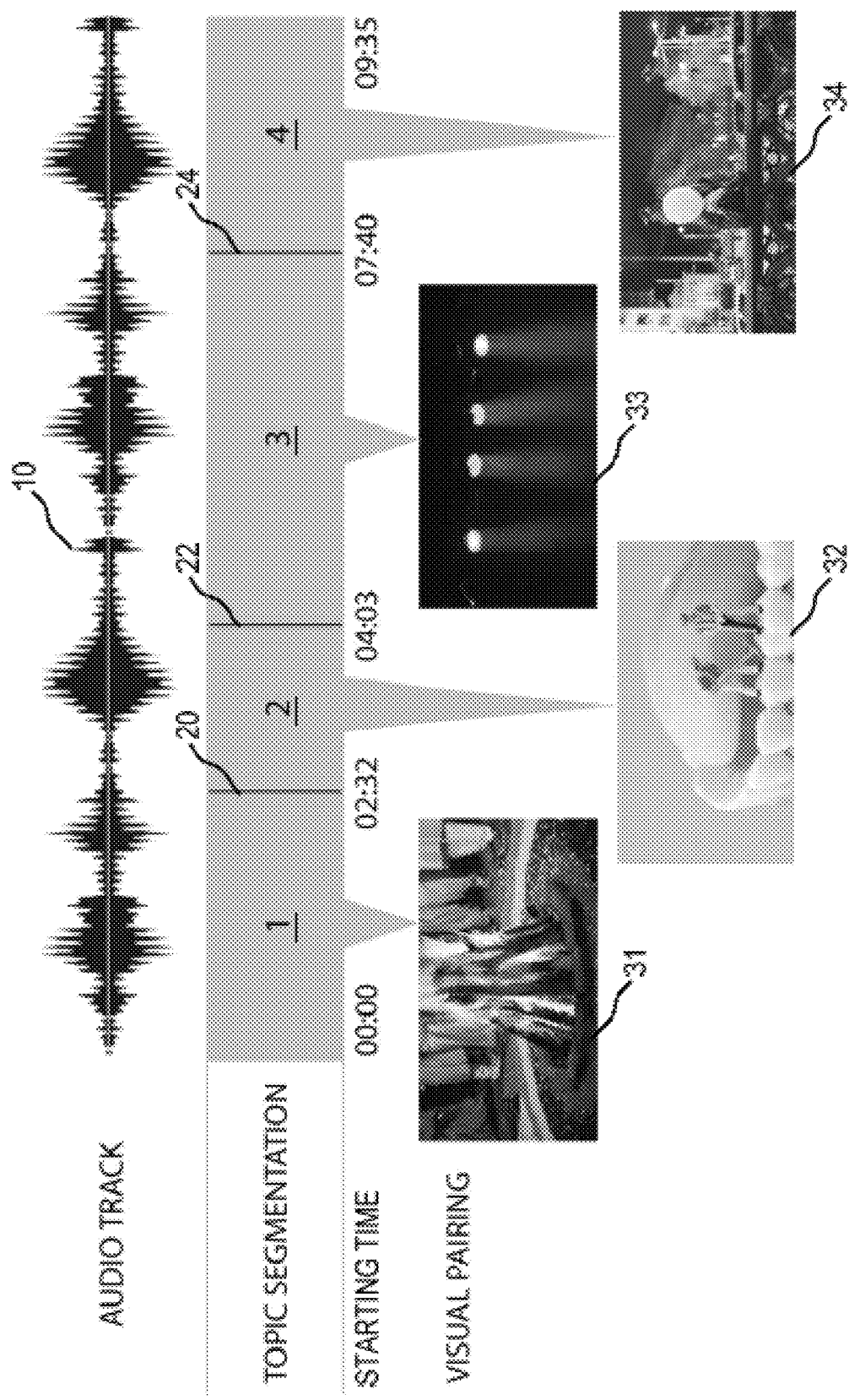
FIG. 3 illustrates an exemplary long-playing audio segment broken down into audio segments in accordance with an exemplary embodiment of the present disclosure.

FIG. 3 illustrates a digital audio track (10) divided into distinct topical audio segments (1, 2, 3, 4). These audio segments (1-4) correspond directly to each topic transition (20, 22, 24), within the larger narrative. In some embodiments, a curator (administrator, software application, and/or dedicated hardware device) reviews the spoken narrative of a digital audio track recording (10) in its entirety. At each topic transition point (20, 22, 24), the starting time of that segment (1-4) is noted and digitally recorded, for example, as described with respect to Equation 1. In some embodiments, each audio segment, such as exemplary segments (1-4), are defined by time zones between one starting point to the next. These time zones serially flow and provide a recipe for the association and display of contextually relevant visual assets (31, 32, 33, 34). These visual assets (31-34) serve to enhance a corresponding audio segments (1-4) of conversation with a visual match or counterpart. In some embodiments, each visual asset is displayed on a user device, such as smartphone (200) of FIG. 1, and timed to coincide along with the audio discussion taking place. It is to be understood that the images associated with visual assets (31-34) are non-limiting, and that any image or graphical element may be used as a visual asset. In some embodiments, audio segments, for example, audio segment (1), relate closely with other audio segments (e.g., audio segment (3) within the same audio track recording (10) such as when the thought on a subject discussed within the digital audio track is "circled back to" and completed at a later time.

Audio segments of this nature are "grouped" and considered part of a "bag" of audio segments. Audio segments that are part of a "bag" may be saved and/or shared, for example in a social network, independently or as a group.

In some embodiments, a human curator may note and/or record secondary "in" and "out" points on an audio segment (1-4), as well as ascribe "fade in" and/or "fade out" transitions on any "audio segment's "secondary" version. These "secondary" versions offer a smoother listening experience when the audio segment (1-4) is heard out of context with its surrounding recording—as in when discovered through a preferred application having a Home page, Search function, or Share feature—eliminating sound disturbances, breaths, swallows, pauses, "overtalking" of two or more people, or anything else determined to diminish its strength potential and/or contextual "completeness" when heard independently and out of original context.

Figure 4:
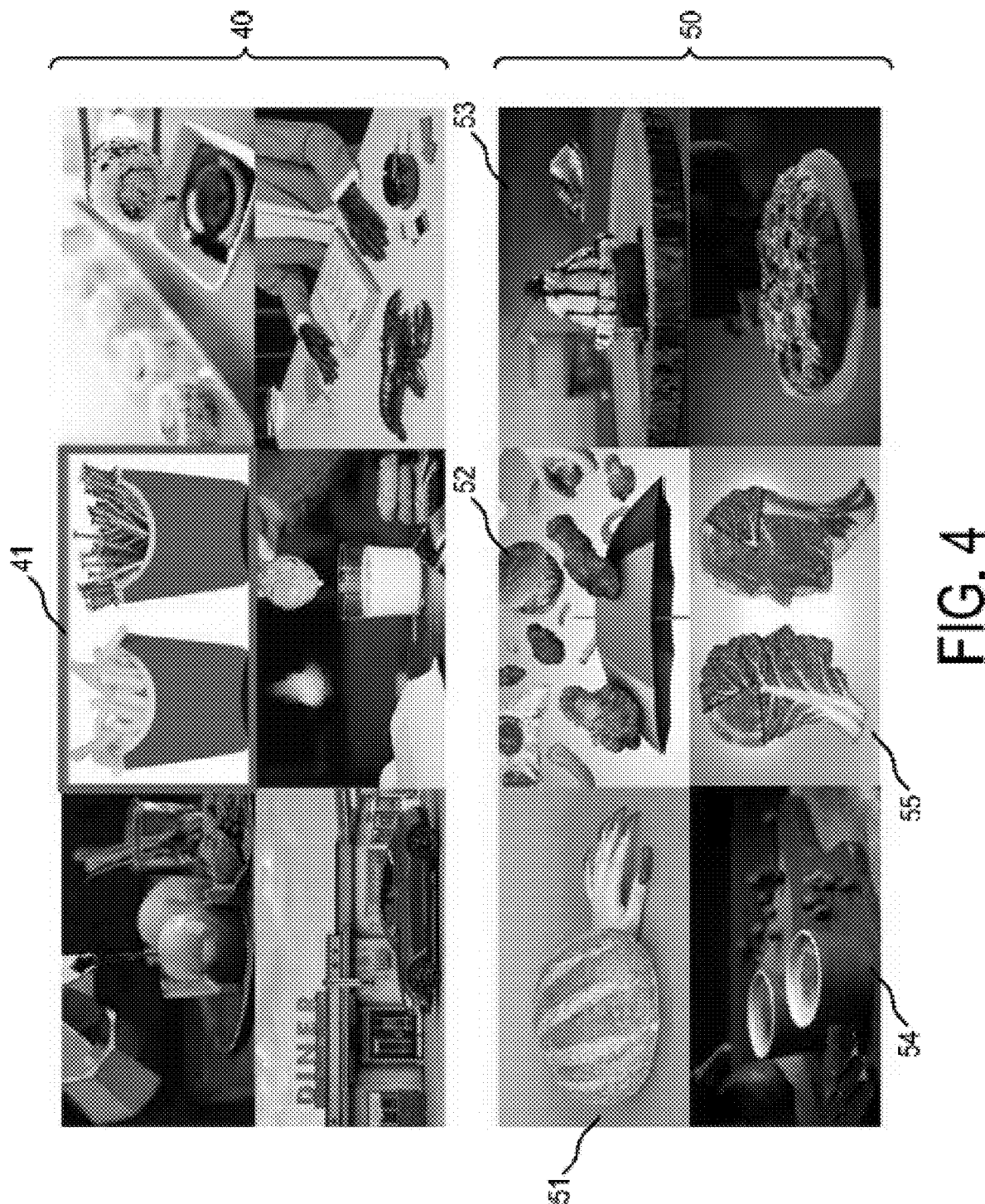
FIG. 4 illustrates an exemplary embodiment of a plurality of visual asset thumbnails that are associated with exemplary audio segments.

Tying visual assets, such as visual assets (31-34) to audio segments, such as segments (1-4), is advantageous for users in searching and finding desired audio content. FIG. 4 illustrates an exemplary embodiment of a plurality of visual asset thumbnails (40) that are associated with audio segments (such as segments (1-4) of FIG. 3)) of an exemplary digital audio track (such as audio track (10) of FIG. 3) about "our relationship with food." A listener/user may become intrigued by a particular visual asset, for example the French fries/nails image (41), and select it within an associated software platform/search engine. The selection may be made by a user input device of an associated computer system or mobile computer device, for example a computer mouse or touch screen as described in detail below with respect to FIGS. 5-6. The selection of a thumbnail, such as thumbnail (41), starts the process of a user "going down the rabbit hole" as afforded by the associated software platform's search and discovery functionality. After the selection of visual asset thumbnail (41), the listener/user is presented, within the platform, a whole new grouping of audio segments represented by associated visual assets (50). For example, in selecting the French fry/nails image (41) of the audio track about "our relationship with food," the listener/user is presented with visual assets of audio segments on the subject of "food and consequences". That is, the user is presented with the exemplary grouping of visual assets (50), imagery related to discussions in audio form on, for example, the topics of gluten and its effect on our health (51), fast food (52), refined sugar and diabetes (53), cholesterol management (54), and whether or not to eat meat (55). In other words, the user of the software platform has the option to explore related information, audio and visuals, in such a manner, selecting visual assets associated with an audio segment, that he/she has discovered in order to preview it, and then from preview mode he/she may opt to select it one more time in order to hear the audio content "behind" it, at which point that audio then overrides the audio he/she has been listening to as he/she took the journey he/she just did to arrive at the new audio. In some embodiments, a user also has the option to "bookmark" content as he/she finds it that he/she would like to listen to later, without having to override the audio he/she is listening to at the time. The more a listener listens, and the more things he/she bookmarks, the more a learning algorithm, embedded in the software platform, learns about the listener's behaviors and/or interests. The learning algorithm may then generate suggested content for the listener in an intelligent way.

According to another embodiment, the visualized audio content platform is able to expand the reach of audio content because of its extraction of topics from within long-form audio track. As an example, in light of an upcoming major sporting event, the host of a sports podcast decides to, thirty minutes into his show, share some tips on how to prepare the chicken wings. The system (100), described in greater detail below, separates out the dialogue regarding the preparation of chicken wings, defining it as a stand-alone "topical audio segment". A visual asset related to food is tied to the topical audio segment. The packaged visual asset and chicken wing audio segment are presented as a package to users on a software platform. A person that is interested in food, but not sports, is now able to search, find and listen to the chicken wing audio segment, and likely would have never stumbled upon the chicken wing recipe but for receiving through a social share or web search of this chicken wing audio segment, extrapolated contextually from the audio show (podcast) that "housed" or "hid" it.

Figure 5:
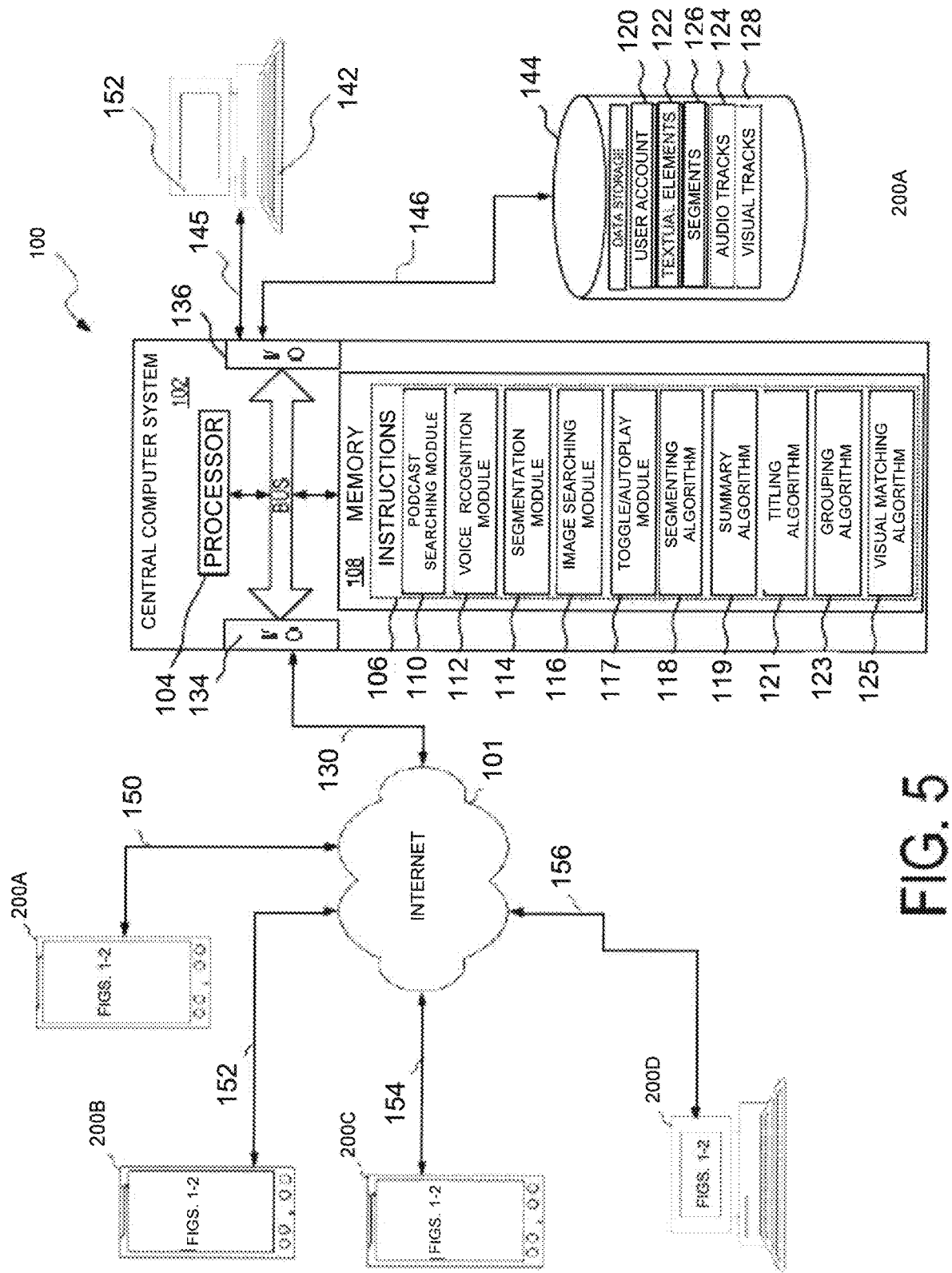
FIG. 5 is a functional block diagram of a system for platform-independent visualization of audio content in accordance with one aspect of the exemplary embodiment.

Referring now to FIG. 5, there is shown a system (100) configured for providing platform-independent visualization of audio content. As used herein, "platform-independent" means that the platform may be adopted for use across different and/or multiple platforms and/or operating systems as known by those of skill in the art. It will be appreciated that the various components depicted in FIG. 5 are for purposes of illustrating aspects of the exemplary embodiment, and that other similar components, implemented via hardware, software, or a combination thereof, are capable of being substituted therein.

As shown in FIG. 5, the system (100) includes a central system represented generally as the central computer system (102), which is capable of implementing the exemplary method described below. The exemplary computer system (102) includes a processor (104), which performs the exemplary method by execution of processing instructions (106) that are stored in memory (108) connected to the processor (104), as well as controlling the overall operation of the computer system (102).

The instructions (106) include a podcast searching module (110) configured to receive, keywords and associated information to conduct a search for audio tracks (124) (e.g., podcasts) corresponding to a search request received from an associated user of the user devices (200A-200D). It will be appreciated by those skilled in the art that the term "podcast" as used herein includes, without limitation, a digital audio file made available on the Internet for downloading to a computer or mobile device, typically available as a series, new installments of which can be received by subscribers automatically. However, the skilled artisan will understand that other audio content is also capable of being utilized by the system (100) described herein, including, for example and without limitation, user-generated self-records, audiobooks, streaming/digital radio, music, virtual reality, audio visualization software and systems, and the like. Accordingly, the audio content system (100) enables the creation of storytelling goggles or podcast goggles (e.g., virtual reality or streaming audio) that brings visualization of audio to life in a novel manner, as well as the compositing of complete, indexed visual asset associated with an audio segment created from user-contributed self-recordings, affecting visualization software and licensing, as well as audio visualization training systems and products.

The instructions (106) also include a voice recognition module (112) that, when implemented by the processor (104), facilitates the identification of textual elements (122) associated with the audio of a selected audio track (124) (e.g., podcast). According to one embodiment, the voice recognition module (112) utilizes proprietary algorithms to identify keywords recited in the audio track (124). In other embodiments, the voice recognition module (112) utilizes suitable proprietary or commercially available speech recognition products, utilizing acoustic and/or language modeling (e.g., document classification or statistical machine translation), including for example and without limitation, algorithms, engines and/or software provided by Nuance®, Microsoft®, Apple®, Google®, and the like.

In addition, the instructions (106) include a segmentation module (114), which when executed by the processor (104), facilitates the segmentation of an audio track (124) into a plurality of topical audio segments or chapters. In accordance with one embodiment, the segmentation module (114) divides audio tracks (124) into one or more segments, i.e., chapters, denoting some transition between portions of the audio of the audio track (124), e.g., changes in topics or themes, etc. For example, a sports-based audio track (124) (e.g., podcast) may be segmented into different chapters, e.g., baseball, basketball, football, soccer, and/or different professional or collegiate teams within that sport. It will be appreciated that this segmentation of the audio track (124) may, accordingly, be accompanied by corresponding images (128) associated with each chapter, i.e., sport and/or team. Further discussion of the segmentation of an audio track (124) in accordance with the systems and methods set forth herein are discussed below.

The segmentation module (114) is configured to divide an audio signal, such as audio track (10) of FIG. 3, representing an audio track (124) or the like, into smaller segments, such as exemplary segment (1). Each segment (1) encapsulates a distinct conversation topic and/or complete unitary thought. The input for the segmentation module (114) is one audio track (124) (podcast and the like) while the output is at least one segment. In some embodiments, the audio track is input into a segmentation algorithm and the output is a list of pairs, wherein each pair contains the start time and end time of each segment. In Equation 1 below, a segment s0, is defined as the start time s0_start and end time s0_end.

$$\text{Output example} = \{[s0\_start, s0\_end], [s1\_start, s1\_end], [sn\_start, Sn\_end]\} \quad \text{Equation 1:}$$

In some embodiments, at least one curator reviews the audio track and defines a start time and end time of audio segments, noting the transition time of each, i.e., defining the list of start time-end time pairs. A curator may be a human curator, algorithmic, dedicated hardware components, software components or a combination of on any or all of the above. In other embodiments, segments (1-4) are determined by a segmenting algorithm (118) (e.g., a learning algorithm) stored in a data storage or memory (108). In some embodiments, a training dataset is provided. That is, input signals (audio tracks (10)) are provided in a data storage which are indexed by a curator. In the case of a human curator, it is generally more preferred to have multiple curators review and label the same audio track because text interpretation is subjective.

In some embodiments, the segmenting algorithm (118) is a Recurrent Neural Network (RNN). RNNs are generally used for processing speech and text as RNNs are efficient for processing time-series data. RNN is used to extract raw speech data or text from the audio track and find dependencies between phonemes and/or words and use such correlations to form smaller signals or texts, each representing a segment (1).

In other embodiments, the segmenting algorithm (118) is a Convolution Neural Network (CNN). CNNs are a class of neural networks often used in image processing and 2D vector process. Spectrograms of the raw audio signal are calculated in order to form a suitable input for the CNN. The spectrogram is a matrix with time and frequency axes. The CNN uses this input to learn where new topics begin and end, thus defining a segment.

In still other embodiments, the segmenting algorithm (118) is a Hidden Markov Model (HMM). HMM is a statistical and probabilistic graphical model. It is represented by a graph of states, where the learned process aims to find the state transition probabilities. It is to be understood that any of the above learning algorithms or a combination of segmenting algorithms (118) may be used to process the audio track, such as audio track (10).

In accordance with another exemplary embodiment, the segmentation module (114) is further configured to enrich each audio segment (126) with at least one textual element (122) and may work in concert with a voice-recognition module (112). In some embodiments, the textual element (122) is at least one meta-tag and/or keyword. In other words, the audio segments are tagged with relevant descriptors. In some embodiments, the tag is selected (by a curator or computer algorithm) from a predefined database of textual elements (122) located in an associated data storage (144). In other embodiments, a tag is generated based on content of the associated audio content whether or not the keyword/tag is predefined and/or located within the database.

In some embodiments, the textual element (122) is a short summary, i.e., "a descriptive copy". That is, the textual element (122) may be a short textual summary of the discussion contained within the audio segment. In some embodiments, the descriptive copy of the topic is provided by a human curator and associated with the audio segment and stored in the data storage (144). In other embodiments, the audio track is input into a summary algorithm (119) and the output is a descriptive copy (summary). In some embodiments, the descriptive copy is created directly from speech extracted from the audio track. In other embodiments, the speech of the audio track is converted to text and a descriptive copy (summary) is generated from the converted text.

In some embodiments, a summary algorithm (119) for creating a descriptive copy includes an RNN. The RNN can include an encoder and decoder. The encoder is an RNN that receives and processes words so as to identify dependencies between words and make the context of words. The decoder is an RNN that generates text from values obtained from the encoder.

In some embodiments, the textual element (122) is a title. The title may be defined by a curator (human, software, hardware, or a combination thereof) during the review of the audio track (10) for segmentation. In some embodiments, the segmentation module (114) alone or in concert with the voice recognition module (112) is (are) further configured to provide a title to the audio segment via a title algorithm (121) stored in memory (108). Input for the titling algorithm (121) is an audio signal, such as audio signal (10), and the output is text that represents a sequence of titles for each word/sentence in the speech. In some embodiments, the titling algorithm (121) is an HMM.

It is to be appreciated that any combination and number of textual elements (122) may be associated with an audio segment. For example, an audio segment may be associated with a title, descriptive copy, and at least one keyword and/or meta tag. After the segmentation module (114) has segmented an audio track and indexed the audio segment with at least one textual element (122), the indexed audio segment is stored in a data storage (144). In some embodiments, the indexed audio segment is transferred to a Final Audio Database (FADB), described below in relation to FIG. 8. After being placed in the data storage (144), audio files representing topical audio segments are selected and paired with at least one visual asset stored in an associated data storage (144).

In some embodiments, the visual assets (128) are stored in a Final Visuals Database (FVDB), described below in relation to FIG. 8. The visual assets may be paired by the image-searching module (116), by either a human action or automatically by an algorithm. That is, the instructions (106) resident in memory (108) and executable by the processor (104) further include an image-searching module (116). The image searching module (116) and a voice recognition module (112) thereafter work in concert, via the processor (104), to search for visual assets (128) stored in data storage (144), that correspond to the textual element (122) (e.g., keyword) recognized by the voice recognition module (112) from the audio track (124). As discussed in greater detail below, the visual assets (128) may be retrieved from publicly accessible sources, from proprietary sources, from images previously accessed and stored in associated storage, received from the broadcaster associated with the selected audio track (124), or the like. Additional information relating to the searching for images performed by the image searching module (116) are discussed in accordance with the exemplary embodiments set forth below.

In some embodiments, the image searching module is configured to execute a visual matching algorithm (125) that can suggest a visual asset (128) that is relevant to a textual element (122) of and audio segment (126). The visual matching algorithm (125) may use a Named Entity Recognition algorithm that extracts a textual element and develops a pairing based on the extracted content. The visual matching algorithm (125) may incorporate a NER system (New Enhancement Recognition System). In some embodiments, the visual matching algorithm (125) may include AI for removing duplicate and watermarked images. In some embodiments, the visual matching Algorithm (125) utilizes a Text Semantic Similarity Neural Network based on natural language understanding.

A visual asset (128) may be any form of visual information, such as an image or photograph. In some embodiments, the visual asset (128) paired with the indexed audio segment (126) is a cinemograph. Briefly, a cinemograph is a photograph in which a minor and repeated movement occurs, forming a short video clip. These are generally published as an animated GIF or other video formation and give the illusion that the viewer is watching an animation. In some embodiments, the image-searching module (116) is further configured to create a cinemograph from visual assets (128) (images and/or videos) stored in data storage (144). That is, a cinemograph is generated based on tags, topics, and/or summaries obtained from an indexed audio segment (126). In some embodiments, a user may provide a description that will lead to the animation of a certain part of an image or video according to the user description. The user description can also be used to generate new cinemographs based on existing resources. The process starts with the recognition of objects based on a description in images and/or videos and follow with use of the selected image(s)/video(s) to produce cinemographs.

In some embodiments, the visual asset (128) paired with the indexed audio segment (126) is a video loop. A video loop is generated from a video, differently from a cinemograph which is something between an image and/or video. That is, in a cinemograph only a certain part of the image is animated; in a video loop, the goal is to animate/loop the entire scenery. The video is generated from tags, topics, summaries, user description and/or other videos.

In some embodiments, the visual asset (128) paired with the indexed audio segment (126) is a collage. That is, the image-searching module (116) is further configured to create a collage image from visual assets (126) (images and/or videos stored in database (144)), based on tags, topic names, summaries, and/or user explanations/descriptions. Images and/or videos used for generating a collage can be backgrounds, styles, single objects, etc. Generative models may be used to combine images and/or video. An algorithm may be designed to use only parts of images or whole images and then combine them into a new collage image. In some embodiments, an Attentional Generative Adversarial Neural Network (GAN) is used to generate a collage. The Attentional GAN automatically retrieves the words, represented by word vectors for generating different sub-regions of the image. Deep Attention Multimodal Similarity Model provides the fine-grained image-text matching loss function for the generative network. The DAMAM is comprised of two neural networks, one that maps the sub-regions of the image and the other that maps the words of the sentence, co-common semantic space, by measuring the image-text similarity at the word level to computer mentioned fine-grained loss function for the image generation.

Figure 9A:
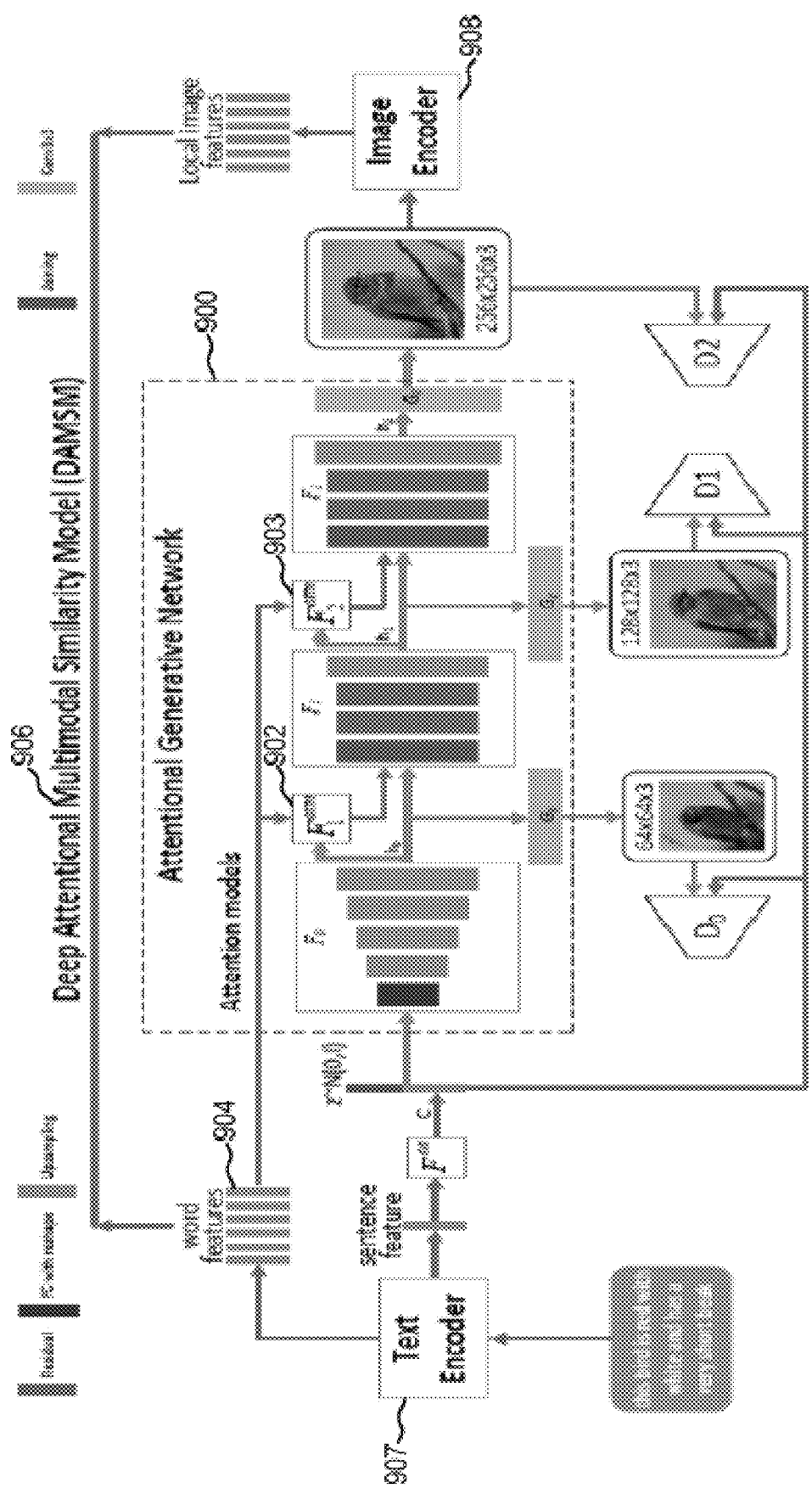
FIG. 9A illustrates an exemplary architecture of a preferred Attentional Generative Adversarial Neural Network in accordance with the present disclosure.
Figure 9B:
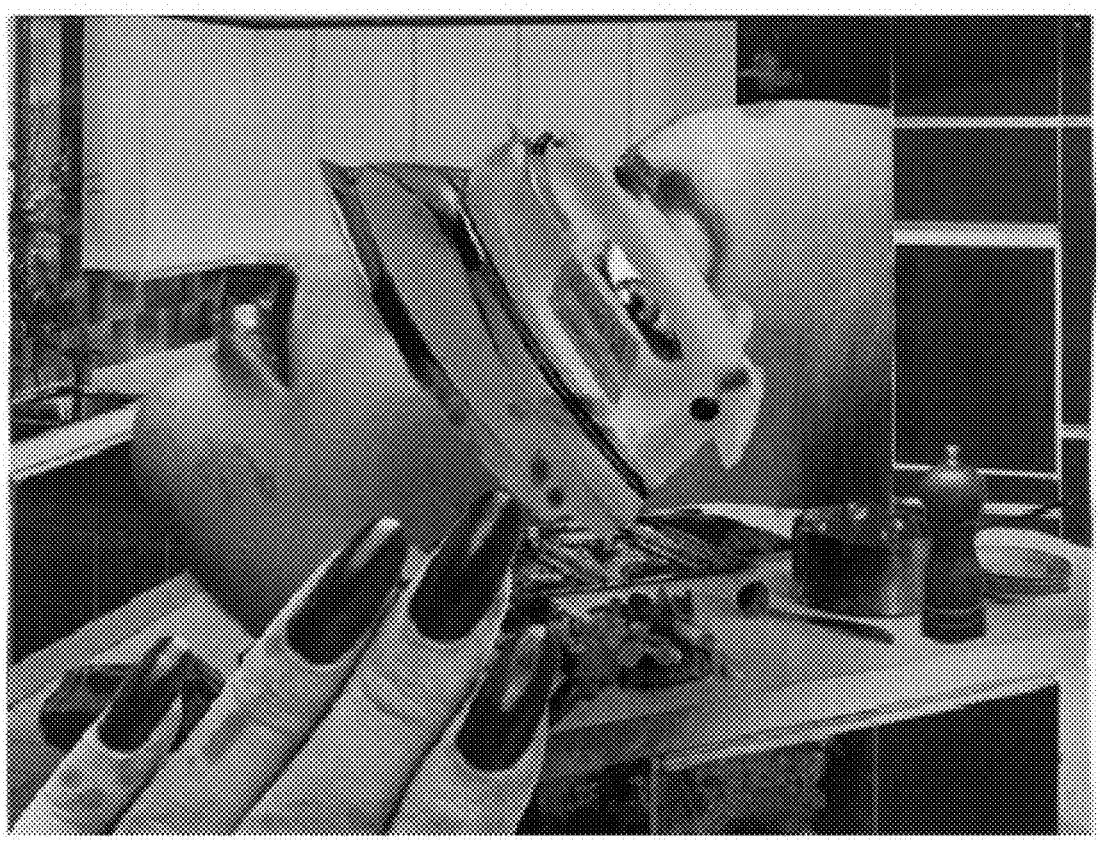
FIG. 9B is an exemplary collage visual asset in accordance with the present disclosure.

FIG. 9A illustrates an example of the architecture of a preferred Attentional Generative Adversarial Neural Network (900). Each attentional model (902), (903) automatically retrieves the words, represented by word vectors (904) (embeddings—a method used to represent discrete variables as continues vectors), for generating different sub-regions of a collage. The Deep Attentional Multimodal Similarity Model (906) provides the fine-grained image-text matching loss function for the generative network (900). The DAMSM (906) is composed of at least two neural networks, one that maps the sub-regions of the image and the other maps the words of the sentence to a common semantic space by measuring the image-text similarity at the word level to computer mentioned fine-grained loss function for the image generation. In some embodiments, a text encoder (907), similar or the same as the Recurrent Neural Network, is used to generate a descriptive copy. The image encoder (908) is preferably a Convolutional Neural Network for generating an image. FIG. 9B is an exemplary collage created via the Attentional Generative Network (900). In some embodiments, Computer Vision is used to segment an image. In Computer Vision, image segmentation is the process of portioning a digital image into multiple segments. The segmentation is performed to simplify and/or change the representation of an image into something that is more meaningful and/or easier to analyze. In some embodiments, image segmentation is used for object extraction and those extracted objects are used to generate portions of a collage.

In some embodiments, the audio segments (126) associated with visual assets (128) are grouped into "bags," as briefly discussed above. In other words, after segmentation and tagging, a grouping algorithm (123) is used to find intersections between indexed audio segments (126) using applied tags. In some embodiments, the grouping algorithm (123) is a K-means Algorithm. K-Means is a clustering algorithm, and in this case, each word or text is represented by a vector. To group words or texts, K-Means algorithm finds similarities between vectors using Euclidean distance or another distance method known in the art. In other embodiments, the grouping algorithm (123) is a Support Vector Machines Classification algorithm (SVMC). The SVMC uses "bags" as classes and/or labels for those bags to determine if an indexed audio segment belongs to a specific bag.

The instructions (106) also include a toggle/auto-play module (117) which operates to combine together a long-running play of content from amongst a variety of segments (126) from disparate audio tracks, such as audio tracks (124) based upon textual elements (122) (e.g., keywords) input by an associated user. It will be appreciated that because the audio of the audio tracks (124) has been segmented into specific topics and/or themes of discussion, users' search results by keyword or phrase are able to provide highly relevant sound bites extracted from a multitude of shows and/or episodes. Accordingly, such a module (117) does not require the listener to listen to any one full episode of any show to arrive at their search term point of deepest interest. This also means that the system (100) may "string" together for autoplay, not full episodes (audio tracks (124)), but audio segments (126), based on a user's keyword search terms. These audio segments (126) may autoplay for a listener who'd like to, for example, hear what twenty different podcast show hosts and/or guests have to say specifically on the subject of "building a house", knowing that as the user is listening, the user has the ability to bookmark or favorite any segment (126) in passing, perhaps to follow the host or show behind it, and may also expand out the full episode of any one such "teaser" in passing. According to one embodiment, the toggle/auto-play module may stitch together a full podcast episode from amongst a variety of segments (126) from disparate audio tracks (124) based upon textual elements (122) (e.g., keywords) input by an associated user. In such an embodiment, the system (100) may "stitch" together, not full episodes (audio tracks (124)), but audio segments (126), based on a user's keyword search terms. Thereafter, the stitched-together segments (126) may autoplay for a listener as described above, thereby allowing the listener to listen to an audio track (124) comprised of only the segments (126) of interest.

The various components of the computer system (102) associated with the central system (101) may all be connected by a data/control bus (138). The processor (104) of the computer system (102) is in communication with an associated data storage (144) via a link (146). A suitable communications link (146) may include, for example, the public switched telephone network, a proprietary communications network, infrared, optical, or other suitable wired or wireless data communications. The data storage (144) is capable of implementation on components of the computer system (102), e.g., stored in local memory (108), i.e., on hard drives, virtual drives, or the like, or on remote memory accessible to the computer system (102).

The associated data storage (144) corresponds to any organized collections of data (e.g., account information, images, videos, usage rights, copyright instructions, segments, podcasts, user device information, etc.) used for one or more purposes. Implementation of the associated data storage (144) is capable of occurring on any mass storage device(s), for example, magnetic storage drives, a hard disk drive, optical storage devices, flash memory devices, or a suitable combination thereof. The associated data storage (144) may be implemented as a component of the computer system (102), e.g., resident in memory (108), or the like.

In one embodiment, the associated data storage (144) may include data corresponding to user accounts (120), textual elements (122), audio tracks (124), audio segments (126), visual assets (128), and/or other corresponding data, e.g., website data hosted by the central computer system (102), URLs of podcasts, and the like. The user account information (120) may include, for example, username, billing information, device (200A-200D) identification, address, passwords, and the like. Such user account information (120) may be collected by the central computer system (102) during user registration of a user device (200A, 200B, 200C, 200D), as will be appreciated by those skilled in the art. The data storage (144) may include data relating to image rights, for example, instructions on the number of reproductions to be made, the cost associated with reproducing the corresponding visual asset (128), ownership of the copyright of the visual asset (128), watermarks or attribution information, any myriad additional information relating to the transfer, usage, sale, authorship, and the like relating to a corresponding visual asset (128). According to another embodiment, the visualized audio platform is equipped to collect more extensive personal information about each user than is typically collected through traditional players, offering users the ability to create their own profiles and answer questions relating to their interests, to create a more tailored suggested content experience for users.

The computer system (102) may include one or more input/output (I/O) interface devices (134, 136) for communicating with external devices. The I/O interface (136) may communicate, via communications link (148), with one or more of a display device (140), for displaying information, such estimated destinations, and a user input device (142), such as a keyboard or touch or writable screen, for inputting text, and/or a cursor control device, such as mouse, trackball, or the like, for communicating user input information and command selections to the processor (104). The I/O interface (134) may communicate, via communications link (130), with external devices (200A, 200B, 200C, 200D) via a computer network, e.g., the Internet (101).

It will be appreciated that the platform-independent visualization of audio content system (100) is capable of implementation using a distributed computing environment, such as a computer network, which is representative of any distributed communications system capable of enabling the exchange of data between two or more electronic devices. It will be further appreciated that such a computer network includes, for example and without limitation, a virtual local area network, a wide area network, a personal area network, a local area network, the Internet, an intranet, or any suitable combination thereof. Accordingly, such a computer network comprises physical layers and transport layers, as illustrated by various conventional data transport mechanisms, such as, for example and without limitation, Token-Ring, Ethernet, or other wireless or wire-based data communication mechanisms. Furthermore, while depicted in FIG. 5 as a networked set of components, the system and method are capable of implementation on a stand-alone device adapted to perform the methods described herein.

The central computer system (102) may include a computer server, workstation, personal computer, cellular telephone, tablet computer, pager, combination thereof, or other computing device capable of executing instructions for performing the exemplary method. When used herein, a computer server, or a server should be understood to include one or more servers (e.g., physical servers, virtual servers, cloud computing environments, or other computer environments), which each may include one or more processors, memories, communication devices, and other computing components such as may be needed to enable the server to send, receive, store, analyze, modify, and otherwise handle data locally, across a network, over the internet, or in other circumstances.

According to one example embodiment, the central computer system (102) includes hardware, software, and/or any suitable combination thereof, configured to interact with an associated user, a networked device, networked storage, remote devices, or the like.

The memory (108) may represent any type of non-transitory computer readable medium such as random access memory (RAM), read only memory (ROM), magnetic disk or tape, optical disk, flash memory, or holographic memory. In one embodiment, the memory (108) comprises a combination of random access memory and read only memory. In some embodiments, the processor (104) and memory (108) may be combined in a single chip. The network interface(s) (134, 136) allow the computer to communicate with other devices via a computer network, and may comprise a modulator/demodulator (MODEM). Memory (108) may store data processed in the method as well as the instructions for performing the exemplary method.

The digital processor (104) can be variously embodied, such as by a single core processor, a dual core processor (or more generally by a multiple core processor), a digital processor and cooperating math coprocessor, a digital controller, or the like. The digital processor (104), in addition to controlling the operation of the computer (102), executes instructions (106) stored in memory (108) for performing the method set forth hereinafter.

As shown in FIG. 5, one or more user devices (200A, 200B, 200C, 200D) may be in communication with the central computer system (102) via respective communication links (150, 152, 154, 156), utilizing a computer network (128), e.g., the Internet. In one embodiment, each user device (200A, 200B, 200C, 200D) may be implemented as a smartphone employing an operating system such as iOS, ANDROID, BLACKBERRY, WINDOWS, APPLE, CHROME, or the like. The user devices (200A-200D) are representative of any personal computing devices, such as personal computers, netbook computers, laptop computers, workstation computers, personal data assistants, web-enabled cellular telephones, tablet computers, proprietary network devices, or other web-enabled electronic devices. The data communications links (150-156) between the central computer system (102) and the user devices (200A-200D) may be accomplished via any suitable channel of data communications such as wireless communications, for example Bluetooth, WiMax, 802.11a, 802.11b, 802.11g, 802.11(x), a proprietary communications network, infrared, optical, the public switched telephone network, or any suitable wireless data transmission system, or wired communications. In one embodiment, the user devices (200A-200D) may communicate with the central computer system (102) via a cellular data network.

Figure 6:
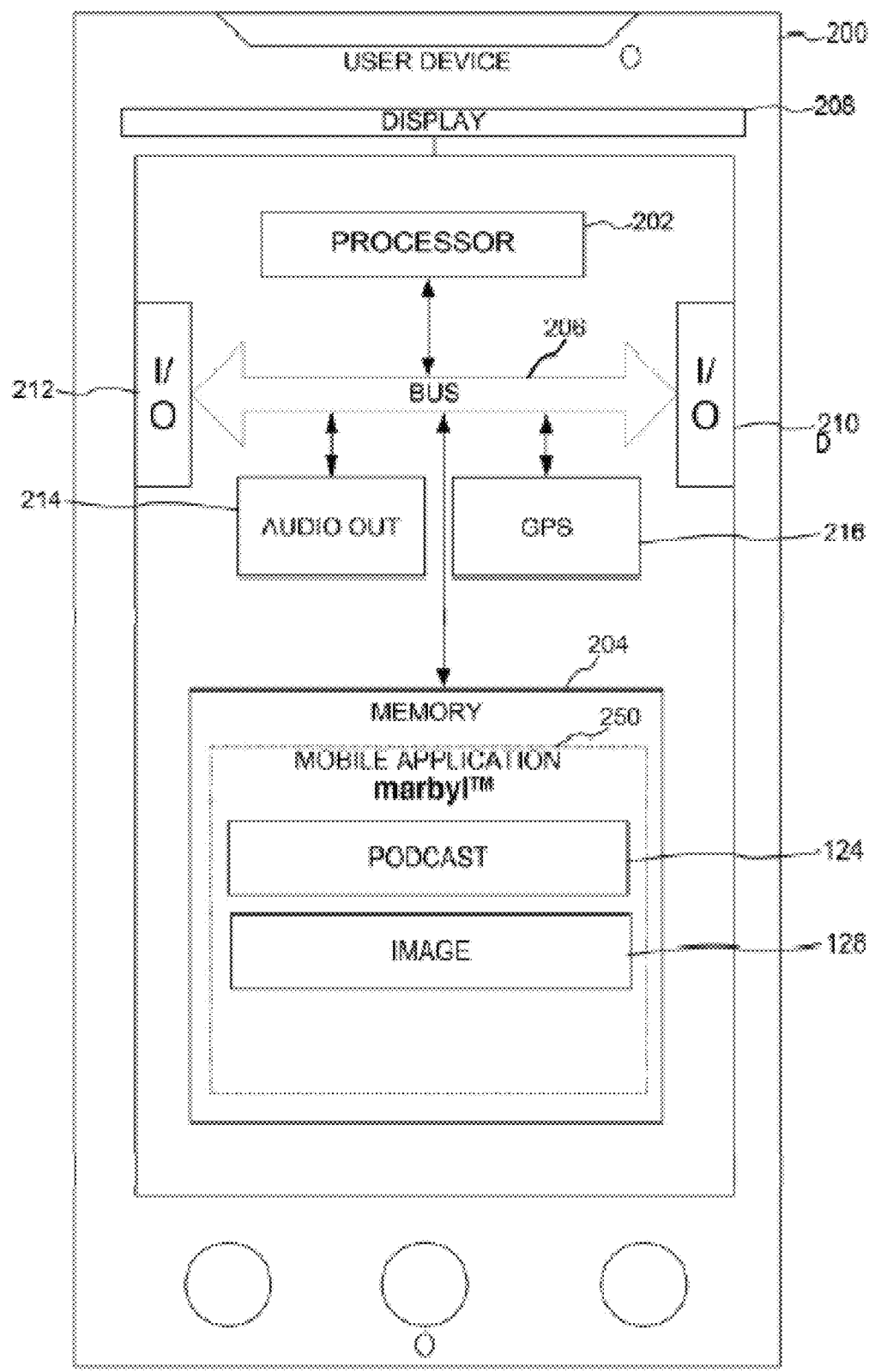
FIG. 6 is a functional block diagram of a user device for platform-independent visualization of audio content in accordance with one aspect of the exemplary embodiment.

FIG. 6 provides an example illustration of a user device (200) representative of the user devices (200A-200D) depicted in FIG. 5. It will be appreciated that the image presented in FIG. 6 is representative of any suitable personal computing device known in the art capable of providing a user with access to the Internet and/or the ability to play podcasts. Accordingly, while depicted in FIG. 6 as a representative mobile device, any personal computing device may be utilized in accordance with the systems and methods set forth herein. The user device (200) may include a processor (202), which executes one or more instructions or applications (250) in the performance of an exemplary method discussed below. In accordance with one embodiment, the application (250) includes a multimedia player, capable of playing audio tracks (124) with visualization as set forth herein, including, for example the MARBYL™ player/platform of Tree Goat Media, LLC™. It will be appreciated that the application (250) may be platform independent, e.g., adapted for use across different platforms/operating systems, as will be understood by those skilled in the art. The user device (200) may further include a memory (204) storing the application (250) in data communication with the processor (202) via a system bus (206). The processor (202) of the user device (200) may be in data communication with the central computer system (102) via an I/O interface (212) or I/O interface (210). The user device (200) may further include a display (208) suitably configured to display data to an associated user, receive input from the associated user, and the like. In some embodiments, for example, when part of a mobile device or tablet, the display (208) of the user device (200) may be configured as a touch-screen display capable of receiving user instructions via user contact on the display, e.g., LCD, AMOLED, LED, RETINA, etc., types of touch-screen displays. Alternatively, when the user device (200A-200D) is implemented as a desktop or laptop computer or smart TV, the I/O interface (212, 210) may be coupled to an input device (keyboard/mouse/touchpad/remote), as well as an output device, e.g., a display (monitor), speakers, and the like.

The memory (204) may represent any type of non-transitory computer readable medium such as random access memory (RAM), read only memory (ROM), magnetic disk or tape, optical disk, flash memory, or holographic memory. In one embodiment, the memory (204) comprises a combination of random access memory and read only memory. In some embodiments, the processor (202) and memory (204) may be combined in a single chip. The input/output interface(s) (210, 212) allow the mobile device (200) to communicate with other devices via a communications network, via Universal Serial Bus or Lightning® ports, via wired or wireless connections, and may comprise a modulator/demodulator (MODEM). Memory (204) may store data processed in the method as well as the instructions for performing the exemplary method. The digital processor (202) can be variously embodied, such as by a single core processor, a dual core processor (or more generally by a multiple core processor), a digital processor and cooperating math coprocessor, a digital controller, or the like.

The memory (204) of the user device (200) includes the application (250) communicated from the central computer system (102) during registration of the user device (200), and creation of the user account (120). The application (250) stored in memory (204) may be made available via a third-party service, e.g., GOOGLE PLAY, ITUNES, MICROSOFT, or the like. The user device (200) may be configured to further store one or more audio tracks (124) received from the central computer system (102) responsive to search or from a podcast hosting site independent of the central computer system (102), as well as any images (128) associated with the audio tracks (124) received from the central computer system (102), or the like. The user device (200) further includes an audio output component (214). It will be appreciated that the audio output component (214) is capable of outputting, via an integrated speaker of the user device (200) or via a suitable audio connection, a broadcast of an audio track (124) to the associated user in conjunction with the images (128) associated therewith.

As shown in FIG. 5, the user devices (200A-200D) are capable of intermittent (opportunistic) or continuous bi-directional communication with the central computer system (102) utilizing the I/O interface (212). In one embodiment, for example when the user device (200) is implemented as a mobile device, the bi-directional communication is data communication utilizing a cellular data network, e.g., $3^{rd}$ generation mobile phone standards (3G), $4^{th}$ generation standards (4G, 4G LTE, WiMax), $5^{th}$ generation standards (5G, 5GE), EV-DO, standalone data protocols, and the like. The user device (200A-200D) may provide account information (120) to the central computer system (102) during registration therewith. The central computer system (102) may then register the user associated with the user device (200A-200D). The user device (200) depicted in FIG. 6 further includes a global positioning system ("GPS") component (216) for determining location of the user device (200A-200D) as will be understood in the art. In accordance with one embodiment, the GPS (or other suitable location data) may be communicated to the central computer system (102) for use in determining appropriate images (128), topics, themes, etc., or myriad other customizations of a visualized audio track (124) to be returned to the user device (200A-200D).

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

In accordance with one exemplary embodiment, the platform-independent visualization of audio content system (100) moves beyond the current text-based search limitations and employs visuals to effectively mine audio. The platform-independent visualization of audio content system (100), i.e., the audio content system, extracts audio out of search engine invisibility via visual assets in trending formats that have the highest engagement rates in social media. The audio content system is characterized by visual assets, a descriptive copy, and tags that make its audio content understandable and readable inside the search engines.

According to another embodiment, the platform-independent visualization of audio content system (100) described herein presents curated visual assets that enhance or mirror spoken narrative at each point of topic change within audio. Mostly motion photographs, these visuals are like choreographic counterparts to the audio's underlying discussion. The system (100), i.e., the audio content system, via the segmentation module (114) or other suitable component, transforms audio tracks, e.g., audio tracks (124), into "chapters" or "audio segments" (126), whereby topical changes in dialogue are determined and marked on a timeline, and visual assets (128), and at least one textual element (122) such as a descriptive copy, tag, keywords and the like stored in data storage (144) are then selected, written, attributed, and attached to the audio segments (126). Audio segments (126) may be combined, via the toggle/auto-play module (117), together serially and/or visually as topic-based storyboards that are synchronized with audio timing. The audio content system (100) provides audio with a second and third storyline. There is the audio storyline, which is then given a layer of visual storytelling, and then a layer of titling and descriptive copy.

According to another embodiment, as a result of the audio in the audio track (124) being "topic segmented" via the segmentation module (114) into specific topics and/or themes of discussion, an associated users' search results by keyword or phrase are able to provide highly relevant sound bites extracted from a multitude of shows and/or episodes, and does not require the user to have to listen to any one full episode of any show to arrive at their search term point of deepest interest. Furthermore, the toggle/auto-play module (117) enables the audio content system (100) to combine or stitch together, not full episodes, but topical audio segments (126), based on keyword search terms of the associated user. These combined audio segments (126) may autoplay for a user who'd like to, for example, sit back and hear what twenty different podcast show hosts and/or guests have to say specifically on the subject of "building a house", knowing that as the user is listening, the user has the ability to bookmark or favorite any segment in passing, perhaps to follow the host or show behind it, and may also expand out the full episode of any one such "teaser" in passing.

According to another embodiment, there is provided a method for dissecting long-form digital audio content such as audio track (124) into short form digital audio content, such as segments (126) by way of curation. A single audio segment (126) that is extracted from long-form (audio track (124), e.g., podcast) represents a "complete thought, concept, theme, or topic" in a spoken narrative. That is, the content can "stand alone" from the long-form audio and be comprehensible as a "complete thought, concept, theme, or topic" although pulled outside of the overall context from which it was extracted.

According to another exemplary embodiment, there is provided a method for segmenting and visualizing audio through a curatorial selection and/or decision-making process including, but not limited to, marking topic change points in dialogue, selecting visual assets (128) that most appropriately match and/or enhance that dialogue, and copyrighting and/or tagging to enhance segment interaction and improve segment Search Engine Optimization (SEO) and/or social sharing "packaging". In some embodiments, a human curator listens to the audio track and selects the appropriate time zones to define audio segments (126). In some embodiments, a human curator is aided by an AI Assistant of the segmentation module (114) that proposes audio segment cut points (e.g., (20, 22, 24) of FIG. 3) to speed up the segmentation process. In some embodiments, the AI Assistant of the segmentation module (114) is also configured to suggest titles through an audio track. In this way, a segmentation algorithm (such as segmentation algorithm (118)) is able to learn from a human curator alterations to AI suggestion so that the AI may become "smarter". In other embodiments, a computer Artificial Intelligence algorithm is configured to define the audio segment (126) without any human intervention or assistance.

According to another embodiment, there is provided a system for providing digital audio the requisite web tools to effectively enable digital advertising on this media. The audio content system (100) of the present disclosure, enables advertisers to reach listener audiences that current search engines are unable to locate or visualize for them, accordingly providing advertisers with highly targeted ad-placement in the digital audio space.

In accordance with one embodiment, there is provided a system for transforming audio content into digital and/or native advertising.

According to another embodiment, the platform-independent visualization of audio content system (100) is configured to compensate contributors of podcasts (audio tracks (124)), i.e., to become the first podcast player (250) to pay its contributors—both audio and visual content creators—on a CPM and otherwise basis.

According to another embodiment, there is provided a system to make topic-segmented and visualized audio content social network, email, and/or text/messaging shareable. The platform-independent visualization of audio content system (100) transforms long-form audio into sound bites, allowing for both the long-form and short form versions of the same audio to be shared individually.

According to another embodiment, the platform-independent visualization of audio content system (100) provides search results for digital content audiovisual in nature. That is, audio search, discovery, navigation, and/or exploring related content are generated in visual form.

According to another embodiment, the visual assets predominantly utilized within the platform are those of trending formats. The cinemograph, or motion photograph (e.g., MP4 and GIF formatted data files), in which some portions of an image contain movement while others remain still, is the visual asset type most employed inside the platform, though additional visual asset types will be used.

According to another exemplary embodiment, the platform-independent visualization of audio content system (100) generates and grows a proprietary search engine and database containing audio, visuals, and text.

In accordance with another exemplary embodiment, the factors and variables around scoring artworks for incorporation into an audio track (124) first include a human curator rating every visual asset (128) when it is imported into the database, with respect to different "levels" and "tags". For example, a visual asset (128) may be assigned an overall aesthetic quality rating as well as subject matter and mood labels, to better the chances of a visual asset (128) being discovered when a curator searches for imagery most appropriate for any segment (126). Accordingly, it will be appreciated that the platform-independent visualization of audio content system (100) is suitably configured to traverse a logical tree of choices for visual asset (128) identification and selection.

According to another exemplary embodiment, the platform-independent visualization of audio content system (100) provides for the local stashing of data on a user device (200A-200D), i.e., downloading audio tracks (124) for later listening and viewing when in areas of poor or no Internet connectivity may occur. In accordance with one such implementation, the visual assets (128) to incorporate in the audio track (124) for cases of offline listening and viewing are pre-determined. Accordingly, the platform-independent visualization of audio content system (100) therefore runs logic on the server, i.e., the central computer system (102), so aside from downloading the recipe for visual assets (128), the central computer system (102) facilitates all other functions.

According to another embodiment, the platform-independent visualization of audio content system (100) employs at least one algorithm (such as algorithms (118, 119, 121, 123) described above) to automatically generate various options for increased efficiency and ease with respect to the curatorial decision-making process. Suitable generated options may include, for example and without limitation: image selection options with respect to relevant sponsorship, subject matter, mood or theme, style, tags, quality level, trends, trending keywords, and/or demographics, as well as copy and related content suggestions based on topic and/or segment keywords, social relevancy, selected imagery, and/or news source credibility.

In another exemplary embodiment, the aforementioned algorithms executed by the central computer system (102) of the platform-independent visualization of audio content system (100) provides a proprietary methodology for increasing the efficiency of the human curatorial process, including, for example and without limitation: "segmenting" an audio track by breaking the audio track into topical audio segments (126) defined by time codes measurable in the tenths of a second, visual assets (128) (e.g., applicable artwork) categorizing and tagging, artwork "pulling" and transfer from database engine to curator's "dashboard" or "workshop" or "episodes" in production, suggesting what sponsors or affiliate sponsors would make the most sense as picks for any given segment or audio discussion or visual asset, transferring of segments and any parts of the curatorial process, including notations and requests, in both draft and finished states, to other members or divisions of the company and its partners for viewing, collaboration, or approval. A curator may, for example, "send" a version of the "dashboard" or "workshop" or "episode" to a copyrighter, the sales team, a technician for image support, an engineer for audio support, or a manager, sponsor, podcast creator, artist, or agency for feedback, approval, inquiry, or suggestion.

According to another embodiment, the platform-independent visualization of audio content system (100) utilizes a proprietary method for encrypting podcasts which are otherwise entirely public materials. It will therefore be appreciated that not only will the audio content system (100) make sense of the data, but also the audio could be protected with digital rights management of some kind. In a further implementation, the platform-independent visualization of audio content system (100) is capable of exclusive encryption of content, dependent upon various digital rights management associated with the audio track (124) and/or visual asset (128) or requested by the owner of said audio track (124) and/or visual asset (128).

According to another embodiment, the platform-independent visualization of audio content system (100) employs a method whereby certain segments designated by the segmentation module (114) are particularly set for advertising campaigns that have start and end date ranges, or target only a geographic region. In such an implementation of the platform-independent visualization of audio content system (100), a method for the automatic or manual swapping out of sponsor placements attached to any segment to meet this need is performed, including the automatic or manual replacement of sponsor placements on each segment to support the highest bidder of the keywords associated with that segment, particularly wherever there is not a fixed sponsorship placement on a segment.

According to another embodiment, the platform-independent visualization of audio content system (100) employs a method whereby certain visual assets (128) designated by the image searching module (116) are particularly set for sponsorship attachment or sponsorship consideration by any given participating sponsor, allowing advertisers to sponsor visual assets and visual asset pools and collections to which audio segments would later be applied.

In accordance with another embodiment, the platform-independent visualization of audio content system (100) enables personal webpages and "feeds" for all podcast creators, visual artists, and advertisers participating in the platform, containing all the audio, visual, and text-based content of their association, from segments to full episodes, all prepared as socially shareable bundles and as plugins for placement in external websites and/or blogs.

According to yet another embodiment, the platform-independent visualization of audio content system (100) allows for all content contributors and advertisers using the platform to set terms and specifications for both off-limit and preferable forms of content attachment. Suitable forms of content include, for example and without limitation, themes in spoken narrative, written copy, subject matter inside both audio and imagery, or specific companies and brands for which one would or would not want association.

In another embodiment, the platform-independent visualization of audio content system (100) includes a system for online upload and submission of artist/photographer/videographer works for consideration for storage in the associated database (144) and subsequent use in the visualization of audio content, i.e., audio tracks (124). According to one implementation, the platform-independent visualization of audio content system (100) generates a descriptive copy to describe the visual assets (128), their locations, fun facts about them, the process of making them, or any other copy from the creators for potential editing and use where their images are selected for segments.

According to another embodiment, the platform-independent visualization of audio content system (100) supports a "real-time" or almost "real-time" visualization of streaming radio and audio content, aided by a more intelligent algorithm, the streamlining of curatorial processing, and a robust visual database (144). In such an embodiment, the aforementioned dynamic or near-dynamic visualization of an audio track (124) utilizes the voice recognition module (112), the image-searching module (116), the database (144), as well as other third-party databases to enable the "real-time" or "almost real-time" visualization to accompany an audio track (124). It will be appreciated that this visualization may occur as the podcast (124) is being downloaded or while the user is listening to the audio track (124), provided the latter instance includes connectivity to the Internet (101), and/or the central computer system (102).

In accordance with yet another embodiment, the algorithm utilized by the platform-independent visualization of audio content system (100) includes a capability to customize any one user's visual experience atop a standard and unchanging audio track by way of the personal information, background, sex, age, location, and/or interests of the corresponding user as gathered in part via the user search, discovery, interaction, and/or play experience within the platform, and via optional Facebook® login to the platform/system (100). Accordingly, it will be appreciated that as the user is listening to an audio track (124), background processing by the central computer system (102) is being performed to auto-pull the most appropriate visual match for each segment from the pre-programmed pool of image options that curators assign to each segment of audio content. The algorithm matches user information and keywords and tags the user has been assigned in the database (144) to increase the relevancy of the visual assets (128) that appear for the user, unique individual by unique individual. The "recipe" for which visual assets (128) render for which listener is fixed in such a way that the listener can backtrack to earlier parts of the audio and expect the same visuals at the same times.

According to a further embodiment of the subject application, a user may utilize the audio content system (100) to view the visuals, i.e., visual assets (128) associated with a particular audio track (124), in a "sound off" mode, wherein the audio content of the audio track (124) is muted or otherwise disabled and the images (128) are viewed as a standalone experience. Furthermore, the user device (200A-200D) may utilize memory (204) to "like", "bookmark", "save" or otherwise store visual assets (128), enabling the audio content system (100) to facilitate the discovery by users of art, in addition to functioning as a playback platform and/or an ambiance product.

Figure 7:
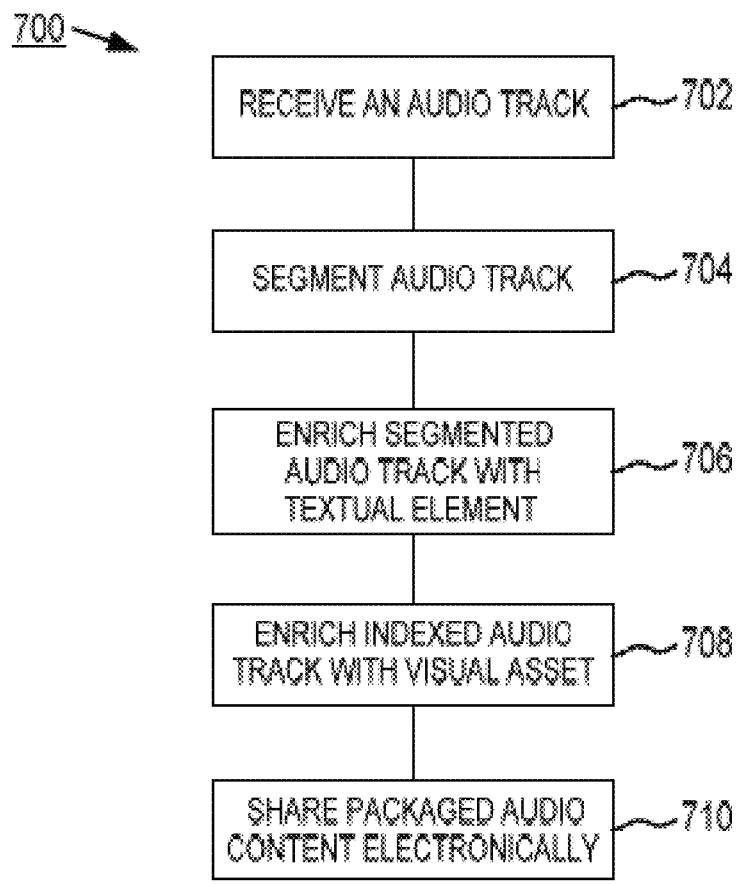
FIG. 7 is a flowchart of an exemplary method for visually packaging topical audio segments.

In accordance with another aspect of the present disclosure and with reference to FIG. 7, a flowchart of an exemplary method (700) for packaging audio segments is provided. The method segments long-playing audio tracks, e.g., audio tracks (124), into audio segments (126) and tags the audio segments with meaningful textual elements (122) while linking a visual asset (126) to the indexed audio segment. In this way, the audio segments (126) are easily searchable and sharable, e.g., via social media platforms. In some embodiments, the method (700) is implemented as a software program on a computing device. In other embodiments, the method (700) is implemented as a plug-in platform for use with other applications (third-party web-based applications or mobile applications).

The exemplary method (700) of FIG. 7 begins at block (702) with receiving an audio track, such as audio track (10) of FIG. 1 or audio track (124) of FIG. 5. Generally, the audio track is a long-form audio track having a duration of about a half hour or greater. However, it is to be appreciated that the long-form is non-limiting and that the method described herein is amenable to audio tracks of any length. The audio track may be provided as an electronic file (Audio Codec formats) commonly used for storing audio information, including but not limited to .wav, .mp3, .wma, .aiff MPEG-4, FLAC and the like. In some embodiments, the method may extract the audio track from a video encoding format including but not limited to MP3, WMV, WEM, AVI, Quick-Time®, etc.

At block (704), the audio track i.e., audio track (124) is segmented i.e., divided into individual chunks also referred herein as audio segments (126). Generally, each segment (126) corresponds to a thematically unified thought. In some embodiments, the segmentation of the audio track is based on discussed topics within the audio track, i.e., a topical audio segment. As a simple illustrative example, a long-form audio track containing a discussion about sports may be segmented according to each sport discussed. That is, the first ten minutes of audio may have discussions about basketball followed by a ten-minute discussion about baseball; thus, a segmentation module (such as module (114) described above) may segment that audio track into a first ten-minute audio segment about basketball and a second ten-minute audio segment about baseball.

In some embodiments, the segmentation of the audio track is performed by a curator as defined above. That is, a curator reviews/analyzes an entire audio track and records the start time and end time of at least one topic based on the discussion contained therein, defining a time zone of an audio track that corresponds to a topical audio segment, such as audio segment (128). In the sport example defined immediately above, a curator would note that from time t=0 to time t=10 minutes would be one audio segment (about basketball) and from time t=10 minutes to t=20 minutes would be a second audio segment (about baseball). The information regarding the audio segments (time zones bounded by transition times) is stored in a data storage, such as data storage (144) illustrated in FIG. 5. In some embodiments, the information is contained in a vector format as described above in relation to Equation 1.

In some embodiments, the segmentation is performed automatically via a computer processor and instructions by the utilization of computer algorithms, such as those defined above. In some embodiments, the segmentation by the segmentation module (114) is performed directly by analyzing the speech or spoken words contained in an audio track. In other embodiments, the speech or spoken words in an audio track are first converted to text (a text file) and the text is reviewed by the segmentation module for segmenting the audio track as described above.

At block (706), each segment of the segmented audio track is enriched with a textual element (122). In some embodiments, the textual element (122) is at least one keyword, wherein the keyword corresponds to the topic discussed within the segment. Continuing the sport example above, the first segment discussing basketball may be associated with the keyword "basketball" and/or if a particular basketball team is discussed, the team name may also be a keyword. In some embodiments, the textual element (122) is a meta-tag. Generally, a meta-tag is a short context descriptor that relates to the content described in the associated file/object.

In some embodiments, the textual element (122) is a summary. That is, a short textual summary of the core topic of the audio segment is generated and associated with the audio segment. In some embodiments, the summary of the topic is provided by a human curator, associated with the audio segment, and stored in a data storage, such as data storage (144). In other embodiments, the audio track is input into a summary algorithm (119), as described above, and the output is a short text (summary). In some embodiments, the summary is created directly from speech extracted from the audio track. In other embodiments, the speech of the audio track is converted to text and a descriptive copy (summary) is generated from the converted text.

In other embodiments, the textural element is a title. That is, a short phrase related to the overall theme of the topical audio segment is generated and associated with the audio segment, as described above. In some embodiments, a title is defined/created by a human curator and associated with the audio segment. In other embodiments, a titling algorithm (e.g., titling algorithm (123)) is utilized to provide a title to the audio segment.

After an audio segment has been indexed with at least one textural element, the indexed audio file is stored within a data storage, such as data storage (144), and is further enriched with at least one visual asset (126) at block (708). That is, after being stored in a data storage (144), audio files representing topical audio segments (126) are selected and paired with at least one visual asset (128). In some embodiments, the visual assets (128) are also stored within a data storage (144). In other embodiments, a visual asset (128) is uploaded, e.g., by a user, and associated with the audio segment (126). In other embodiments, a unique visual asset is generated, for example, a collage combining portions of multiple visual assets. Generally, the visual asset (128) is one that compliments the core topic of the audio segment (126). In continuing the sports example above, the basketball audio segment may be paired with an image of a basketball or a particular basketball team logo.

In some embodiments, the visual asset (128) associated with the audio segment (126) is chosen by a computer algorithm. In other embodiments, the visual asset (128) associated with the audio segment (126) is chosen by a human curator. In other embodiments, the visual asset (128) is associated with a textual element e.g., keyword. In these exemplary embodiments, if a keyword associated with the visual asset (128) matches a textual element (122) of an indexed audio segment (126), the visual asset (128) is a candidate for pairing with the audio segment (126). In some embodiments, a single candidate visual asset (128) is chosen and paired to the indexed audio segment (126). In other embodiments, several candidate visual assets (128) are blended together into a collage or motion image (as described above) and then paired with the indexed audio segment (126).

After the indexed audio segment (126) is paired with a visual asset (128) at block (708), the audio segment is considered "packaged." That is, a topical audio segment (126) has been extracted or defined from an audio track (e.g., audio track (124)) and associated with a textual element (122) and a visual asset (128). The packaged audio segment (126) is then capable for electronic sharing at block (710). That is, the packaged audio segment may be transferred (shared) across email, social media, websites, internet (101), etc. When the packaged audio segment is received or viewed by another party, e.g., a social media companion, it may be selected/opened, and the corresponding audio of the audio segment (126) played via a media player embedded into an application or webpage, such as media player 7 of FIG. 1. Continuing the sport example above, a first user may email the basketball packaged audio segment in an email or on a social media profile page. A third party, intrigued by the visual asset (128) associated with the audio segment (126) or accompanying description, may select the packaged audio segment (e.g., hyperlink) and the audio segment (126) played in an audio player, such as media player 7 as described above in relation to FIG. 1, embedded in the platform or directed web-based application.

Figure 8:
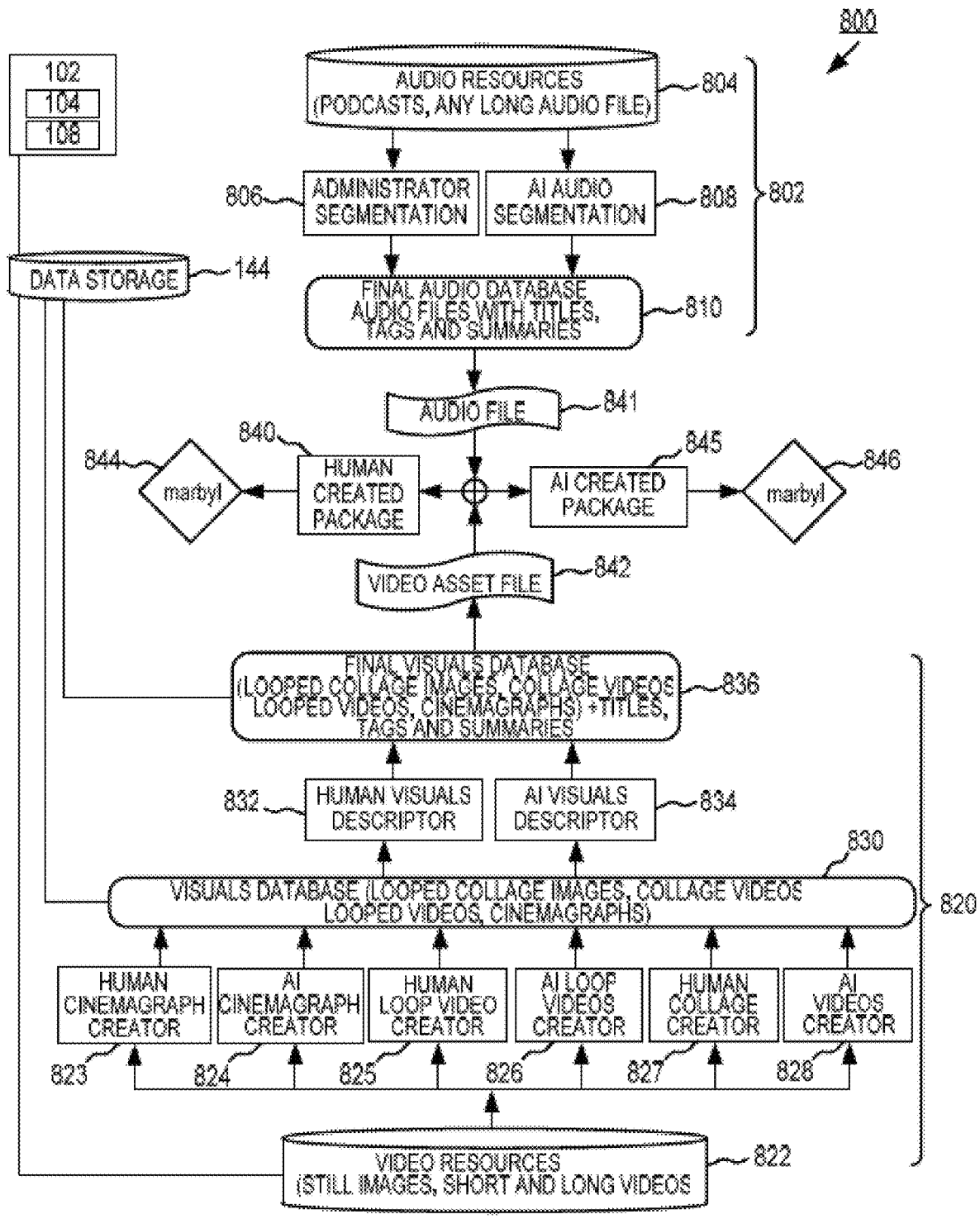
FIG. 8 is a system diagram of a system for visually packaging audio segments.

In accordance with another aspect of the present disclosure and with reference to FIG. 8, an exemplary content system (800) for creating visualized audio segments for searching and sharing is provided. The audio content system (800) may be implemented as a platform-independent visualization of audio content system including a central computer system such as computer system (102) having a processor (104), a data storage (144) and a memory (108) in communication with the processor (104), the memory (108) storing instructions (106) which are executed by the processor (104) to implement the platform-independent visualization system (800). In some embodiments, the instructions (106) define or otherwise allow the processor (104) to control subsystems, such as subsystems or modules (802, 820) within the content system (800).

The content system (800) is divided into an audio subsystem (802) and a visual subsystem (820). The audio system (802) includes an audio resource (804) where audio files (tracks, podcasts (124)) may be accessed. A non-liming example of an audio resource (804) is a data storage (144) storing audio tracks (124). The audio subsystem (802) is primarily tasked with the segmentation of audio tracks (e.g., audio tracks (124) and the like) into smaller audio files (audio segments (126)) and then associating/describing the audio segments (126) with textual elements (122) including title, tags, descriptive summary, and the like, as described above. In some embodiments, the segmentation of audio tracks from the audio resource (804) and association of textual elements with audio segments is performed, at (806) by an administrator, or by a module similar to segmentation module (114) as described above. In some embodiments, the segmentation of audio tracks from the audio resource (804) and association of textual elements (122) with audio segments (126) is performed, at (808), by an artificial intelligence such as the learning algorithms described above. In other embodiments, the audio subsystem (802) utilizes both administrators and computer methods for segmenting audio tracks and enriching audio segments (126) with textual elements (122).

After the audio segment (126) is defined and indexed with at least one textual element (122), a file containing the audio data representing the audio segment (126) and associated textual elements (122) are transferred and stored into the final audio database (FADB) (810), which may be part of data storage (144). After being placed in the FADB (810), indexed audio segments (126) stored within are selected and paired with an accompanying visual asset (842), described in greater detail below, coming from the Final Visuals Database FVDB (836), stored in a data storage, such as data storage (144).

The visual sub-system (820) is generally responsible for the production of visual assets (842) that are combined with the audio segments (126) in the process of creating visualized audio segments. The visual subsystem (820) includes a Visual/Video resource (822) where visual assets (842) including still images and videos may be accessed, the video resource may be similar to a database of visual assets (128) stored in a data storage (144). In some embodiments, a human, at (823), accesses the visual resource and generates a cinemograph. In other embodiments, visual resources are input, at (824), into an AI cinemograph creator to generate a cinemograph visual asset, see FIG. 10. In some embodiments, a human, at (825), accesses the visual resources (822) and generates a video loop. In other embodiments, visual resources (822) are input, at (826), into an AI video loop creator to generate a video loop visual asset, see FIG. 11. In some embodiments, a human, at (827), accesses the visual resources (822) and generates a collage visual asset. In other embodiments, visual resources (822) are input, at (828), into an AI collage creator to generate a collage visual asset.

Figure 10:
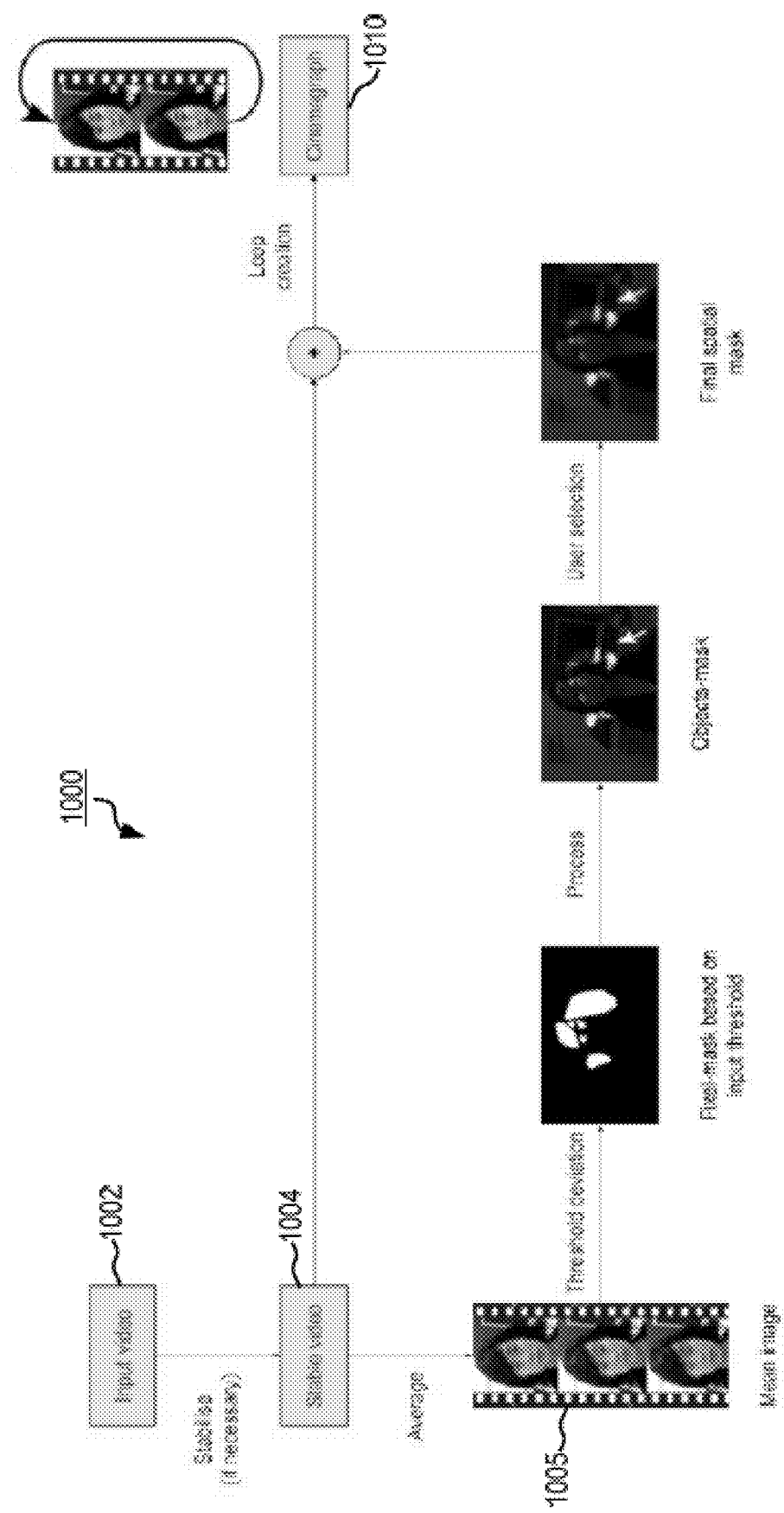
FIG. 10 is a block diagram of an exemplary cinemograph creator in accordance with the present disclosure.

FIG. 10 is a block diagram of an exemplary Cinemograph Creator (1000) in accordance with the present disclosure. The Cinemograph Creator (1000) automates the production of cinemographs (1010) from images and videos (input at (1002)) available in a video resources, for example, visuals database (830). The cinemograph (1010) is generated based on textual elements (e.g., textual elements (122)—tags, topics and descriptive copy) obtained from an audio segment, such as audio segment (126). In some embodiments, a motion description of an image may be provided or generated that will lead to the animation of a certain part of the image or video according to the motion description. The description can be also used to generate new cinemographs (1010) based on the existing resources. The cinemograph creator (1010) may start with the recognition of objects based on a description in images and videos and follow with using of the selected image(s)/videos(s) to produce Cinemographs (1010). In some embodiments, a video stabilization module (1004) is used to generate an average image using the mean value of frames (1005).

Figure 11:
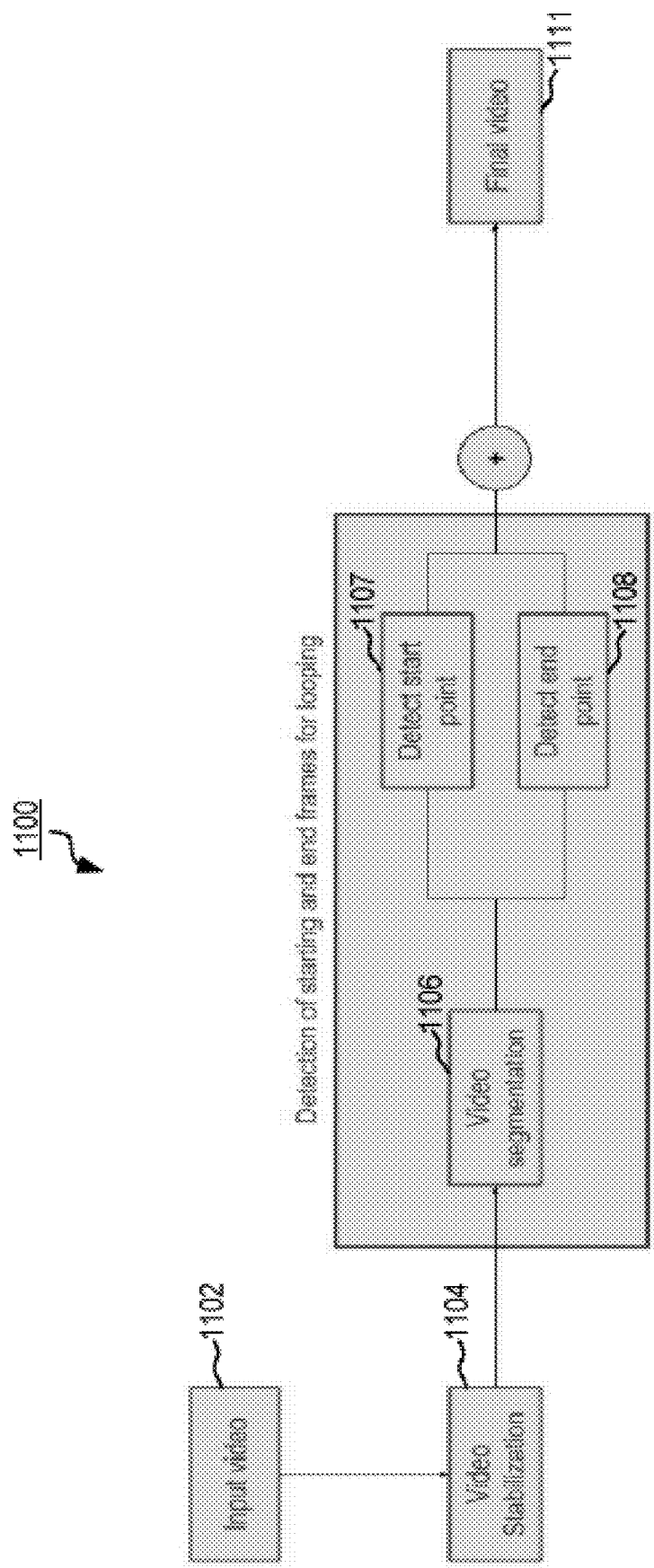
FIG. 11 is a block diagram of an exemplary video loop generator in accordance with the present disclosure.

FIG. 11 is a block diagram of a video loop creator (1100) for generating a final video loop (1111). Generally, video loops are generated only from videos differently from cinemograph which is generally, a visual asset (128) analogous to something between an image and video. That is, cinemographs, such as cinemograph (1010) animate a certain part of an image or video and a video loop (1111) animates the entire scenery. The Video Loop Creator (1100) automates the production of video loops (1111) from videos (input at (1102)) available in a video resources, for example, visuals database (830). The video loop (1111) is generated based on textual elements (e.g., textual elements—tags, topics and descriptive copy) obtained from an audio segment, such as audio segment (126). In some embodiments, a video stabilization module (1104) is used to generate an average image using the mean value of frames. At block (1106), the video input at (1102) is segmented and a start point (1107) and end point (1108) of a video segment are defined (either by an administrator or through a Computer Vision Algorithm or Machine Learning Algorithm).

The prepared visual assets are stored in a visuals database (830), which also may be part of a data storage device, such as data storage (144). In some embodiments, the prepared visual assets are described/associated with textual elements (122), including titles, tags, and short summaries at (832), by a human. In some embodiments, the prepared visual assets are described/associated with titles, tags, and a descriptive copy at (834), by an AI algorithm, as described above. The indexed visuals (tagged with textual elements) are stored in a Final Visuals Database FVDB (836).

In some embodiments, at block (840), a human selects and pairs an indexed segmented audio file (841) with an indexed visual asset (842) and generates a packaged audio segment (844) ("Marbyl™"). In other embodiments, at block (845), a computer algorithm pairs an audio file (841) with a visual asset (842) and generates a packaged audio segment (846) (Marbyl™").

Figure 12:
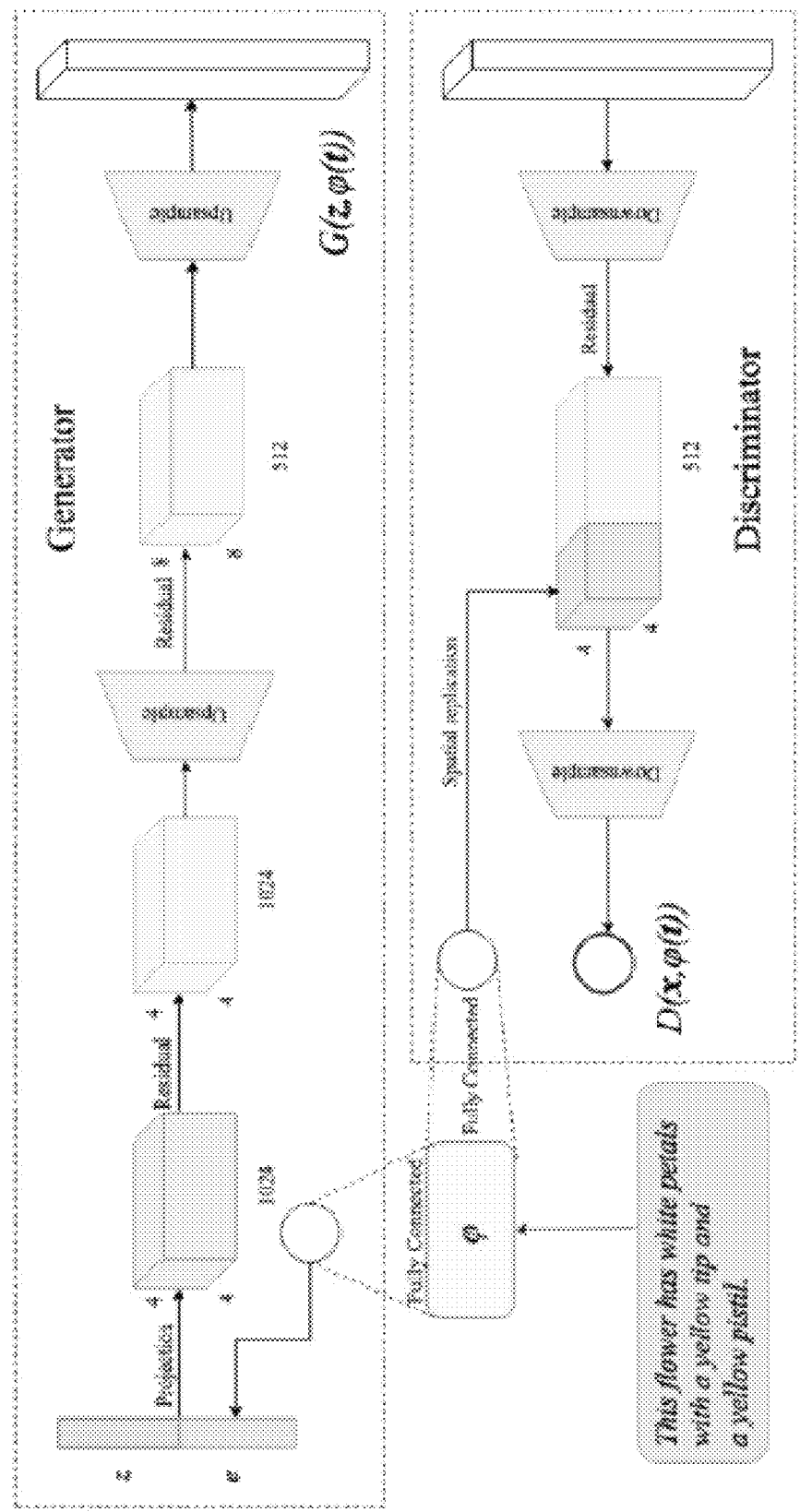
FIG. 12 a block diagram of an exemplary system for generating a visual asset from a textual element using a Generative Adversarial Network in accordance with the present disclosure.

FIG. 12 is a block diagram of an exemplary system (1200) for generating a visual asset (128) from a textual element (122) using a Generative Adversarial Network. That is, given a text description, a visual asset which matches that given text description must be generated. After partitioning audio, an algorithm, such as those described above, generates tags, titles and a descriptive copy that are used for generating a visual asset.

Figure 13A:
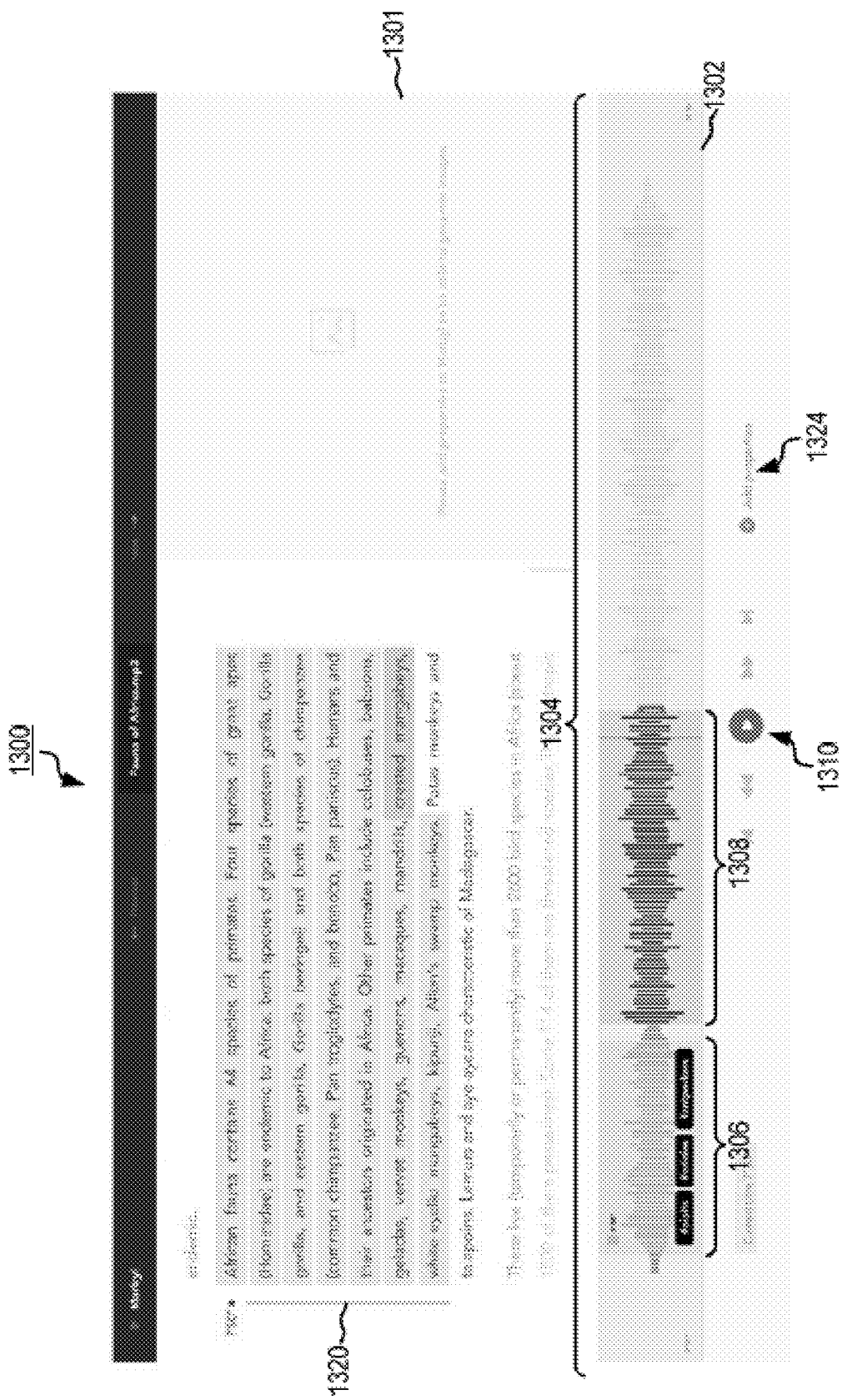
FIGS. 13A-C are exemplary screenshots of a platform-independent visualization of audio content system in accordance with the present disclosure.
Figure 13B:
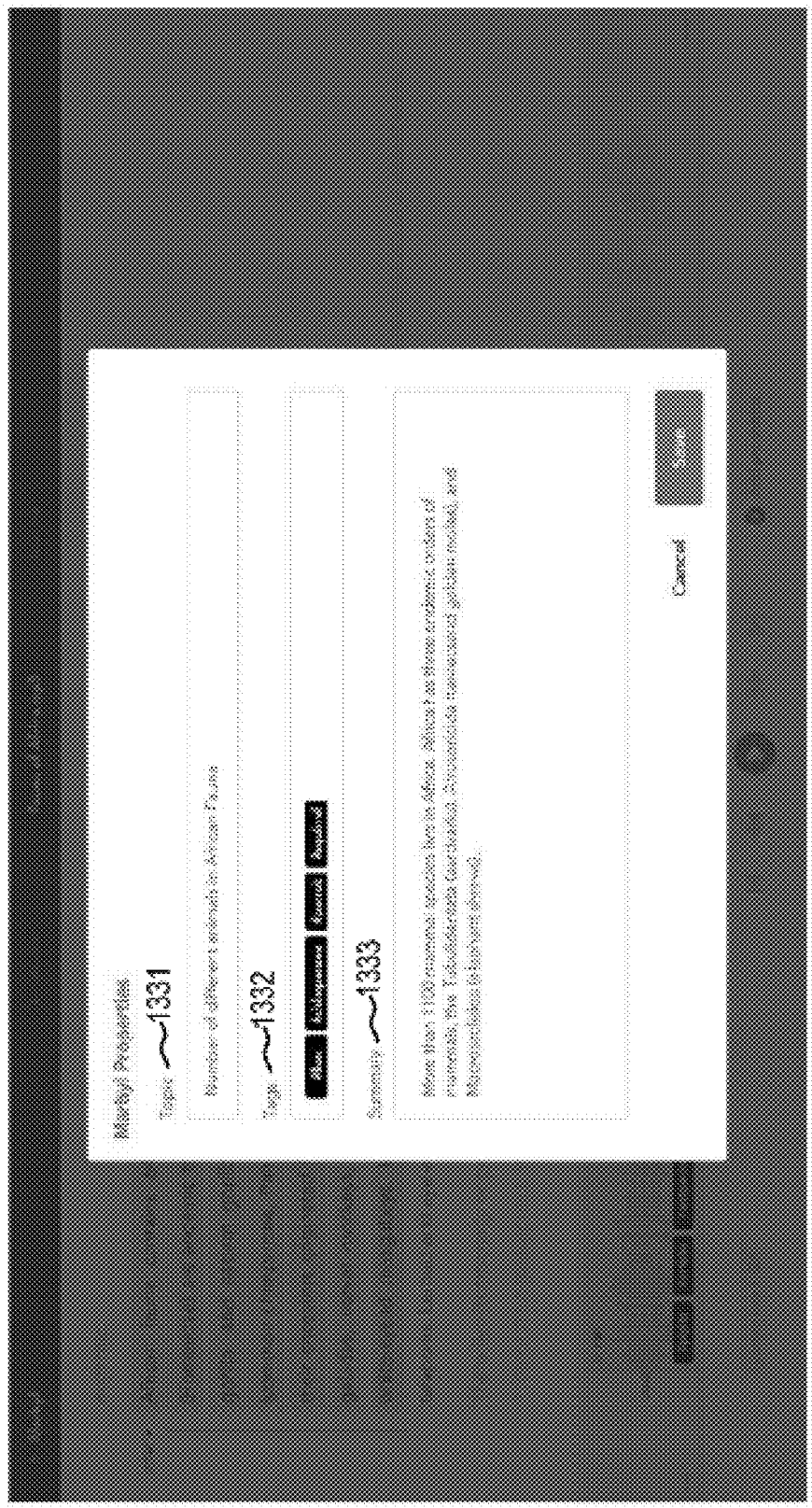
Figure 13C:

FIGS. 13A-13C are an exemplary embodiment of a platform-independent visualization of audio content system (1300). FIG. 13A illustrates an exemplary screen shot (1301) of a platform-independent visualization of audio content system (1300). In the lower part of the figure is a progress bar (1302) that represents an entire audio track (1304). The progress bar (1302) includes two audio segments (1306) and (1308) of the audio track (1304). A media player (1310) is embedded in the software and is configured to manipulate (play, pause, rewind, forward) the audio of the audio track (1304). In some embodiments, the platform-independent visualization of audio content system (1300) provides the text (1320) of the spoken content of the audio track (1304), generated by a voice recognition module such as voice recognition module (112) of FIG. 5. The provided text (1320) may aid an administrator reviewing the audio content for better understanding of the subject and better labeling. In some embodiments, the audio content system provides a link (1324) that directs users and/or administrators to add/edit textual elements to an audio segment (1306, 1308), e.g., (title/topic (1331), keywords/tags (1332), and descriptive copy/summary (1333)), illustrated in FIG. 13B.

FIG. 13C illustrates another exemplary screen shot of a platform-independent visualization of audio content system (1300). Based on the textual elements, e.g., (1331-1333), algorithms directed to generating and suggesting visual content as described above, will offer matching visual assets (1340). In some embodiments, users, administrators, and automated processes/devices may select certain visual assets (1340) for pairing with the audio segment (1306, 1308).

Figure 14A:
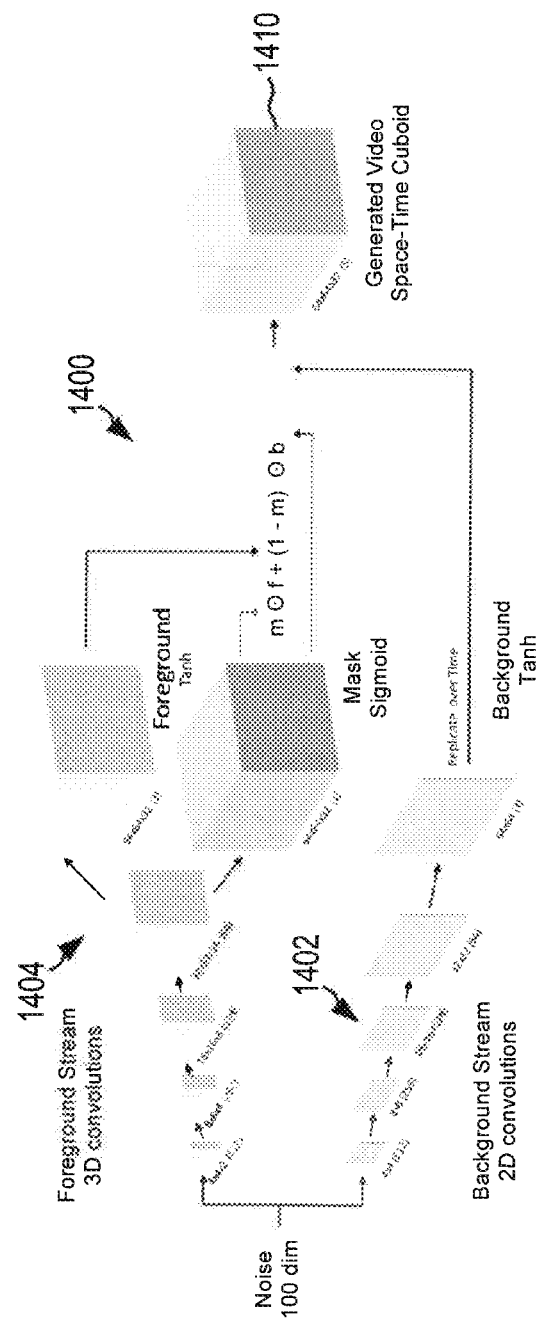
FIG. 14A is a block diagram of an exemplary image generator in accordance with the present disclosure.
Figure 14B:
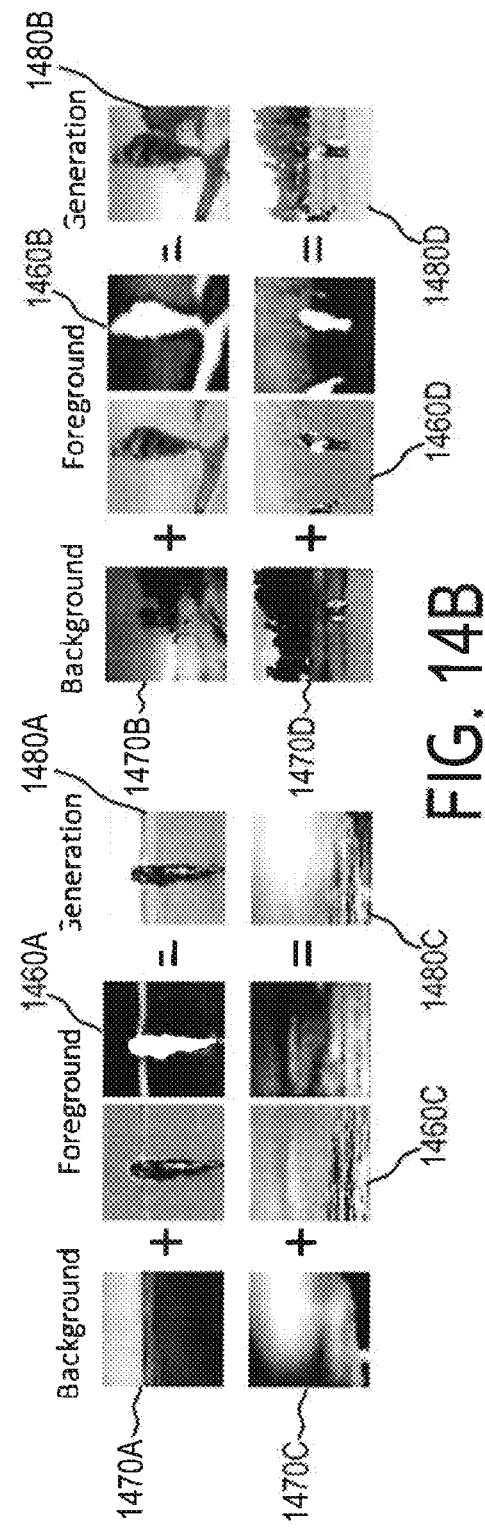
FIG. 14B illustrates exemplary images produced by the image generator of FIG. 14A.

In some embodiments and with reference to FIG. 14A, an AI Image Generator (1400) is utilized for the creation and/or assignment of visual assets, such as visual assets (128). The Image Generator (1400) takes background from one image (shown as image path (1402)) and combines it with the foreground of another image (shown as image path (1404)). In some embodiments, a collage is created by stitching the foreground and background images together. In other embodiments, multiple foreground and background images are stitched together, producing a cinemograph or short video (1410). Background and foregrounds are selected based on extracted tags, topic names, summaries, keywords, and the like. FIG. 14B illustrates exemplary visual assets (1480A-D), generated by the combination foreground (1460A-D) and background (1470A-D) elements.

The present disclosure is further illustrated in the following non-limiting working example, it is being understood that the example is intended to be illustrative only and that the disclosure is not intended to be limited to the materials, conditions, process parameters and the like recited herein. The example below illustrates an exemplary implementation of the technology disclosed herein.

First, a dataset of audio tracks (podcasts) was downloaded. Each podcast was at least a half an hour in length and up to one hour in length. The subject of the Podcasts in the dataset was "history" including Roman Empire, World Civilization, WWII, or similar. The dataset contained at least 1000 unique podcasts in the English language.

Next, the podcasts of the dataset were labeled with three different labels $L_1$-$L_3$ for each podcast were created.

Figure 15:
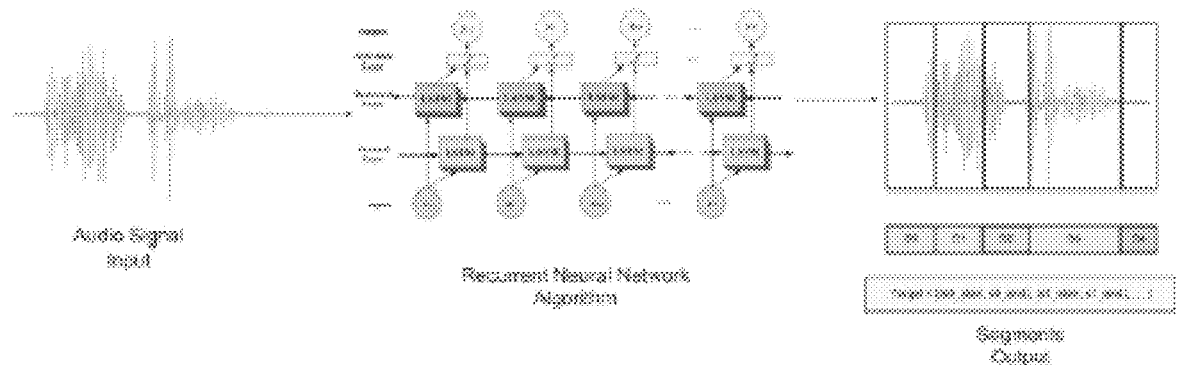
FIGS. 15-20 illustrate exemplary labels implementing a platform-independent visualization of audio content system.

Label Type One ($L_1$): A list of pairs, where each pair contains the start time and end time of each segment (e.g., segment (126)). See FIG. 15.

$$L_1 = \{[s0\_start, s0\_end], [s1\_Start, s1\_end], \ldots\}$$

Figure 16:
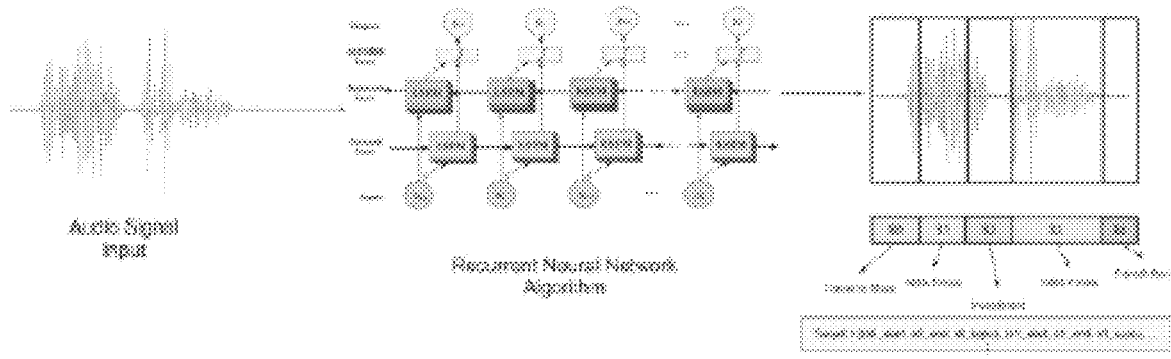

Label Type Two ($L_2$): A list of triplets, where each triplet contains the start time, end time, and a topic name of each segment (e.g., segment (126)). See FIG. 16.

$$L_2 = \{[s0\_start, s0\_end, s0\_topic], [s1\_Start, s1\_end, s1\_topic], \ldots\}$$

Figure 17:
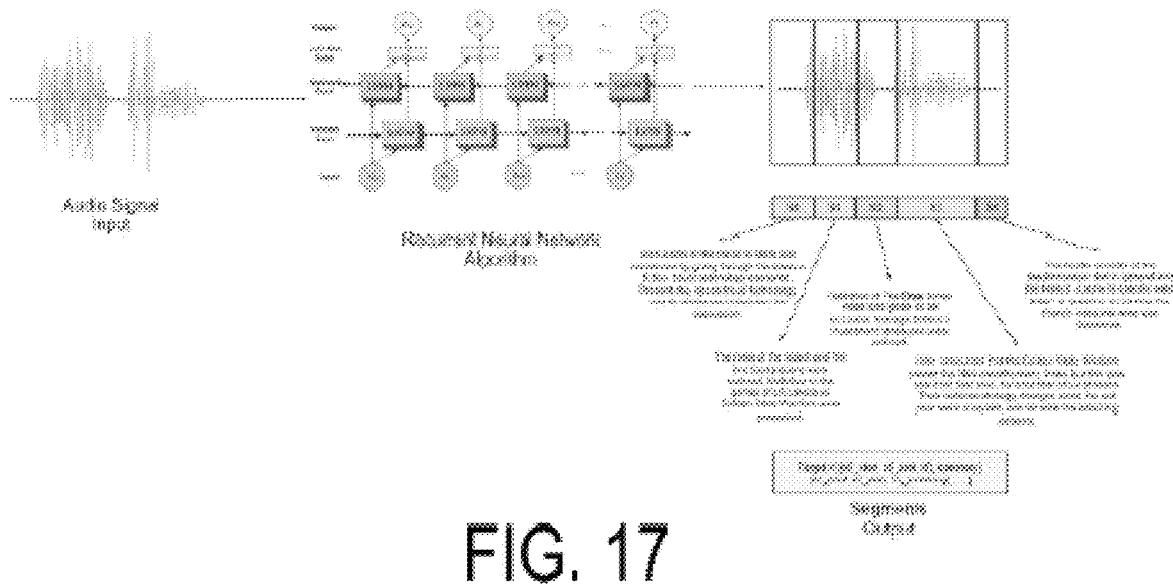

Label Type Three ($L_3$): A list of triplets, where each triplet contains the start time, end time, and a summary name of each segment (e.g., segment (126)). See FIG. 17.

$$L_3 = \{[s0\_start, s0\_end, s0\_summary], [s1\_Start, s1\_end, s1\_summary], \ldots\}$$

Next, Segmentation algorithms were made using all three labels ($L_1$-$L_3$) separately. For each label, a Segmentation Algorithm was built and, in the end, results were compared and evaluated.

Next, a pre-trained or new model was set up to convert speech to text, or available APIs for example, Google Cloud® or Watson IBM® or similar were used.

New labels from text from speech were generated, wherein each label was one of $L_4$-$L_6$.

Figure 18:
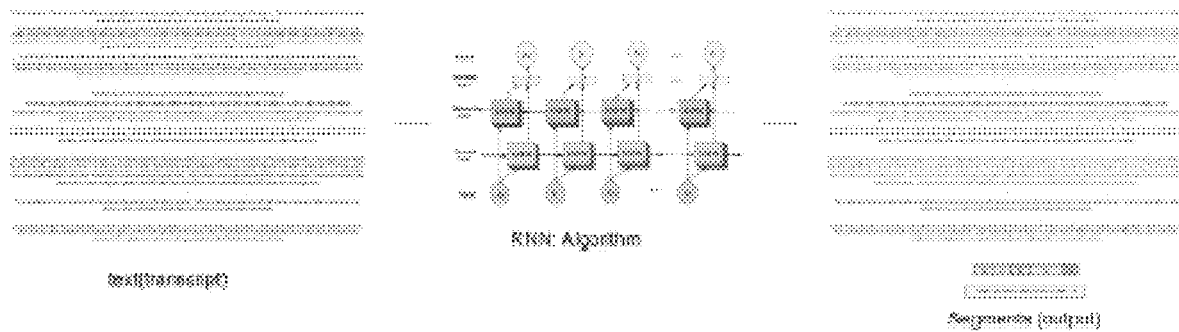

Label Type Four ($L_4$): A list of pairs, where each pair contains the first word, and last word of each segment (e.g., segment (126)). See FIG. 18.

$$L_4 = \{[s0\_first, s0\_last], [s1\_first, s1\_last], \ldots\}$$

Figure 19:
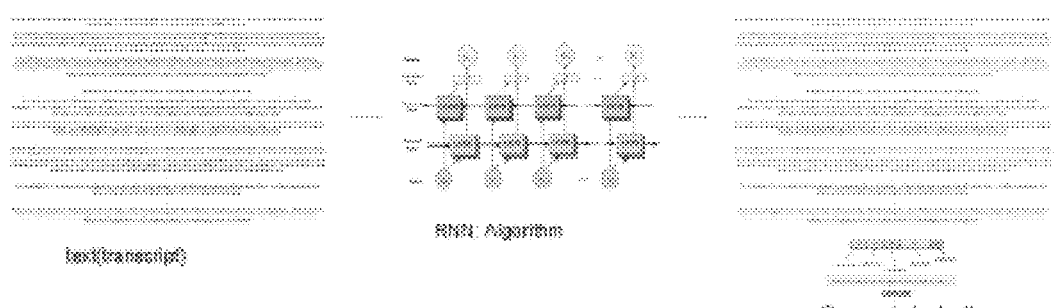

Label Type Five ($L_5$): A list of triplets, where each triplet contains the first word, last word, and topic name of each segment (e.g., segment (126)). See FIG. 19.

$$L_5 = \{[s0\_first, s0\_last, s0\_topic], [s1\_first, s1\_last, s1\_topic], \ldots\}$$

Figure 20:
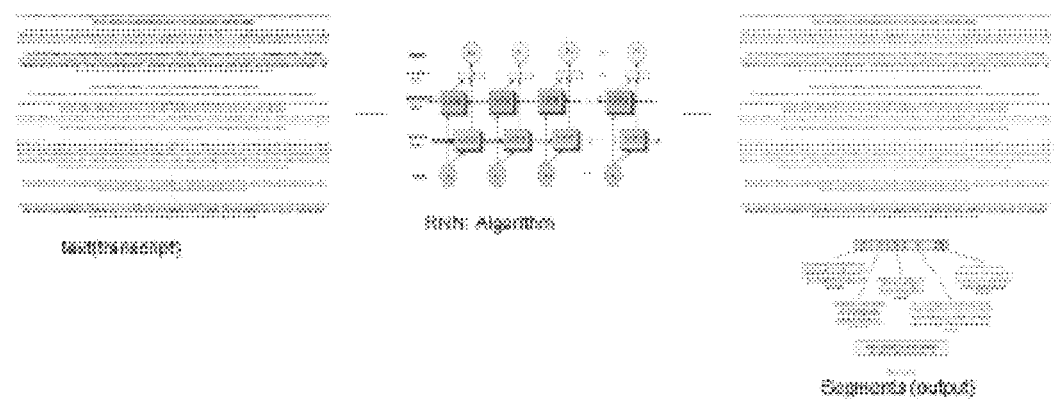

Label Type Six ($L_6$): A list of triplets, where each triplet contains the first word, last word, and summary of each segment (e.g., segment (126)). See FIG. 20.

$$L_6 = \{[s0\_first, s0\_last, s0\_summary], [s1\_first, s1\_last, s1\_summary], \ldots\}$$

Lastly, another three Second Segmentation Algorithms were made using all three text labels ($L_4$-$L_6$) separately. For each label, the Second Segmentation Algorithms were built, and the results were compared and evaluated. The example described herein provided an understanding of the feasibility and scalability of each approach.

Multi-Model Analysis and Management Pipeline

One in three Americans are now listening to podcasts, but a significant portions of those users find conventional podcast platforms difficult to use—due to the nature and volume of podcast audio, relevant podcasts are difficult to find and listen to without expending significant time and effort. Even in popular and user friendly conventional platforms, users have difficulty subscribing to podcasts, managing individual downloads, and distinguishing new podcasts from previously listened podcasts.

An average podcast episode is about 46 minutes long, and listings for a podcast may include little or no description of the general or specific content covered in the podcast. Users are wary of trying new podcasts due to the length and scant information, and taking a broad approach by subscribing to many podcasts that appear interesting based on a brief text description can result in an overwhelming number of daily or weekly episodes.

Since podcasts are audio, and typically not associated with strong textual/visual content, it is difficult to effectively share podcasts via social media and other platforms. As with a primary listener, potential secondary listeners that see a simple link on a social media platform are unlikely to listen to a 46 minute long audio segment, which may include lengthy introductory sections or sponsored sections.

Further, a primary listener may share a podcast to a group of potential secondary listeners based on a particular sub-segment of that podcast. For example, the primary listener may have enjoyed a 5 minute portion of a 60 minute podcast, and may share that podcast with others hoping that they will listen to at least that 5 minute portion. Often the user may suggest that particular portion by its time within the podcast (e.g., "Check this podcast out—the section at 23:45 is great!"), however this is an informal, inaccurate, and ineffective way to identify interesting sub-segments since other users may have difficulty navigation to that portion, or their overall audio may be of a different length due to the addition of advertisements/other factors.

While the disclosure above provides systems and methods for automated identification and/or creation of relevant sub-segments, such approaches may have the potential to produce a high volume of sub-segments with visually associated elements, but which may still require some manual review and/or curation in order to identify sub-segments that are likely to be interesting and distinguish those from sub-segments of little interest. By utilizing audio transcription analysis methods, which may include expert modules, artificial intelligence modules (e.g., machine learning), and/or other appropriately configured pattern recognition modules the system is able to quickly identify brief sub-segments (e.g., a single sentence, a small collection of related sentences, or between about 10 seconds of audio and about 60 seconds of audio) from lengthy portions of audio. In this manner, the system may advantageously process tens of thousands or even millions of different podcast episodes, representing many millions of minutes of audio content, and automatically identify, with a high degree of confidence, one or a handful of brief sub-segments from each that might be used to promote the episode.

Figure 21A:
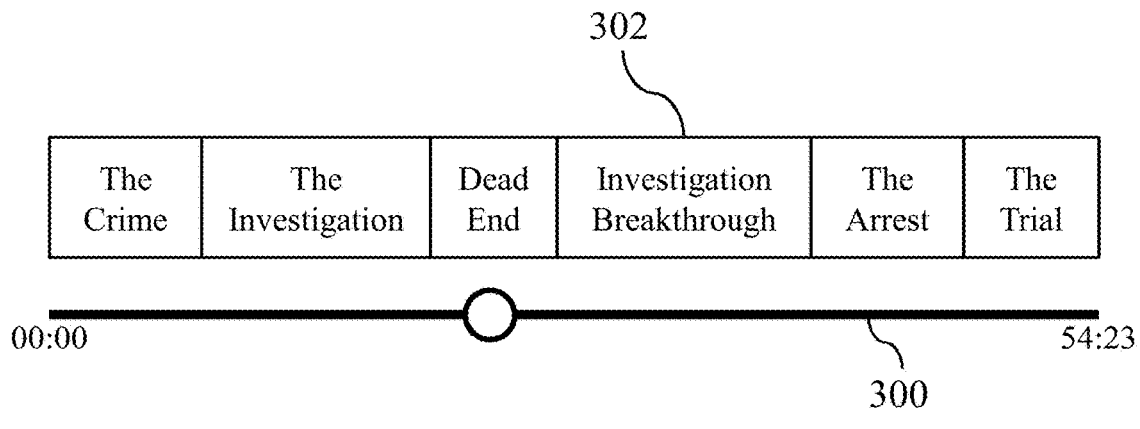
FIG. 21A shows an exemplary interface for interacting with a podcast audio.

FIG. 21A shows an example of a user interface that may be presented to a user of the system when listening to a podcast episode, and which includes a timeline control (300) for navigating to and listening to portions of the podcast, and an initial topical segmentation (302) of the podcast which may depend on a classification of the podcast by genre (e.g., a true crime podcast might be segmented into dynamic segments or pre-configured segments, such as a segment covering the crime, the investigation, a breakthrough in the investigation, an arrest, and a trial).

Figure 21B:
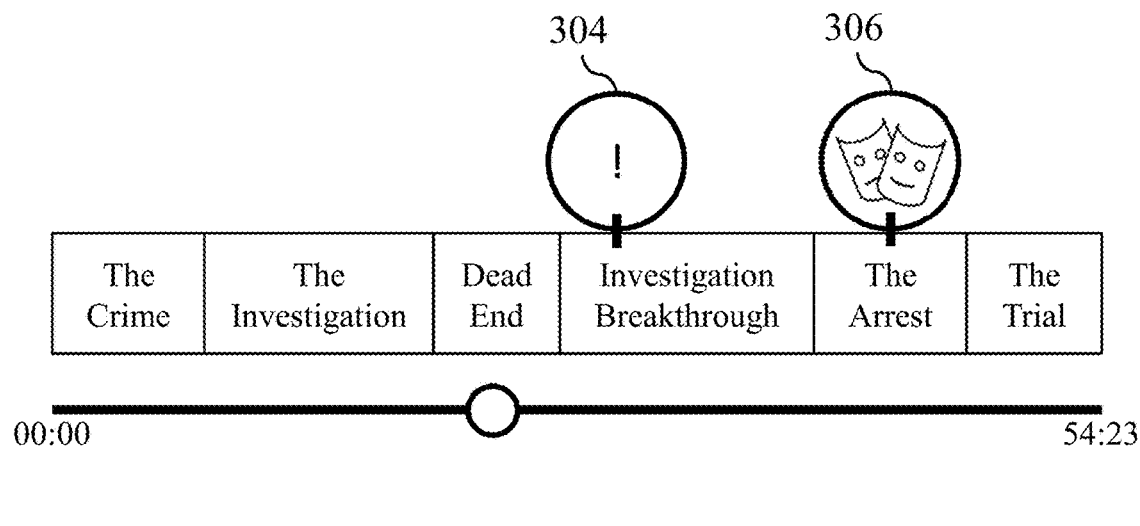
FIG. 21B shows the interface of FIG. 21A with icons and user controls added for viewing and navigating to certain automatically identified moments within the podcast audio.
Figure 21C:
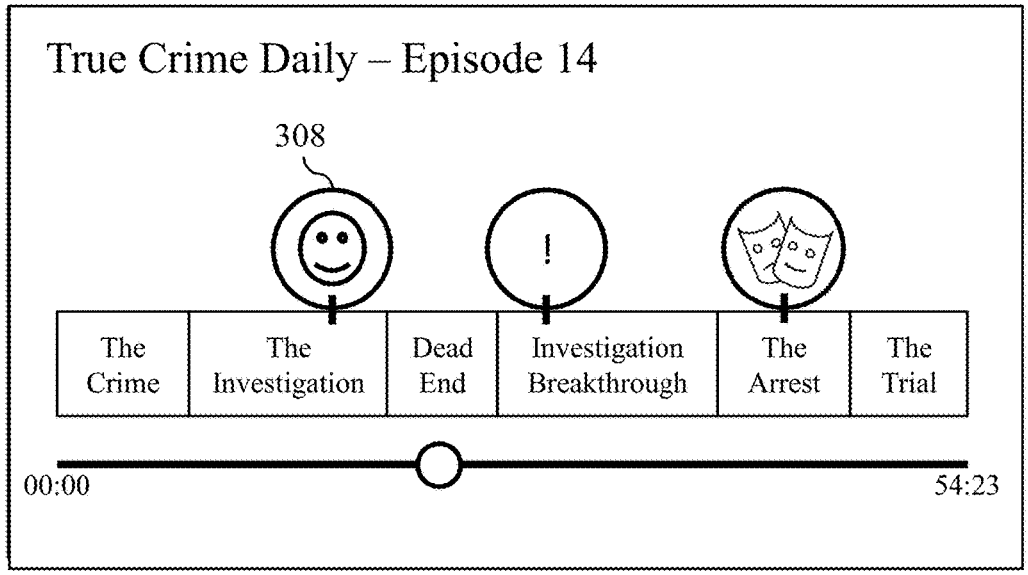
FIG. 21C shows the interface of FIG. 21B with an icon and user control added for viewing and navigating to certain manually identified moments within the podcast audio.

FIG. 21B shows the interface of 21A with several automatically identified moments that are visually highlighted by icons (304, 306), which may be selected by a user to automatically navigate to and listen to that moment. A first automatically identified moment (304) may be visually presented to indicate it is of general interest (e.g., by color, symbol, shape, text, or other visual characteristic), while a second automatically identified moment (306) is visually presented to indicate is an interesting comedic moment. Users of the system may also manually identify moments, and share those moments with friends, followers, or other users on the platform. FIG. 21C shows the interface of 21B with a first manually identified moment (308), which may be visually presented to indicate that it has been identified by another user as an interesting moment. The moment (308) may include a photograph of a person or an image of an avatar associated with the creating user, and may also include additional visual characteristics defined by that user (e.g., the user may provide a brief description of why they marked it, or may include a manual identification of the moment as an interesting comedic moment (306).

Figure 21D:
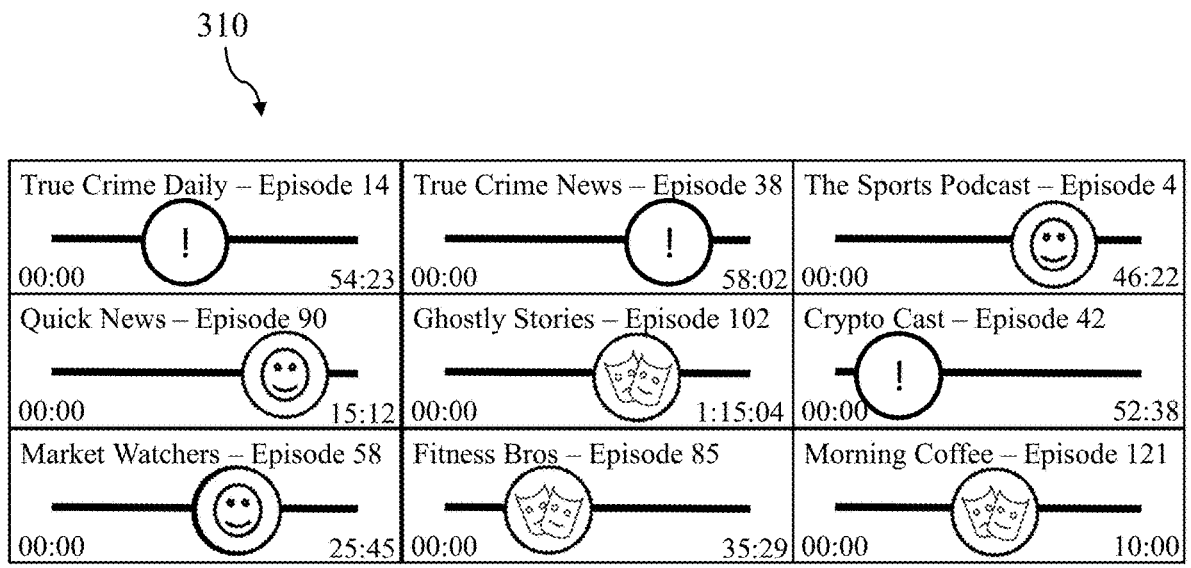
FIG. 21D shows an exemplary interface for viewing a plurality of podcast audio, including icons and controls for viewing and navigating to certain identified moments within the plurality of podcast audio.

FIG. 21D shows a multi-podcast interface (310) that combines elements of the interfaces of FIGS. 21A-21C, and that a user may interact with in order to view a plurality of podcasts, play audio from a podcast, navigate within a podcast timeline, and click on automatically identified moments (e.g., such as moments (304, 306, 308)) within one of a the plurality of podcasts to listen to the automatically or manually identified moment within that podcast.

The plurality of displayed podcasts may have one or more marked moments that may be selected to listen to that audio moment by itself, or within the context of the complete audio podcast. For example, a podcast may have an automatically identified moment that is marked as an interesting comedic moment, and a manually identified moment that another user of the platform marked. In some implementations, a single moment may be both automatically and manually marked (e.g., automatically marked as an interesting comedic moment, and manually marked by another user). In some implementations, multiple users may manually mark the same moment, and that moment may be visually displayed in any of the described interfaces with images or other identifiers that identify some or all of the multiple users that have marked the moment.

Figure 21E:
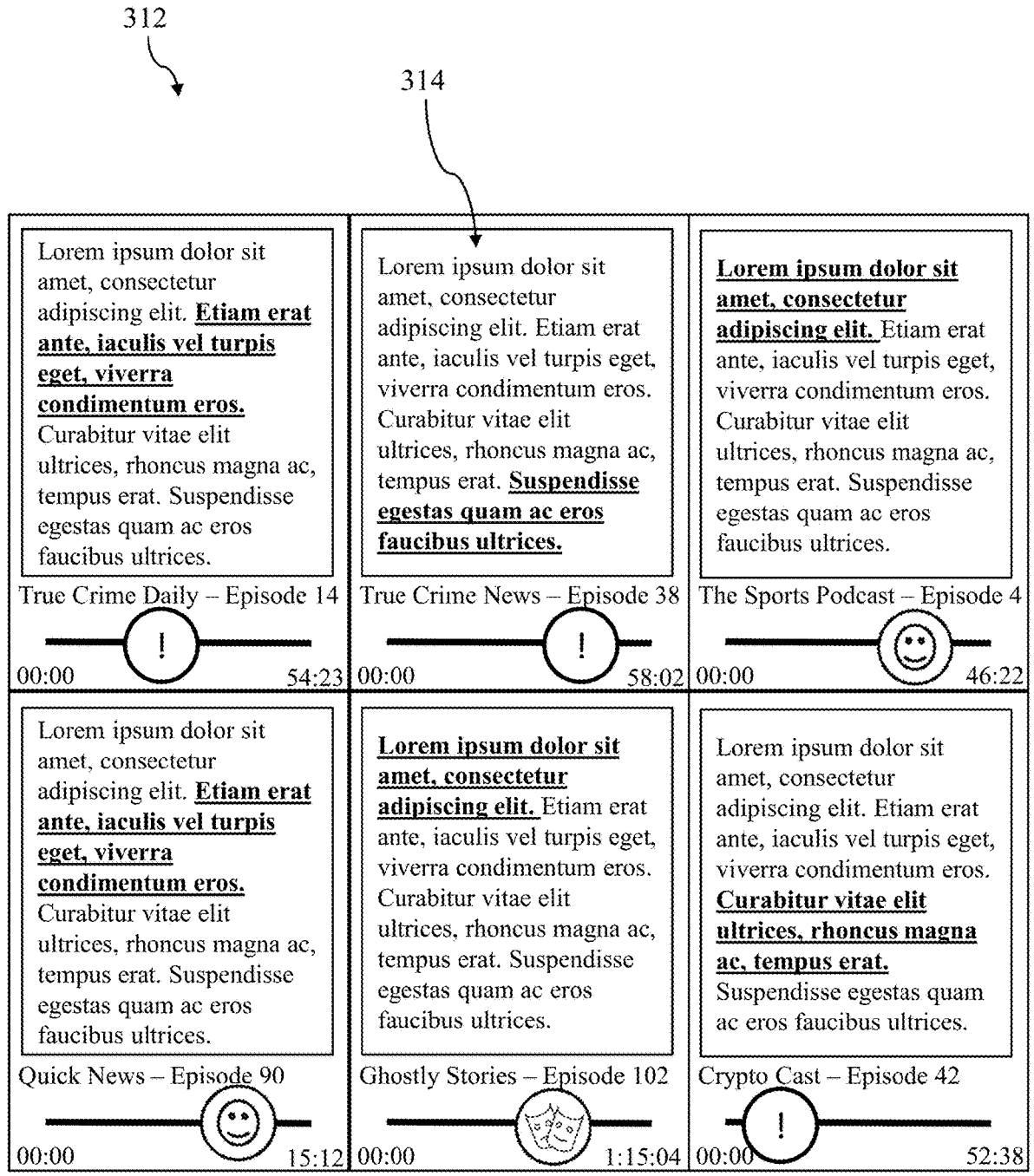
FIG. 21E shows the interface of FIG. 21D, expanded to show transcript text related to the certain identified moments within the plurality of podcast audio.

Moments may also be displayed along with comments from users that have manually marked the moment, or may be displayed with text transcribed from the audio content underlying the moment, or other information as has been described herein. As an example, FIG. 21E shows a multi podcast interface (312) similar to that shown in FIG. 21D, but that additionally includes display of transcript text (314) generated from the podcast audio for each podcast episode and each moment. The transcript text (314) that is displayed may include the transcript text for the moment, as well as transcript text that precedes the moment, follows the moment, or both, and such text may be displayed with visual characteristics that identify the text associated with the moment (e.g., in FIG. 21E, the moment text is displayed as bolded and underlined). The transcript text (314) allows users to see the text surrounding a particular moment which might provide context to the moment itself, and in some implementations the transcript text (314) may be interacted with (e.g., clicked, hovered over, selected) in order to navigate to that moment in the podcast audio. The interface (312) may provide users additional ways to view and navigate the transcript text (314) and podcast audio, and may include text searching and navigation, word cloud viewing and navigation, and other ways to view and navigate the complete transcript of an episode. In some implementations, the transcript text (314) may also be interacted with in order to navigate between episodes of a podcast (e.g., to see what other episodes have talked about a particular topic) or to navigate between different podcasts (e.g., to see what other topics have talked about a particular topic).

This type of cross-linking between disparate transcripts of different episodes and/or different podcasts is possible because the automatic analysis performed by the system in order to identify moments is also capable of identifying named entities within the transcript text. A named entity may be understood as a real-world object, such as a person, a location, an organization, a product, etc., and may be identified as being distinct and referring to a distinct entity as compared to generalized noun usage. Identification of named entities across a plurality of podcasts and episodes allows a particular named entity appearing within the transcript text (314) to be visually distinct to indicate that it may be interacted with in some way to see additional information about that named entity. The provided additional information may include, for example, comments from other users, moments identified by other users, or other automatically identified moments that include the same named entity, or may identify other episodes of the same podcast, or other podcasts, that discuss or describe the named entity. This may be useful where a user finds a particular moment to be very interesting and may wish to learn or hear more about a named entity involved with that moment, and so may interact with the transcript text (314) to see or listen to such additional information.

It should be understood that while FIGS. 21A-21E show interfaces as both singular to an episode (e.g., FIG. 21A) and including a plurality of episode (e.g., FIG. 21D), any of the interfaces shown and described may be displayed for a single podcast, or for a plurality of podcasts, as may be desirable for a particular implementation. As described herein, a multimedia moment may include the underlying data and/or presentation of underlying data as shown and described in FIGS. 21A-21E and 22B, and so may include some or all of complete or partial episode audio, an interface for playing and navigating associated episode audio, an episode title, description, transcript dataset, and other associated text, images, icons, symbols, colors, graphics and other associated visual elements, moments identified within complete or partial episode audio (304, 306, 308) and interface controls for playing, viewing, or interacting with those moments, navigational elements or cross linking between multimedia moments or between users associated with multimedia moments, and other elements described herein and apparent to those of ordinary skill in the art based on the disclosure herein, whether provided, viewed, or interacted with on a first party platform where multimedia moments are created, or on a third party platform where multimedia moments have been shared.

Figure 22A:
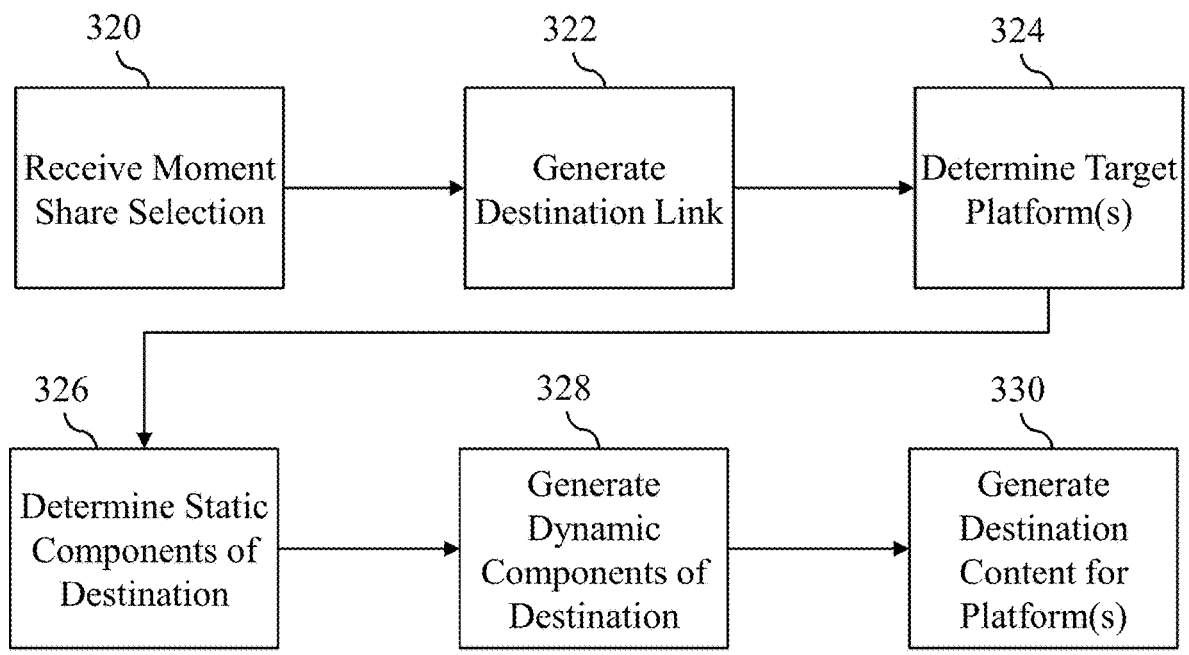
FIG. 22A shows an exemplary set of steps that may be performed with a system to share moments to third party platforms.

The disclosed platform and interfaces may also include controls and features to enable users to share moments and related information (e.g., such as the information shown in FIGS. 21A-21E) to one or more social media platforms or other channels. As an example, FIG. 22A shows a set of steps that may be performed by the system to generate and format moment content for display on a third party platform. The system may receive (320) a moment sharing selection from a user, via an interface such as that of FIG. 21C. The system may generate (322) a destination link for that specific shared moment, which may be a new URL or other web location, or may be a link to a specific page or location for the moment that is already present on the platform. The system may determine (324) the target platform or platforms to which the moment is to be shared, and may determine (326) a set of static components for the shared destination and/or platform(s), and may generate (328) a set of dynamic components for the shared destination and/or platform(s). The target platform may be determined (324) as part of sharing the moment, or may be determined each time that the shared moment is displayed on that target platform, or may be determined each time that the a user from the target platform follows a link to moment.

When determining (326) static components for inclusion in the destination, the system may choose components such as the episode name, podcast name, episode date, episode length, portions of transcript text, portions of transcript text associated with manually or automatically identified moments, icons, graphics, avatars, or other images for the podcast and/or episode, and other pre-existing content that is statically associated with the shared moment. Determination (326) of static components may be based upon configurations for the specific podcast, or the original source of the podcast (e.g., some podcasts and/or podcast platforms may be configured with the system to prevent re-use of static components such as graphics when sharing moments).

When generating (328) dynamic components for inclusion in the destination, the system may generate some components in each case, and may generate some components only when particular static components (326) are unavailable or unusable. Generated (328) dynamic components may include, for example, selecting background colors, text colors, text font, and other stylistic options for how the shared moment will appear on the target platform(s), and may also include selection of generic images, icons, or other assets that are unavailable or unusable.

The system may then generate (330) the content for the destination link based on the static and dynamic components, as well as the target platform(s). Generation (330) of content may be on a per-platform basis and on-demand, or may be performed for all supported platforms by including particular tags and styles in the underlying destination content that are recognized and interpreted by target platforms when shared. As one example, the generated (322) destination link may be created when the moment itself is first created, and may include embedded tags and attributes that are recognized by social media platforms, and that influence the manner in which the destination link appears when embedded or otherwise partially displayed on those platforms.

Figure 22B:
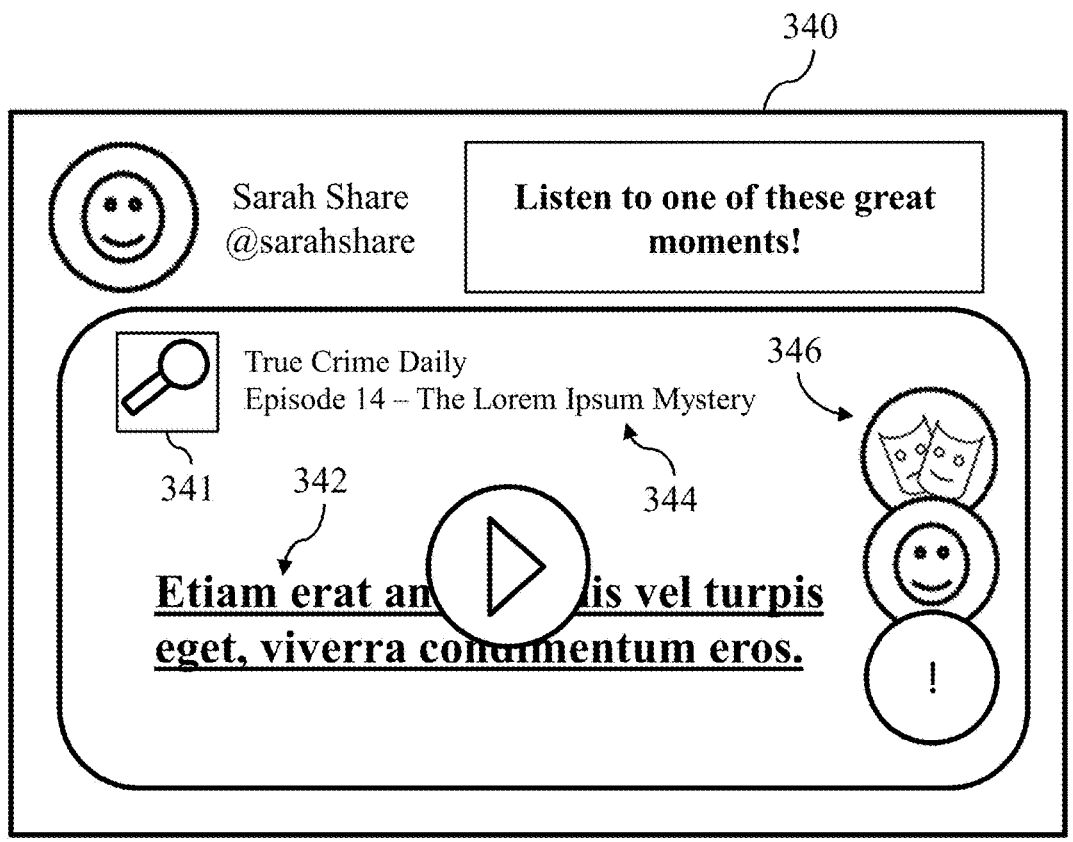
FIG. 22B shows an exemplary interface such as may be displayed when a moment is shared to or embedded in a third party platform.

As an example with reference to FIG. 22B, that figure shows an embedded or partially displayed moment (340), such as it might be displayed when a generated (322) destination link is shared via that platform. The background color, text color, font style, and other style characteristics of the shared moment (340) may be determined by the generated (328) dynamic components. As one example, a particular font style for the moment text (342) may be selected based upon the podcast genre, or moment type (e.g., specific font style might be assigned for a moment from a true crime podcast, specific font or style might be assigned for a moment that is a comedic moment). As another example, the text color, background color, and other color characteristics may be automatically selected based on genre or moment, or may be automatically derived from an image, icon, or picture associated with the podcast (e.g., the system may be configured to analyze that image, identify the two most commonly used colors, and use those colors as the background color and/or text color), which may provide an automated styling that is similar to that of the podcast's cover art and/or episode specific images.

The moment (340) may also be displayed with an icon (341), which may be statically (326) associated with the podcast and/or episode, or may dynamically (328) select an icon based on the podcasts and/or episode genre or other characteristic. The moment (340) may also include transcript text (342) from the shared moment (e.g., such as the transcript text (314) described above). The moment (340) may also be displayed with static (326) content that describes the podcast and/or episode (344), and may include the podcast title, episode title, author, episode length, and other details. The moment (340) may also include icons (346) and/or text identifying the type of one or more moments that are associated with the shared moment (340) and/or the underlying episode. Depending on the target platform, the shared moment (340) may also include an interactive play button that allows the moment to play from an embedded element within the target platform, or may include a link that may be clicked to navigate to the generated (322) destination link, or both. As can be seen from FIGS. 22A and 22B, the system may advantageously provide single click capabilities to share sub-segments of podcasts to third party platforms in a way that supports variable use of static and/or dynamic components, and that effectively conveys the unique information available to the platform (e.g., moment audio, transcript text associated with moment, moment tags, etc.) via those third party platforms. As will be apparent to those of ordinary skill in the art, users following links from target platforms to interfaces of the disclosed system may be provided limited access to the disclosed features (e.g., access to a particular moment, but no ability to navigate from that moment to other audio within that episode and/or other episodes, as has been described above), and may be prompted to join or register with the system to gain full access.

The interfaces and features described in FIGS. 21A through 22B make reference to manually and automatically identified moments. While manual identification of moments may be based upon administrator and/or platform user feedback and curation, accurate and meaningful automation identification of moments is not a trivial task or one that is known in conventional arts. Such automated evaluation of moments for marking as described above may be reliably performed using a multi-model analysis and management pipeline ("MAMP"), as will be described in more detail below. In some implementations, the MAMP includes a base model (e.g., a machine learning model) that is configured to identify generally interesting moments within a podcast, without regard to the podcasts specific genre, sub-genre, or other category. The base model is configured to evaluate an episode and identify a plurality of the most interesting moments and a plurality of the least interesting moments within the podcast. The most and least interesting moments may be used to reinforce the base model, and may also be used to guide genre specific, subgenre specific, or even podcast specific models when combined with supervised learning and training of those models, as well as feedback and manual marking activities from users (e.g., a user may listen to an automatically identified interesting moment, and may manually mark that moment as being a comedic moment, which may cause that moment to be added into a growing training dataset for a comedy genre specific model).

When automatically identifying moments, the system may, for each podcast episode audio as input, use the most granular model available for analysis (e.g., the model that applies most narrowly to the episode based on the characteristics of the episode, which may be referred to as a focused moment model), or may use a combination of two or more models for analysis. As an example, in some implementations, when analyzing audio for an episode of a true crime podcast, the system may identify the audio's genre, sub-genre, and podcast name (e.g., such characteristics may be configured and provided from the audio source, or may be determined based upon natural language processing of the audio transcript). The system may start from the most granular model that might be available, a podcast specific model based on the podcast name or title, and if such a model is not available, may determine if a sub-genre specific model (e.g., the sub-genre may be "true crime, unsolved mysteries") is available, and if such a model is not available, may determine if a genre specific model is available (e.g., the genre may be "true crime"), and if such a model is not available, may instead use the base model (e.g., as described above). The output of the applicable model may be identification of a plurality of most and least interesting moments, specific to that genre, sub-genre, or podcast, which are usable as described herein (e.g., as moments displayed or recommended to users, and as subsequent training data). In other implementations, the system may analyze the podcast using some or all of the applicable models (e.g., some or all of the base model, true crime model, unsolved mystery model, and podcast specific model may be used to analyze the episode), with the resulting output being similarly used.

Model analysis of episode content may be performed with varying approaches depending upon a particular implementation. As an example, in some implementations analysis of episode content may include analyzing each complete sentence (e.g., as determined by punctuation, moments of silence, or natural language processing) in the transcript dataset in substantially the sequence that they occur (e.g., including sequential/parallel analysis where the analysis multi-threaded), such that each individual sentence in the transcript dataset is associated with a likelihood, score, or confidence that indicates the likelihood that it has the characteristics of the target moment. In some implementations, model analysis may exclude certain portions of the transcript dataset from the analysis, such as the first five minutes of the episode, or the last five minutes of the episode. In some implementations, model analysis may start in locations of the content where historical analyses have typically found the best moment matches (e.g., a particular podcast may historically have a very high occurrence of matching moments at the approximate mid-point of the episode), and then work outwards towards other portions of the content. In some implementations, filtering of episode content or preferential analysis of portions of episode content may be a strict filter (e.g., the model will never analyze the first five minutes, or the last five minutes of content), while in others such filtering or preference may be used to prioritize analysis (e.g., if analyses of unfiltered and/or preferred portions fails to identify a threshold number of most and/or least moments, analysis may proceed to previously filtered or non-preferred portions until the threshold number of moments is met).

Figure 23A:
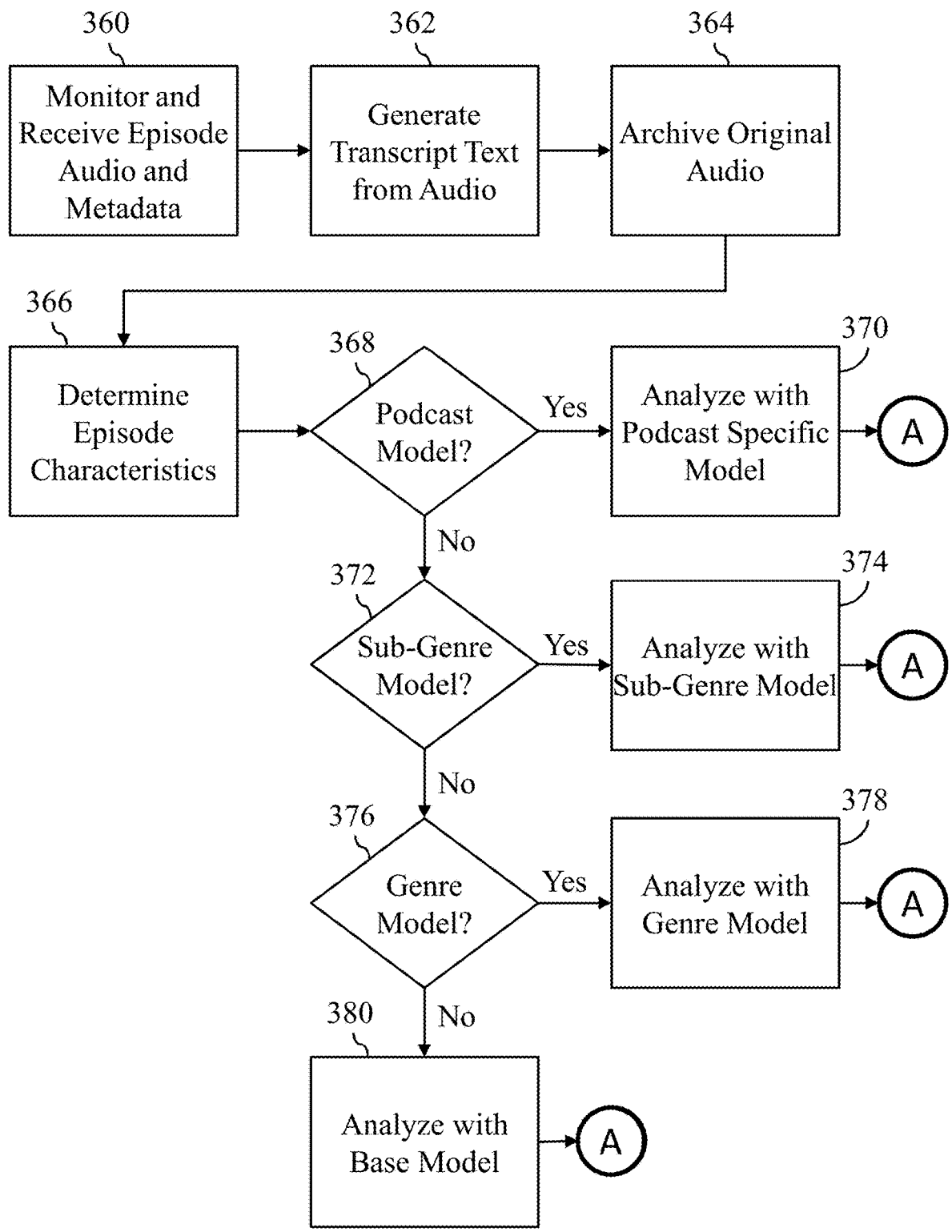
FIG. 23A shows a first portion of an exemplary set of steps that may be performed with a system to automate creation and management of analytic models that are configured to identify moments within podcast audio.
Figure 23B:
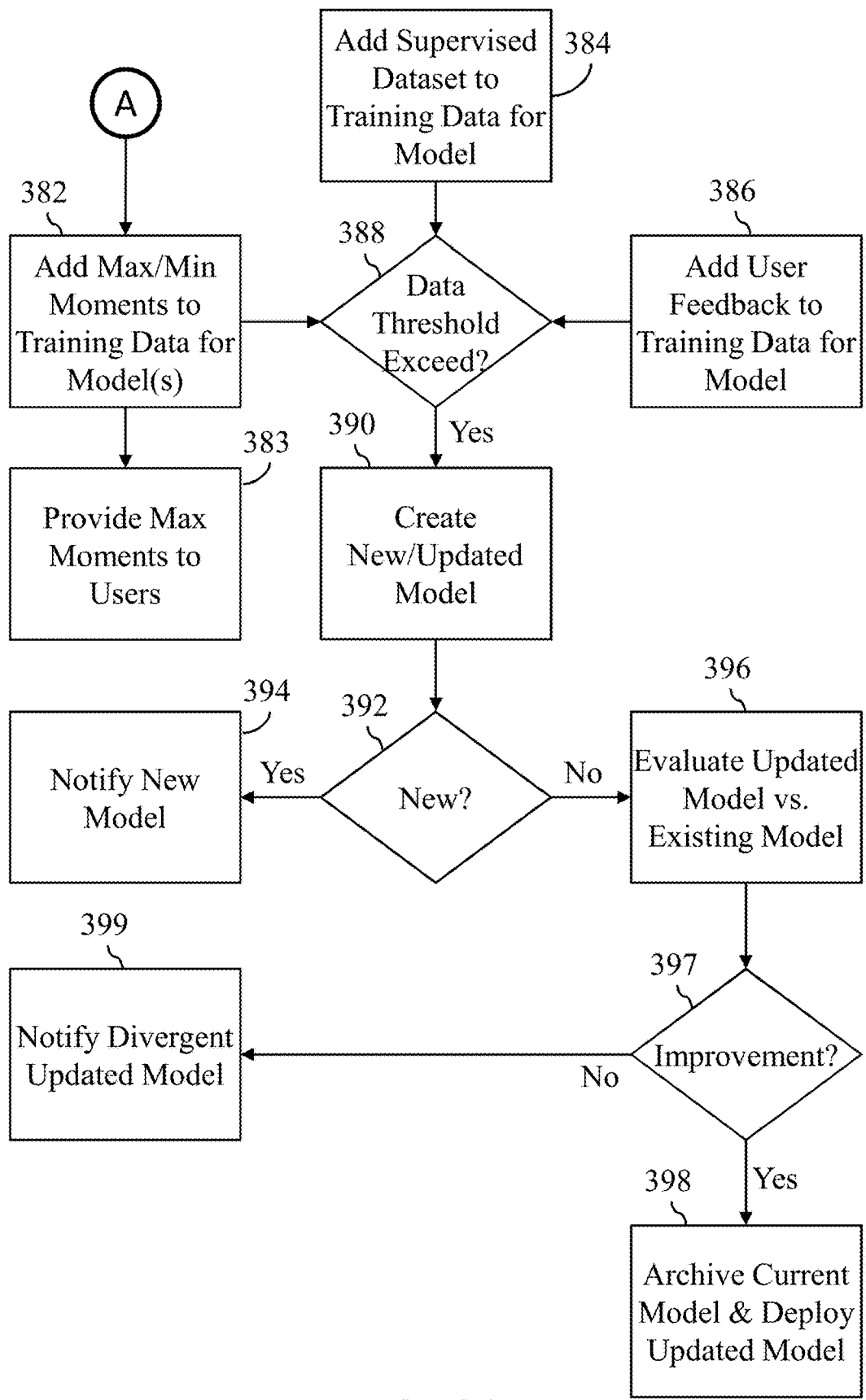
FIG. 23B shows a second portion of the set of steps of FIG. 23A.

Turning now to FIGS. 23A and 23B, those figures show a set of steps that may be performed by the system while providing and executing the MAMP. The system may actively monitor a plurality of channels, interfaces, or other sources (e.g., such as an RSS feed, or a podcast publishing interface) for newly available audio from podcast episodes and may receive (360) episode audio as it becomes available. Received (360) episode audio may also be paired with certain episode metadata, which may include the podcast title, episode title, release date, length, genre, sub-genre, and other details. The system may generate (362) a transcript dataset from the episode audio, which may be performed using conventional transcription software and methods. In some implementations, the generated (362) transcript may include additional indicators from the episode audio beyond speech to text transcription, which may include, for example, indications of periods of silence, indications of laughter, indications of background music or sound effects, indications of audio amplitude, and other non-speech characteristics. The generated (362) transcription may be time indexed such that any single word or other indicator in the transcript corresponds to a time location within the episode audio.

With a generated (362) transcript, the system may archive (364) the original audio in a database or other long-term storage. While the original audio may have some subsequent use, such as when improvements to the transcription (362) process become available and it may be desirable to re-factor historic audio to improve the accuracy or depth of transcription, real-time access to the full episode audio is not required for the remaining steps of FIGS. 23A and 23B, and so that data may be archived (364) in an efficient manner (e.g., persistent offline archival, with some temporary local/online storage of the episode audio or segments of the episode audio).

The system may determine (366) determine one or more characteristics of the episode audio, which may be performed based upon the received (360) metadata (e.g., an RSS feed may alert the system to a new episode, and may also provide that episode's title, duration, genre, sub-genre, etc.), may be manually configured for each podcast (e.g., all episodes coming from a particular podcast may be pre-configured with a particular genre or sub-genre), and/or may be determined based upon natural language processing or analysis of the transcript dataset (e.g., the podcast title, episode title, genre, sub-genre, or other details may be determined based upon analysis of the episode content).

The system may then determine one or more moment models to apply to the transcript dataset in order to automatically identify relevant moments occurring within the transcript dataset and the corresponding episode audio. As has been described, a moment should be understood to include a portion of a sentence, a sentence, or a set of related sentences, from a transcript dataset and/or corresponding episode audio, that has a particularly high relevance to a particular moment type. A moment type should be understood to describe the characteristics of a moment as they relate to a particular category or genre, or as they might be interpreted or perceived by a user.

As an example of moment types, interesting moments or great moments might include those that are analyzed as very likely to be interesting to a general audience. As described above, a moment model such as the base model described above is configured to identify interesting moments. Another example might be a quotable quotes model, which is configured to identify moments that are self-contained quotes that can be attributed to a single person, and that are analyzed as very likely to be interesting or compelling to a user. Another example might be comedy moments model, which is configured to identify moments that are analyzed as very likely to be humorous to a user. Another example might be a surprising fact model, which is configured to identify moments that describe factual information, and that are analyzed as very likely to be interesting or compelling to a user.

As another example, moment models may include podcast specific models, such as a model that is configured to identify interesting moments within the context of a specific podcast (e.g., a podcast specific model may be configured using training data from the base model, produced from prior use of the podcast specific model, received as feedback from users interacting with podcast specific moments, received as a supervised selection of training data, or a combination thereof). Other moment models may be genre specific (e.g., true crime, sports, news, politics) and may be configured based upon similar training data (e.g., base model, self-generated, feedback-based, supervised selection). Other moment models may be sub-genre specific (e.g., true crime: unsolved mysteries, sports: college basketball, news: bizarre news, politics: uplifting politics) and may be configured based upon similar training data (e.g., base model, self-generated, feedback-based, supervised selection).

A moment model should be understood to include an analytic model that is configured to analyze a transcript dataset for a particular moment type and provide as output a plurality of positive moments that have a high relevance to the applicable moment type, and a plurality of negative moments that have a low relevance to the applicable moment type. Output from a moment model may include, for example, scores or ratings for a plurality of analyzed moments that indicate a confidence that the model has in the relevancy of the moment to the particular moment type, or may include a list of the most relevant and least relevant moments, or both. As used in the preceding, "high" and "low", or "most" and "least", or other similar descriptions of relevance to an applicable moment type may be determined based upon whether a score from the moment model exceeds a certain threshold for "high relevancy" or does not exceed a certain threshold for "low relevancy". As another example, such relative descriptions of relevancy to an applicable moment type may be determined based upon a preconfigured number of maximally/minimally relevant moments (e.g., high relevancy may be determined as the 5 moments with highest relevancy score, low relevancy may be determined as the 5 moments with lowest relevancy score). As another example, the system may determine such relativity based upon other factors (e.g., based on non-speech indicators in the transcript text, such as periods of silence, laughter, background music, sound effects, high amplitude, low amplitude, etc.), or based upon a combination of factors, such as moments that both exceed a configured score threshold and are within the top 5 scoring moments.

Returning to FIG. 23A, the system may determine (368) if there is a podcast specific model configured for the specific podcast, and if there is a podcast specific model, may analyze (370) the transcript dataset with the podcast specific model. If not, the system may determine (372) if there is a sub-genre model configured for the podcast's sub-genre, and if there is a sub-genre model, may analyze (374) the transcript dataset with the applicable sub-genre model. If not, the system may determine (376) if there is a genre model configured for the podcast's genre, and if there is a genre model, may analyze (378) the transcript dataset with the applicable genre model. If not, the system may analyze (380) the transcript dataset with the base model. As has been described, the output from analysis with a model may include a plurality of moments including positive and negative moments and, for each moment, may include a score, rating, or other metric that indicates a confidence in whether the metric is positively associated with the moment type (e.g., a moment that is very likely to be interesting) or negatively associated with the moment type (e.g., a moment that is very likely to be uninteresting). Each of the preceding analysis steps (370, 374, 378, 380) proceeds to node A in FIG. 23B.

With reference to FIG. 23B, the system may add (382) a plurality of maximal moments, and a plurality of minimal moments, selected from the output from model analysis, to the training data for one or more of the moment models. As an example, where analysis with the base model identifies five positive interesting moments, and five negative interesting moments, the system may add those ten moments into the training data, or "data corpus", for the base model, along with metadata or annotation that describes the moment (e.g., this may include the relevancy score or rating, and/or may include manual annotation from an administrator of the system). That training dataset is used to build and configure the base model, and by adding (382) additional data to that training dataset over time, the system may improve and evolve over time through unsupervised and supervised self-reinforcement. Continuing the above example, where the base model is used to analyze a transcript dataset for a podcast that is associated with a genre, sub-genre, or other model type, some or all of the set of ten moments may also be added to the training dataset for a corresponding podcast specific model, genre specific model, or sub-genre specific model. This may be advantageous to build initial training datasets for podcast specific, genre specific, and sub-genre specific models that have not yet been created, due to the lack of sufficient training data.

As a more specific example, with a podcast having genre: comedy, sub-genre: comedy-films, the system may analyze that transcript dataset using the base model, as the system may lack sufficient training data to produce a genre or sub-genre specific models for comedy and comedy-films. The output from analysis by the base model may be added to the training dataset of the base model, as well as the training datasets for the more granular models (e.g., genre: comedy, sub-genre: comedy-films) that are associated with the podcast. Where a comedy genre model is available, the system may instead analyze the transcript dataset with that model, and the output may be added to the training dataset of the comedy genre model, as well as the training dataset for the more granular comedy-films sub-genre model. In this manner, the system may automatically populate training datasets for existing and new moment models, allowing existing moment models to improve over time, and allow new training models to be created and deployed for use.

In order to utilize these automatically populated training datasets, the system may be configured with certain thresholds for each of the training datasets (e.g., the base model, as well as each podcast specific, genre, and sub-genre model may have a different configured threshold) that, when exceeded, cause the system to create (390) an updated model or a brand new model based upon the updated training dataset.

In addition to adding (382) a plurality of maximally and minimally relevant moments to the applicable training datasets based upon the results of model analysis, the system may also provide (383) some or all of the maximally relevant moments to users via interfaces such as those illustrated in FIGS. 1 through 4, FIGS. 21A through 22B, and elsewhere herein. The provided (383) moments may be searchable and viewable from amongst a plurality of automatically or manually identified moments, may be shared between users or on third party platforms as has been described, and may be automatically recommended to one or more users of the platform based upon their user configured preferences. As an example, a user that follows or has subscribed to a particular podcast may receive notifications for each provided (383) moment that is identified in that podcast. As further example, a user that has configured an interest in true crime, or specific true-crime sub-genres, may receive notifications for each provided (383) moment that is associated with the true crime genre or applicable sub-genre. Notifications for providing (383) moments to users may include, for example, email, text, or other electronic communications including links usable to view the moment, mobile application notifications, website dashboard recommendations or notifications, and other communications.

As has been described, other information may be incorporated into training datasets beyond that added (382) from model analysis results. As one example, the system may receive and add (386) certain user feedback to the training datasets for affected models. In this example, the system may provide users an interface for viewing and/or listening to audio for a certain moment, and then automatically prompt the user for feedback on whether and/or to what extent they agree with the designation of that moment. For example, a moment produced by the base model may be presented to a user with a prompt such as "Did you find this interesting?" with a yes or no response option, or a scaled response option between 1 and 10, or other response options. Such feedback may be received by the system and used to update the base model training dataset, which may include, for example, increasing the positive or negative weight of the moment within the training dataset (e.g., by modifying associated metadata or annotation to increase or reduce confidence, by removing the moment from the training dataset, etc.). Feedback prompts may also be related to a particular podcast, genre, or sub-genre model. For example, a moment produced by the base model or a comedy genre model may be presented to the user with a prompt such as "Was this a funny moment?" with various response options. Feedback may be used to modify the comedy genre model training dataset, which may be especially advantageous where the initial analysis was performed using the base model, because the comedy genre model has not yet been created. In this manner, the automated population of training datasets for genre, sub-genre, podcast, and other specific models is further enhanced by automation of user feedback to reinforce and improve those training datasets even before the corresponding models are actively in use.

As another example, the system may allow administrative users to add (384) data to one or more training datasets in a supervised manner, which may include the selection and addition of manually selected and curated datasets that are similar to the moments that a particular moment model is intended to identify. This may be useful to provide initial seed data to a training dataset, or to push a new training dataset beyond the threshold (388) required to produce a corresponding moment model. For example, where the system lacks a working comedy genre model, an administrative user may select and add (384) a set of supervised data (e.g., text, metadata, annotation) to the training dataset for the comedy genre model. The content of the selected data will vary by genre, sub-genre, podcast, etc., but for a comedy genre model the selected data may include, for example, a list of jokes or other text pulled from a comedy website, a list of user posts or messages that include laughter emojis or certain text (e.g., "LOL" or "HAHA") pulled from a social media platform or website, transcript or script text associated with comedy films, television shows, or the like, and other sources.

While the specific sources will vary greatly to obtain the particular intended outcome, the source of such supervised data can generally be characterized as a source that shares similarities with the moments that the model is desired to identify. When adding (384) similar data having a positive correlation to the target moments, the system may also add (384) a corresponding set of dissimilar data having a negative correlation to the target moment (e.g., in each case, along with any metadata, annotation, or other data). Continuing the example above, when adding (384) 10,000 sentences to the training dataset that are each a joke sourced from a humor website, the system may also add 10,000 sentences that are not believed to be humorous, and so may be automatically extracted from legal documents, product instructions, warnings, and specifications, works of fiction or non-fiction that describe sad or serious events, and other similar sources.

It is generally desirable that the training dataset for a model contain a wide variety of data, and that it also be fairly well balanced, and so the system may take additional automated steps as data is added to a training dataset to maintain the quality of the data. This may include, for example, scanning the training dataset to ensure balance between positive related moment examples and negative relative moment examples, and where there is a significant enough imbalance (e.g., exceeding a configured threshold), limiting the addition of new training data until a desired balance is achieved (e.g., if various additions (382, 384, 386) result primarily in the addition of positive related examples, the system may automatically reduce the number of positive example additions (382) from analysis results, or may warn or prevent supervised (384) addition of positive examples). Other data quality steps taken by the system may include, for example, de-duplication of moment examples within the training dataset. As a result of various manual and automated populations of the training dataset, the dataset may end up with identical or near-duplicate moment examples in some instances (e.g., a particular moment may be added to a comedy genre dataset as the result of analysis by the comedy genre model of a transcript dataset, and may be added to the comedy genre dataset a second time as the result of analysis by a comedy sub-genre model of the same transcript dataset). To avoid this, the system may intermittently scan the training datasets to identify similarities between moment text, annotation, or metadata, and may cull or combine any identified duplicates.

Returning to FIG. 23B, inputs to one or more training datasets may exceed (388) a configured threshold for such dataset, and result in the creation (390) of an updated or new moment model based on the updated training datasets. Where the created (390) model is a new model (392) (e.g., such as creation of a comedy genre model where none has previously existed) the system may notify (394) one or more users, system administrators, or other parties of the creation of the new model so that they have the opportunity to review, evaluate, or take such other steps prior to deploying the new model for use. Where the created (390) model is instead an updated version of a previously existing model (392), the system may automatically evaluate (396) the updated model against the existing model by analyzing a set of shared evaluation data with each model and comparing the results (e.g., which model performs better in identifying and correctly evaluating particular moments seeded into the evaluation data). As an example, the shared evaluation data may be transcript text from a particular podcast episode, or may be a manually generated transcript text, that includes particular text that is selected and intentionally seeded due to its likelihood to be positively or negatively identified by the moment.

Where the automated evaluation (396) shows an improvement (397) of the updated model over the existing model, the system may archive the current model and deploy (398) the updated model for use in analyzing episode transcript datasets (370, 374, 378, 380). Where there is no improvement or substantially regression in the results of evaluation (396), the system may notify (399) one or more users, system administrators, or other parties of lack of improvement (397) so that they have an opportunity to examine the model, updates to the training dataset, and other factors to determine the cause.

As has been described, amongst the advantages of the above disclosed system is the ability to automatically grow training datasets, produce new and updated models, and deploy models with little or no intervention. It should further be understood that these steps occur without compromising the normal performance of the system, for example, some or all of those steps shown in FIG. 23B may be performed in parallel with the steps illustrated in FIG. 23A (e.g., the system may create (390) and evaluate (396) an updated model in parallel with the existing model's continued analysis tasks (370, 374, 378, 380).

Models for Topical Identification of Moments

As has been described, the selection of supervised datasets for inclusion in training datasets for models may vary greatly based upon the particular model and the desired outcome, but may generally be abstracted to the selection of a first plurality of text strings from a first source that is believed to be similar to or representative of the type of target moments that the model should identify, and the selection of a second plurality of text strings from a second source that is believed to be dissimilar to and not representative of the type of target moments. With this understanding, possibilities for the first source(s) and the second source(s) may be identified, and positively and negatively related text strings may be extracted, added to the training dataset, and used to produce and evaluate the desired model.

Extraction and inclusion of such data may be guided by some additional rules, such as restrictions on string length (e.g., minimum string length, maximum string length), restrictions on certain content (e.g., presence of certain punctuation, integers, symbols, or other non-alphanumeric text may prevent inclusion as a positive and/or negative example), restrictions on certain words, or other similar restrictions. Examples of sources from which appropriate string data may be extracted include informational websites (e.g., dictionary websites, encyclopedia websites, wiki-style websites for various topics, news websites, genre specific websites such as a car enthusiast website, or a sports enthusiast website), social media platforms, user discussion forums, product review websites, legal documents, historic documents, transcripts derived from audio performances in movies, songs, or other entertainment, technical documents or descriptions, websites for manufacturers of goods or providers of services, and other sources.

While moment models have largely been discussed as a singular model performing analysis independently, some moment models may advantageously be configured as a combined analysis by 2 or more discrete models. As an example, one system may include accurate existing models for a news genre model that identifies interesting discussions of news stories, and a comedy genre that identifies humorous discussion of various topics. The system may lack a sub-genre model for news: bizarre news. In such a scenario, the news: bizarre news sub-genre model may be configured to identify bizarre news moments based upon combined results of separate analysis by the news model and the comedy model. As further example, such a combined model may be configured to select maximally and minimally relevant moments based on their combined confidence score or rating from the news and comedy model analyses, with a configured minimum threshold for each (e.g., a moment that might not be identified as interesting news, or humorous content based upon an individual analysis would be identified as a bizarre news moment based upon a combined score, as long as each individual score was not below a certain configured threshold).

While descriptions of the disclosed technology may refer to subjective concepts such as "great moments", "interesting moments", "comedic moments", and so on, it is important to understand that the features, advantages, improvements, and solutions offered by the disclosed system are technical in nature, and solve technical problems that arise when assigning quantitative metrics to text and audio representations of subjective concepts. Thus, the focus of the disclosed technology is not to subjectively identify, as a person would, a "great moment" within text, but instead to provide a particular architecture (e.g., the MAMP) and steps (e.g., such as the steps shown and described in FIGS. 23A and 23B, and elsewhere) that addresses the technical inefficiencies and impossibilities of conventional approaches to text topical and/or sentiment analysis. As an example, conventional approaches and preferences for such analyses trend towards being very broad, regardless of the input type, source, or other characteristics, and so may include a single analytical model that attempts to solve for every situation, all possible data, and every potential insight from input.

Conventional approaches also trend towards considering every possible aspect that may be derived from input, and so given a portion of audio-video content would attempt to analyze and derive insights from voice/tone analysis, image analysis of still frames and images sequences for facial recognition/sentiment, object recognition for proximate objects within image frames and/or sequences, device characteristics such as recording device, browser, operating system, etc., geographical characteristics of the content, and so on. Where technical considerations such as processor time, network throughput, and short/long term storage capacity are taken into account, implementations of these broad and unfocused trends frequently become impossible to achieve at scale (e.g., providing accurate or meaningful results at a large scale and within a reasonable timeframe is impossible due to the technical constraints and the inefficient focus), or are impossible to achieve with meaningful results (e.g., sacrifices are made in the scope and quality of analytic models in order to achieve goals of scale and speed, resulting in poor quality output).

Conversely, implementations of the disclosed technology, such as those implementing features of the MAMP, achieve scalable, rapid, high quality analytical output due to features such as the refined approach to input selection, the multi-model architecture and approach to analyses that is driven by characteristics of the input, and the automated/unsupervised methods for populating training datasets and producing new and/or updated models, for example. Based on the above, it will be apparent to those of ordinary skill in the art in light of this disclosure that the preceding features others disclosed herein represent advantageous improvements on the existing technology, and are unconventional approaches to resolving technical problems in the existing technology.

Miscellaneous

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

In accordance with another and/or alternative non-limiting embodiment, there is provided an audio platform that identifies one or more "great moments" within a digital audio discussion and/or spoken narrative (audio tracks).

This platform uses machine learning algorithms to identify short-form segments in audio signal of an audio track containing spoken content that are identified as "great moments". The machine learning algorithms can be used to identify different kinds of "great moments" (e.g., "quotable quotes", "comedy moments", "surprising or interesting facts", etc.), and such "great moments" can be displayed to a user to enable the user to discover content in an audio track that is of interest to the user. One or more visual assets can optionally be associated with the one or more identified "great moments".

The "great moments in an audio track can be used to create or fuel social network interactions around such "great moments". The "great moments" can be shared with others, added to favorites of a user so that other following the user can view the saved "great moments", optional Marbyls, etc.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall there between. The invention has been described with reference to the preferred embodiments. These and other modifications of the preferred embodiments as well as other embodiments of the invention will be obvious from the disclosure herein, whereby the foregoing descriptive matter is to be interpreted merely as illustrative of the invention and not as a limitation. It is intended to include all such modifications and alterations insofar as they come within the scope of the appended claims.

To aid the Patent Office and any readers of this application and any resulting patent in interpreting the claims appended hereto, applicants do not intend any of the appended claims or claim elements to invoke 35 U.S.C. 112(f) unless the words "means for" or "step for" are explicitly used in the particular claim.

What is claimed:

1. A system for creating multimedia moments from audio data comprising:
   (a) a server comprising one or more processors;
   (b) a model database configured to store a plurality of moment models, wherein each moment model of the plurality of moment models is configured to identify a unique moment type, wherein the plurality of moment models comprises a base moment model;
   (c) a transcript database configured to store a plurality of transcript datasets, wherein each transcript dataset of the plurality of transcript datasets comprises text derived from corresponding audio data and is time indexed to the corresponding audio data;
   wherein the one or more processors are configured to:
      (i) receive an episode audio dataset;
      (ii) create a transcript dataset based on the episode audio dataset, and add the transcript dataset to the plurality of transcript datasets;
      (iii) determine whether the plurality of moment models comprises a focused moment model for the episode audio dataset, and use the focused moment model as a selected moment model;
      (iv) where the focused moment model is not within the plurality of moment models, use the base moment model as the selected moment model;
      (v) analyze the transcript dataset using the selected moment model to identify a plurality of moments within the transcript dataset, wherein the plurality of moments comprises a set of positive moments that are of high relevance to the unique moment type;
      (vi) for at least one positive moment of the set of positive moments, create a multimedia moment based on that positive moment, wherein the multimedia moment comprises a transcript text from the transcript dataset that corresponds to that positive moment, an audio segment from the episode audio dataset that corresponds to the transcript text, and a moment type that describes the unique moment type associated with that positive moment; and
      (vii) cause a user interface that is based on the multimedia moment to display on a user device, wherein the user interface is configured to
         (1) present the transcript text in synchronized alignment with the audio segment,
         (2) accept user feedback regarding relevance of the multimedia moment to the unique moment type, and
         (3) update a training dataset associated with the selected moment model based on the user feedback.

2. The system of claim 1, wherein:
   (a) the plurality of moments comprises a set of negative moments that are of low relevance to the unique moment;
   (b) each moment model of the plurality of moment models is associated with a training dataset that is used to create that moment model; and
   (c) the one or more processors are further configured to:
      (i) add the set of positive moments to the training dataset associated with the selected moment model as positive examples;
      (ii) add the set of negative moments to the training dataset associated with the selected moment model as negative examples;
      (iii) track changes in the training dataset over multiple user sessions; and
      (iv) automatically generate or refine at least one sub-model specialized to a narrower sub-type of the unique moment type when the tracked changes exceed a configured threshold.

3. The system of claim 2, wherein the one or more processors are further configured to:
   (a) track changes to the training dataset of the selected moment model since the selected moment model was last created; and
   (b) when the extent of changes exceeds the configured threshold, create an updated moment model based upon the training dataset, wherein the updated moment model is further specialized by analyzing a linguistic content of each transcript dataset to identify domain-specific vocabulary or expressions.

4. The system of claim 3, wherein the one or more processors are further configured to, after creating the updated moment model:
   (a) analyze an evaluation dataset with the updated moment model to produce a first evaluation result;
   (b) analyze the evaluation dataset with the selected moment model to produce a second evaluation result; and
   (c) replace the selected moment model with the updated moment model based upon a comparison of the first evaluation result to the second evaluation result.

5. The system of claim 3, wherein the user interface based on the multimedia moment comprises a control usable to provide a user feedback to the server, wherein the one or more processors are further configured to:
   (a) receive the user feedback, wherein the user feedback comprises an indication of whether a user of the user device agrees that the multimedia moment is of high relevance to the unique moment type; and
   (b) update the training dataset based upon the user feedback by adding a weighting factor specific to said sub-type in a hierarchy, such that repeated confirmations of said sub-type increase the likelihood of generating new sub-models.

6. The system of claim 1, wherein the user interface comprises:
   (a) an audio control usable to play the audio segment on the user device;
   (b) a visual indicator based on the moment type; and
   (c) the transcript text.

7. The system of claim 1, wherein the multimedia moment further comprises a full episode audio from the episode audio dataset and a full transcript text from the transcript dataset, and wherein the user interface comprises:
   (a) an audio control usable to play the full episode audio on the user device;

(b) a visual indicator based on the moment type, wherein the visual indicator is usable to cause a portion of the full episode audio that corresponds to the audio segment to play on the user device;
(c) the full transcript text, wherein the full transcript text is configured to display on the user device with:
(i) a first visual characteristic that identifies the transcript text, within the full transcript text, as being associated with the moment type; and
(ii) a second visual characteristic that identifies a portion of the full transcript text that corresponds to the portion of the full episode audio that is currently playing on the user device.

8. The system of claim 7, wherein the audio control is configured to display as a timeline that corresponds to the full episode audio, and wherein the visual indicator is configured to visually indicate the position of the audio segment within the timeline.

9. The system of claim 1, wherein the one or more processors are further configured to, when causing the user interface to display on the user device:
(a) receive a set of user preferences from the user device, wherein the set of user preferences identify one or more topics of interest;
(b) identify a plurality of multimedia moments based on the set of user preferences;
(c) cause the user interface to display on the user device based on the plurality of multimedia moments, wherein the user interface includes, simultaneously for each of the plurality of multimedia moments, display of:
(i) an audio control usable to play the audio segment for that multimedia moment on the user device;
(ii) a visual indicator based on the moment type for that multimedia moment; and
(iii) the transcript text for that multimedia moment.

10. The system of claim 1, wherein the user interface includes a control usable to share the multimedia moment to a third party platform, wherein the one or more processors are further configured to:
(a) create a publicly accessible destination for the multimedia moment;
(b) determine one or more third party platforms on which the publicly accessible destination can be shared;
(c) identify a set of static components in the new episode audio dataset, and incorporate the set of static components into the publicly accessible destination based on the one or more third party platforms; and
(d) generate a set of dynamic components based on the episode audio dataset, and incorporate the set of dynamic components into the publicly accessible destination based on the one or more third party platforms; and
wherein the publicly accessible destination is configured to, when viewed by a second user device via the one or more third party platforms, cause an embedded user interface to display on the second user device, wherein the embedded user interface includes:
(i) an audio control usable to play the audio segment on the second user device;
(ii) a visual indicator based on the moment type; and
(iii) the transcript text.

11. The system of claim 1, wherein each of the plurality of moment models is associated with a model type, wherein model types for the plurality of moment models are organized based on a hierarchy, and wherein the one or more processors are further configured to, when determining whether the plurality of moment models comprise the focused moment model:
(a) identify a set of episode characteristics in the new episode audio dataset;
(b) search the plurality of moment models to identify a favored moment model based on the set of episode characteristics, the model types, and the hierarchy; and
(c) where the favored moment model is identifiable within the plurality of moment models, use the favored moment model as the focused moment model.

12. The system of claim 11, wherein a set of possible model types includes a podcast-specific type, a genre type, and a sub-genre type, and wherein the hierarchy is configured to use, as the favored moment model, the first available of:
(a) first, a podcast-specific model, if present in the plurality of moment models;
(b) second, a sub-genre specific model, if present in the plurality of moment models; and
(c) third, a genre specific model, if present in the plurality of moment models.

13. The system of claim 1, wherein
(a) the plurality of moments comprises a set of negative moments that are of low relevance to the unique moment;
(b) each moment model of the plurality of moment models is associated with a training dataset that is used to create that moment model;
(c) the one or more processors are further configured to:
(i) add the plurality of moments to the training dataset associated with the selected moment model;
(ii) identify a partial training dataset for a potential moment model that has not yet been created, and that is associated with the selected moment modal as a sub-type of the unique moment type;
(iii) add the plurality of moments to partial training dataset for the potential moment model;
(iv) when the content of the partial training dataset exceeds a configured threshold, create the potential moment model based on the partial training dataset; and
(v) add the potential moment model to the plurality of moment models with the sub-type as the unique moment type.

14. A method for creating multimedia moments from audio data comprising, with one or more processors:
(a) storing a plurality of moment models, wherein each moment model of the plurality of moment models is configured to identify a unique moment type, wherein the plurality of moment models comprises a base moment model;
(b) storing a plurality of transcript datasets, wherein each transcript dataset of the plurality of transcript datasets comprises text derived from corresponding audio data and is time indexed to the corresponding audio data;
(c) receiving an episode audio dataset, and creating a transcript dataset based on the new episode audio dataset;
(d) determining whether the plurality of moment models comprises a focused moment model for the episode audio dataset, and using the focused moment model as a selected moment model;
(e) where the focused moment model is not within the plurality of moment models, using the base moment model as the selected moment model;

(f) analyzing the transcript dataset using the selected moment model to identify a plurality of moments within the transcript dataset, wherein the plurality of moments comprises a set of positive moments that are of high relevance to the unique moment type;

(g) for at least one positive moment of the set of positive moments, creating a multimedia moment based on that positive moment, wherein the multimedia moment comprises a transcript text from the transcript dataset that corresponds to that positive moment, an audio segment from the episode audio dataset that corresponds to the transcript text, and a moment type that describes the unique moment type associated with that positive moment; and (h) causing a user interface that is based on the multimedia moment to display on a user device;

wherein the user interface is configured to provide:
(i) a synchronized text-audio playback capability that visually highlights a relevant transcript segment during audio playback,
(ii) a feedback module for confirming or rejecting the identified positive moment,
(iii) a hierarchical menu or label structure enabling selection of specialized sub-models or sub-types,
(iv) an automated process to generate new sub-models upon detecting at least a threshold number of consistent positive examples for an unrepresented sub-type, and
(v) an embedded sharing option that retains the time-indexed transcript dataset and moment type descriptors when posted to third-party platforms.

15. The method of claim 14, wherein:
(a) the plurality of moments comprises a set of negative moments that are of low relevance to the unique moment;
(b) each moment model of the plurality of moment models is associated with a training dataset that is used to create that moment model;
the method further comprising:
(i) adding the set of positive moments to the training dataset associated with the selected moment model as positive examples;
(ii) adding the set of negative moments to the training dataset associated with the selected moment model as negative examples;
(iii) tracking changes to the training dataset of the selected moment model since the selected moment model was last created; and
(iv) when the extent of changes exceeds a configured threshold, creating an updated moment model based upon the training dataset.

16. The method of claim 15, wherein the user interface based on the multimedia moment comprises a control usable to provide a user feedback to the server, the method further comprising:
(a) receiving the user feedback, wherein the user feedback comprises an indication of whether a user of the user device agrees that the multimedia moment is of high relevance to the unique moment type; and
(b) updating the training dataset based upon the user feedback.

17. The method of claim 14, wherein the user interface comprises:
(a) an audio control usable to play the audio segment on the user device;
(b) a visual indicator based on the moment type; and
(c) the transcript text.

18. The method of claim 14, wherein the multimedia moment further comprises a full episode audio from the episode audio dataset and a full transcript text from the transcript dataset, and wherein the user interface comprises:
(a) an audio control usable to play the full episode audio on the user device;
(b) a visual indicator based on the moment type, wherein the visual indicator is usable to cause a portion of the full episode audio that corresponds to the audio segment to play on the user device;
(c) the full transcript text, wherein the full transcript text is configured to display on the user device with:
(i) a first visual characteristic that identifies the transcript text, within the full transcript text, as being associated with the moment type; and
(ii) a second visual characteristic that identifies a portion of the full transcript text that corresponds to a portion of the full episode audio that is currently playing on the user device.

19. The method of claim 14, wherein each of the plurality of moment models is associated with a model type, wherein model types for the plurality of moment models are organized based on a hierarchy, the method further comprising, when determining whether the plurality of moment models comprise the focused moment model:
(a) identifying a set of episode characteristics in the episode audio dataset;
(b) searching the plurality of moment models to identify a favored moment model based on the set of episode characteristics, the model types, and the hierarchy; and
(c) where the favored moment model is identifiable within the plurality of moment models, using the favored moment model as the focused moment model.

20. A system for creating multimedia moments from audio data comprising:
(a) a server comprising one or more processors;
(b) a model database configured to store a plurality of moment models, wherein each moment model of the plurality of moment models is configured to identify a unique moment type, wherein the plurality of moment models comprises a base moment model;
(c) a transcript database configured to store a plurality of transcript datasets, wherein each transcript dataset of the plurality of transcript datasets comprises text derived from corresponding audio data and is time indexed to the corresponding audio data;
wherein the one or more processors are configured to:
(i) receive an episode audio dataset;
(ii) create a transcript dataset based on the episode audio dataset, and add the transcript dataset to the plurality of transcript datasets;
(iii) determine whether the plurality of moment models comprises two or more focused moment models for the episode audio dataset, and use the two or more focused moment models as a selected moment model;
(iv) where the two or more focused moment model are not within the plurality of moment models, use the base moment model as the selected moment model;
(v) analyze the transcript dataset using the selected moment model to identify a plurality of moments within the transcript dataset, wherein the plurality of moments comprises a set of positive moments that are of high relevance to the unique moment type or other unique moment types of the selected moment model;

(vi) for at least one positive moment of the set of positive moments, create a multimedia moment based on that positive moment, wherein the multimedia moment comprises a transcript text from the transcript dataset that corresponds to that positive moment, an audio segment from the episode audio dataset that corresponds to the transcript text, and a moment type that describes the unique moment type associated with that positive moment; and (vii) cause a user interface that is based on the multimedia moment to display on a user device;

wherein the user interface is configured to:
  (1) provide time-synchronized playback of the audio segment together with the corresponding transcript text,
  (2) accept user feedback indicating whether the identified positive moment is correctly labeled,
  (3) update one or more training datasets for each selected moment model based on said user feedback, and
  (4) generate a hierarchical display of the selected moment model or models, wherein each moment model is associated with at least one sub-model that is automatically created when a threshold number of consistent positive examples specific to a sub-type of the moment type is reached.

* * * * *